(12) United States Patent
Geise et al.

(10) Patent No.: US 10,131,423 B2
(45) Date of Patent: Nov. 20, 2018

(54) MULTIROTOR FLYING VEHICLE

(71) Applicants: David Geise, San Luis Obispo, CA (US); John Geise, San Luis Obispo, CA (US)

(72) Inventors: David Geise, San Luis Obispo, CA (US); John Geise, San Luis Obispo, CA (US)

(*) Notice: Subject to any disclaimer, the term of this patent is extended or adjusted under 35 U.S.C. 154(b) by 0 days.

(21) Appl. No.: 15/995,377

(22) Filed: Jun. 1, 2018

(65) Prior Publication Data

US 2018/0273164 A1 Sep. 27, 2018

Related U.S. Application Data

(63) Continuation of application No. 15/098,221, filed on Apr. 13, 2016, now Pat. No. 10,017,245.

(60) Provisional application No. 62/146,943, filed on Apr. 13, 2015.

(51) Int. Cl.
| | |
|---|---|
| *B64C 27/08* | (2006.01) |
| *B64C 27/14* | (2006.01) |
| *B64C 27/52* | (2006.01) |
| *B64F 5/10* | (2017.01) |
| *B64C 1/06* | (2006.01) |
| *B64C 27/20* | (2006.01) |

(52) U.S. Cl.
CPC ............... *B64C 27/08* (2013.01); *B64C 1/061* (2013.01); *B64C 27/14* (2013.01); *B64C 27/20* (2013.01); *B64C 27/52* (2013.01); *B64F 5/10* (2017.01)

(58) Field of Classification Search
CPC ......... B64C 27/08; B64C 27/14; B64C 27/20; B64C 27/52; B64C 1/061; B64F 5/10
See application file for complete search history.

(56) References Cited

U.S. PATENT DOCUMENTS

| | | | | |
|---|---|---|---|---|
| 3,002,712 A | * | 10/1961 | Beckwith | ................ B64C 27/20 244/17.23 |
| 3,081,964 A | * | 3/1963 | Quenzler | ............ B64C 29/0033 244/51 |
| 3,231,221 A | * | 1/1966 | Platt | .................... B64C 29/0033 244/12.4 |
| 3,259,343 A | * | 7/1966 | Roppel | ............... B64C 29/0075 244/12.4 |
| 3,592,412 A | * | 7/1971 | Glatfelter | ............ B64C 29/0033 244/7 A |

(Continued)

FOREIGN PATENT DOCUMENTS

| | | |
|---|---|---|
| DE | 102011117605 | 5/2013 |
| JP | 2002347698 | 12/2002 |

(Continued)

OTHER PUBLICATIONS

Geise; U.S. Appl. No. 15/098,221, filed Apr. 13, 2016.

(Continued)

*Primary Examiner* — Justin M Benedik
(74) *Attorney, Agent, or Firm* — Fitch, Even, Tabin & Flannery LLP

(57) ABSTRACT

A multirotor flying vehicle including at least one rotor support frame organized on a geometric grid, with a plurality of rotor assemblies coupled to the at least one rotor support frame. At least one power supply is coupled to and powers the rotor assemblies. A control system is coupled to the rotor assemblies and is configured to operate the vehicle.

16 Claims, 65 Drawing Sheets

(56) References Cited

U.S. PATENT DOCUMENTS

| | | | |
|---|---|---|---|
| 7,364,114 B2 | 4/2008 | Wobben | |
| 7,699,260 B2 | 4/2010 | Hughey | |
| 8,453,962 B2 | 6/2013 | Shaw | |
| 8,473,123 B2 | 6/2013 | Sun | |
| 8,646,720 B2 * | 2/2014 | Shaw | B64C 29/0025 244/17.23 |
| 8,733,690 B2 * | 5/2014 | Bevirt | B64C 29/0033 244/12.4 |
| 9,109,575 B2 * | 8/2015 | Weddendorf | F03D 5/00 |
| 9,242,714 B2 * | 1/2016 | Wang | B64C 39/028 |
| 9,388,794 B2 * | 7/2016 | Weddendorf | F03D 5/00 |
| 2006/0226281 A1 * | 10/2006 | Walton | B64C 27/20 244/17.23 |
| 2006/0266881 A1 * | 11/2006 | Hughey | B64C 27/08 244/17.23 |
| 2008/0048065 A1 * | 2/2008 | Kuntz | A63H 17/00 244/17.23 |
| 2009/0008499 A1 * | 1/2009 | Shaw | B64C 27/20 244/17.23 |
| 2010/0295321 A1 * | 11/2010 | Bevirt | B64C 39/022 290/55 |
| 2011/0057453 A1 * | 3/2011 | Roberts | F03D 1/02 290/55 |
| 2011/0121570 A1 * | 5/2011 | Bevirt | F03D 5/06 290/44 |
| 2011/0127775 A1 | 6/2011 | Bevirt | |
| 2014/0151496 A1 | 6/2014 | Shaw | |
| 2014/0374532 A1 | 12/2014 | Duffy | |
| 2015/0012154 A1 * | 1/2015 | Senkel | B64D 17/80 701/4 |

FOREIGN PATENT DOCUMENTS

| | | |
|---|---|---|
| JP | 2011046355 | 3/2011 |
| WO | 2014053057 | 4/2014 |

OTHER PUBLICATIONS

International Search Report and Written Opinion of the International Searching Authority for PCT Application No. PCT/US2016/027369 dated Jan. 19, 2017.

Uber Elevate; "Fast-Forwarding to a Future of On-Demand Urban Air Transportation"; Oct. 27, 2016; https://medium.com/@UberPubPolicy/fast-forwarding-to-a-future-of-on-demand-urban-air-transportation-f6ad36950ffa#.gvn6kdsvn; 98 pages.

USPTO; Non-Final Office Action issued in U.S. Appl. No. 15/098,221 dated Oct. 31, 2017.

USPTO; Notice of Allowance issued in U.S. Appl. No. 15/098,221 dated Mar. 23, 2018.

* cited by examiner

MULTIROTOR FLYING VEHICLE

This application is a continuation of U.S. application Ser. No. 15/098,221, filed Apr. 13, 2016, entitled MULTIROTOR FLYING VEHICLE, which claims the benefit of U.S. Provisional Application No. 62/146,943, filed Apr. 13, 2015, entitled MULTI-ROTOR FLYING VEHICLE, both of which are incorporated in their entirety herein by reference.

BACKGROUND OF THE INVENTION

1. Field of the Invention

The present invention relates generally to aircraft, and more specifically to rotorcraft. Even more specifically, the present invention relates to rotorcraft with plural lifting rotors.

2. Discussion of the Related Art

A rotorcraft is a heavier-than-air flying machine that uses life generated by rotor blades that revolve around a mast, e.g., a helicopter. A multirotor aircraft is a rotorcraft with more than one rotors. Multirotor aircraft have advantages over traditional airplanes and helicopters, such as fewer landing requirements, less cost, and less complexity.

Conventional multirotor aircraft with a low number of rotors are inherently unsafe for carrying a person due to their complexity and lack of redundancy. The worst-case count is the quad-copter (with four rotors) due to its geometric inability to balance thrust in a stable configuration when performing an emergency landing. Rotor size in multirotor vehicles is limited due to the nature of the multirotor fixed-pitch/variable rotation rate design approach. To maintain vehicle stability in a multirotor aircraft, a flight-controller needs to vary rotor RPM rapidly, and rotor inertia becomes a key limiting factor. As rotor diameter increases, drive requirements increase more rapidly and become suboptimal in efficiency (power and weight) terms, thus limiting maximum feasible size when using a conventional frame design. Larger rotors contain more kinetic energy, making them more dangerous and also encounter speed-of-sound limitations as diameter and RPM increase.

Multirotor flying vehicles typically include a series of engineering and design tradeoffs that enable them to operate within the parameters required for them to fly. For example, the fixed-pitch rotor is a conventional characteristic of multirotor aircraft. Instead of altering a variable rotor pitch to control thrust as a conventional one-rotor helicopter, multirotor vehicles use three or more simple fixed-pitch rotors. An electronic controller rapidly alters the rotors' rotational velocity to alter the rotors' thrust, altering the aggregate center of thrust as opposed to the vehicle's center of gravity (which typically does not move while in flight), maintaining stability in flight. This is a simpler overall design mechanical design compared to a variable-pitch vehicle. However, maximum rotor size is limited in a fixed-pitch/variable-speed aircraft due to the conflict between minimum thrust-adjustment (rotor speed) reaction time requirements to maintain vehicle stability vs. motor size/power supply/efficiency limitations.

The typical hub-and-spoke (H&S) frame layout does not scale up rotor count beyond a certain level due to limitations built in to the design approach. Typical multirotor aircraft designs specify a central hub containing electronics, etc. and have a number of arms extending outward from the center to position rotors, usually roughly forming a circular pattern around the hub. The H&S layout may be optimal for low-count (3-8) rotors, but beyond a threshold diminishing returns increase rapidly due to several factors. Primarily this because if the vehicle designed for lift in the +Z (vertical) axis, rotors arranged on the XY plane around the Z axis are necessary, with each rotor requiring clearance (tip to tip) on the XY axis so rotor capacity is a function of rotor diameter and distance from the hub. Support structure (frame) strength requirements increase with hub distance, and although attempts to optimize spoke structure may somewhat mitigate the inherent limitations of the hub-and-spoke arrangement, scaling upwards becomes impractical.

The combination of limitations fixed-pitch rotors and H&S frames severely limits overall vehicle capacity and capabilities. Given that a maximum rotor size exists given current state of the art, the best avenue for improving capacity and performance is in re-examining the approach to frame design.

SUMMARY OF THE INVENTION

Several embodiments of the invention advantageously address the needs above as well as other needs by providing a multirotor flying vehicle comprising: a structural frame oriented in a horizontal plane and organized on a horizontal geometric grid; a plurality of rotor assemblies providing vertical thrust and coupled to the structural frame, each rotor assembly including a rotor and a motor coupled to and powering the rotor; at least one power source coupled to the flying vehicle and coupled to each of the plurality of rotor assemblies, whereby power is supplied to each of the rotor assemblies; and at least one flight control system coupled to the motors and the at least one power source and configured to operate the vehicle.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
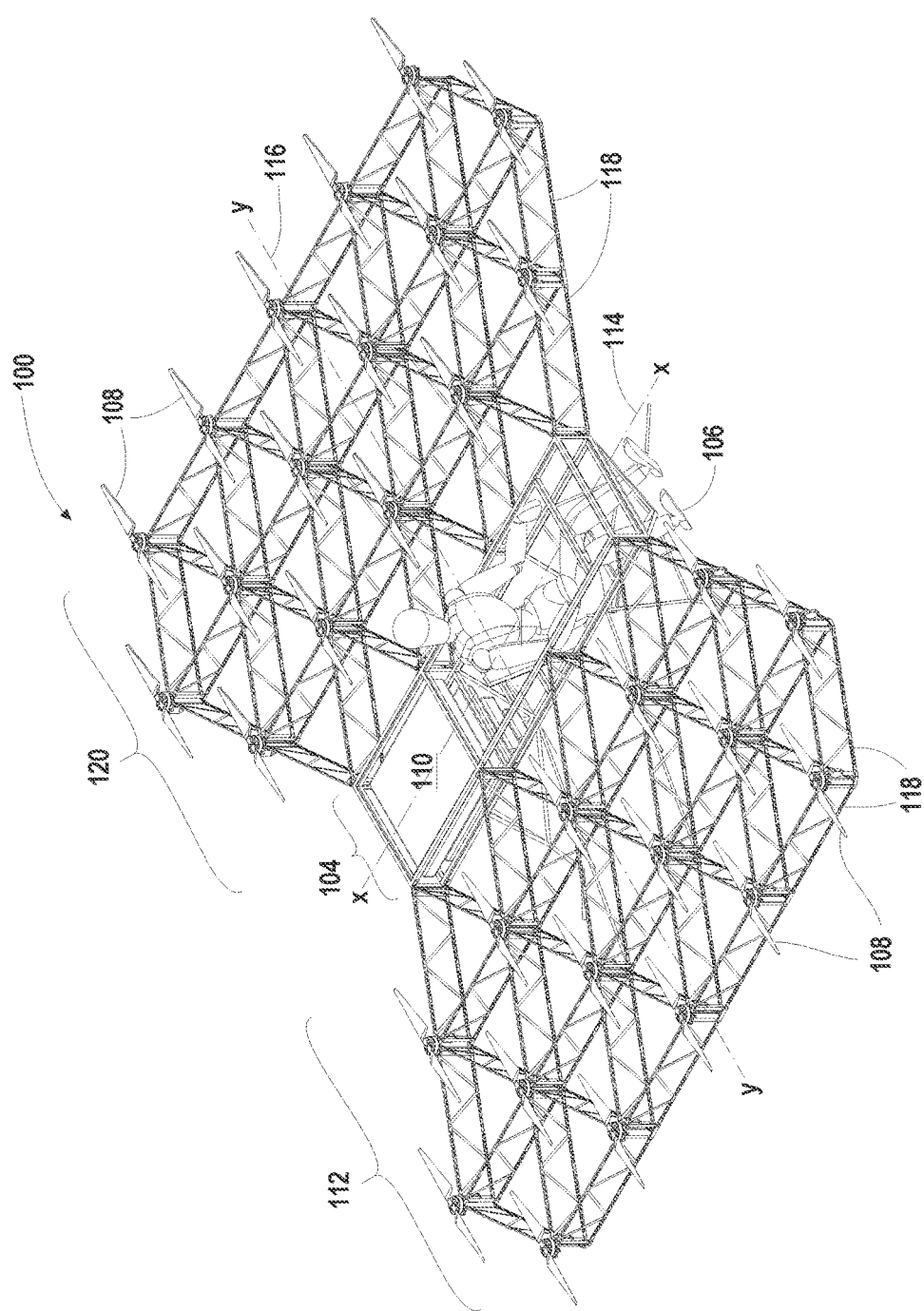
FIG. 1 is a perspective view of an embodiment of a triangular grid multirotor flying vehicle in one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Autonomous flying vehicles configured for carrying one or more passengers, would in some embodiments include the following characteristics: Safe for passengers, Be operable without a license, Able to perform a minimum flight time and distance, Have a minimum payload capacity, Minimize vehicle weight while maximizing lift, Configured to land in a driveway or other minimal area. The multirotor flying vehicles as described herein are configured to provide these and additional characteristics.

Referring first to FIG. 1, a perspective view of an embodiment of a triangular grid multirotor flying vehicle 100 is shown. Shown are a fuselage 104, a user 106, a plurality of rotor assemblies 108, a power assembly 110, a left rotor support frame 112, an x-axis 114, a y-axis 116, a plurality of linkage arms 118, and a right rotor support frame 120. Support struts 204 and landing gear 200 (shown below in FIG. 2) have been omitted for clarity.

The horizontal x-axis 114 is the front-to-back axis of the frame and is located at the plan center of the vehicle frame. The horizontal y-axis 116 is perpendicular to the x-axis 114, i.e. side-to-side, and is located at the line of symmetry of the rotor support frames 112, 120.

The vehicle frame includes the central fuselage 104. The central fuselage 104 structure comprises a shallow rectangular open box framework approximately the same depth as the rotor support frames 112, 120. In other embodiments the fuselage 104 may comprise other suitable shapes. Additional framework extends outside the box section as required for support of the power assembly 110, the user, and the rotor support frames 112, 120. For example, support struts 204 (shown below in FIGS. 2 and 3) are included from a lower portion of the fuselage 104 to an underside of each rotor support frame 112, 120 to provide additional support to the rotor support frames 112, 120 that are cantilevered out from the central fuselage 104. Using the support struts 204 reduces grid absolute strength (weight) requirements by distributing load more directly to the frame, bypassing grid frame, and increasing overall dimensional cross-section) of the grid while reducing X-Y to Z dimension aspect ratio requirements.

In the present embodiment, a rear portion of the fuselage 104 is configured to support the power assembly 110, including a battery. In some embodiments, the power assembly 110 includes at least two redundant power subsystems. A front portion of the fuselage 104 is configured to support the user 106 (or other cargo and/or additional passengers) and provide user controls. The fuselage 104 also includes landing gear 200 extending from the underside of the fuselage 104 as shown below in FIGS. 2 and 3. The fuselage 104 may also be of other materials and structures configured to provide the necessary structural support to the other vehicle components and/or the user 106, for example, steel, aluminum, and/or carbon fiber.

Each rotor support frame 112, 120 is coupled to a side of the fuselage 104 such that the fuselage 104 is juxtaposed between the support frames 112, 120 and each rotor support frame 112, 120 is supported by and is cantilevered outward from the proximate side of the fuselage 104. Each rotor support frame 112, 120 comprises a framework laid out on a grid system and including the plurality of linkage arms 118 coupled together to form a grid structure in the horizontal (x-y) plane. In the exemplary triangular grid vehicle 100 of FIG. 1, the plurality of linkage arms 118 form a triangular grid in the x-y plane, with rotor assemblies 108 coupled to grid intersections. In the embodiment shown, each rotor support frame is symmetrical with respect to the y-axis 116, although in some embodiments the frame and/or rotor configuration may be asymmetrical. Each frame is rigidly coupled to the proximate side of the fuselage 104. A plurality of grid vertices proximate to the grid are coupled to the proximate fuselage 104 side. The couplings includes restraint against translation of the connection. In some embodiments, the couplings are rigid, i.e. restrained against both translation and rotation. In some embodiments, the coupling of the rotor support frame to the fuselage 104 may include controlled rotational movement, for example, for pivoting the rotor support frames 112, 120 in the horizontal plane. The controlled rotational movements may be about one, two or three axes.

The linkage arms 118 may comprise a plate section oriented in the vertical plane, a truss section oriented in the vertical plane, or other suitable structure. The linkage arms 118 may comprise any material and shape that is capable of the required strength and serviceability performance during operation and use of the vehicle, for example, 2000 or 7000 series aircraft aluminum. Linkage arms 118 may comprise a plate, a plate with bends, or a plate with channel sections top and bottom. Linkage arms 118 may include "cage" elements comprising plates with connecting brackets and/or connecting slots/fingers.

In the embodiment shown, 16 rotor assemblies 108 are coupled to each rotor support frame 112, 120, in a 5-6-5 configuration, for a total of 32 rotor assemblies 108. Other configurations may be used as suitable for the number and arrangement of the rotors, for example, a 2-3-4-3 arrangement as shown in FIGS. 32-44.

The frame is generally organized horizontally around the fuselage 104, providing improved aerodynamics by reducing downwash drag around the fuselage 104. The fuselage 104 is generally located with respect to the rotor support frames 112, 120 such that net thrust is centered and matches the center of gravity of the multirotor flying vehicle. The rotor support frames 112, 120 are generally arranged to distribute thrust while carrying load.

Additional struts, either diagonal support struts 204 or other types/location of struts may be used to distribute load across the frame assembly.

Additional fuselage/rotor support frame embodiments include a folding frame assembly, a pivoting frame assembly.

It will be apparent to those of ordinary skill in the art that an additional way to improve rotor count with the same frame size is to stack rotors vertically, with additional rotors mounted to the underside of the rotor support frames 112, 120. The underside rotors would typically be placed coaxially with the above rotors and be counter-rotating. This may be applied to any of the flying vehicle embodiments disclosed herein.

The power assembly 110 is coupled to and supported by the fuselage 104. The power assembly 110 is described in greater detail in FIG. 65.

Each of the rotor assemblies 108 includes a rotor coupled to and powered by a motor. Each rotor assembly 108 is electrically coupled to and is powered by the power assembly 110.

Figure 2:
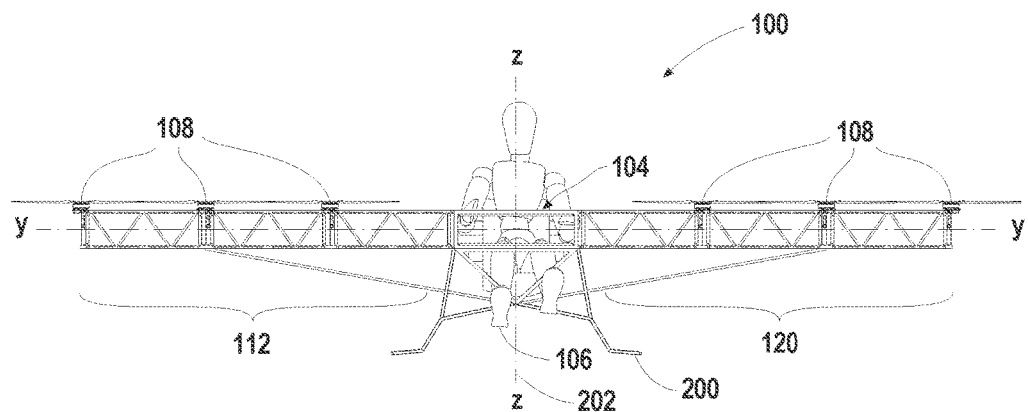
FIG. 2 is a front elevational view of the multirotor flying vehicle.

Referring next to FIG. 2, a front elevational view of the multirotor flying vehicle 100 of FIG. 1 is shown. Shown are the fuselage 104, the user 106, the plurality of rotor assemblies 108, the left rotor support frame 112, the y-axis 116, the plurality of linkage arms 118, the right rotor support frame 120, landing gear 200, a z-axis 202, and support struts 204.

As shown in the front elevational view of the multirotor flying vehicle 100, landing gear 200 is coupled to the underside of the fuselage 104. In the embodiment shown the landing gear 200 comprises four legs, each leg coupled proximate to a corner of the fuselage 104. The landing gear 200 is configured to support the vehicle 100 as necessary for takeoff, landing, and when stationary. It will be understood that the landing gear 200 may comprises any suitable material and structure.

The support struts 204 are axial frame members that extend from a lower portion of the fuselage 104 upward to each rotor support frame 112, 120, providing bracing for each rotor support frame 112, 120. The size, number and location of the support struts 204 is variable depending on the rigidity of the rotor support frames 112, 120 and are configured to provide structural support to the rotor support frames 112, 120 as required.

Figure 3:
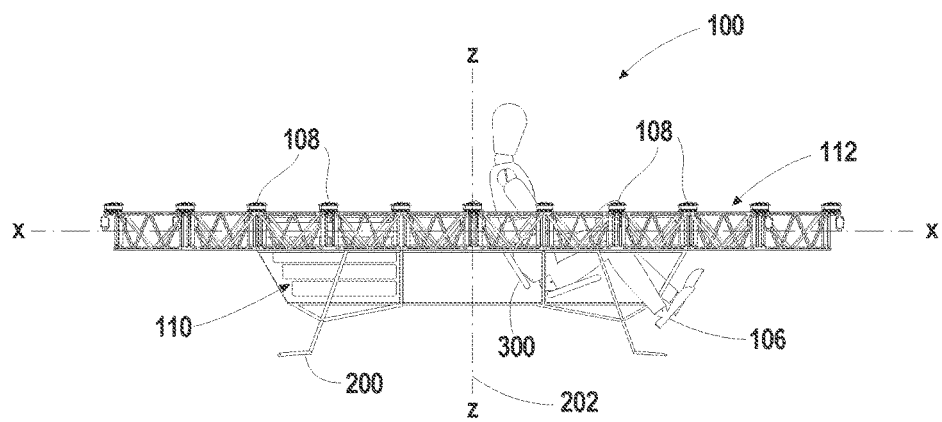
FIG. 3 is a left elevational view of the multirotor flying vehicle.

Referring next to FIG. 3, a left elevational view of the multirotor flying vehicle 100 of FIG. 1 is shown. Shown are the fuselage 104, the user 106, the plurality of rotor assemblies 108, two rotor support frames 112, the x-axis 114, the plurality of linkage arms 118, landing gear 200, and the z-axis 202.

The left elevational view of FIG. 3 includes the seat 300. The seat 300 is configured to support the user 106 during operation of the flying vehicle 100. In some embodiments a plurality of seats 300 may be included to support a plurality of users 106.

Figure 4:
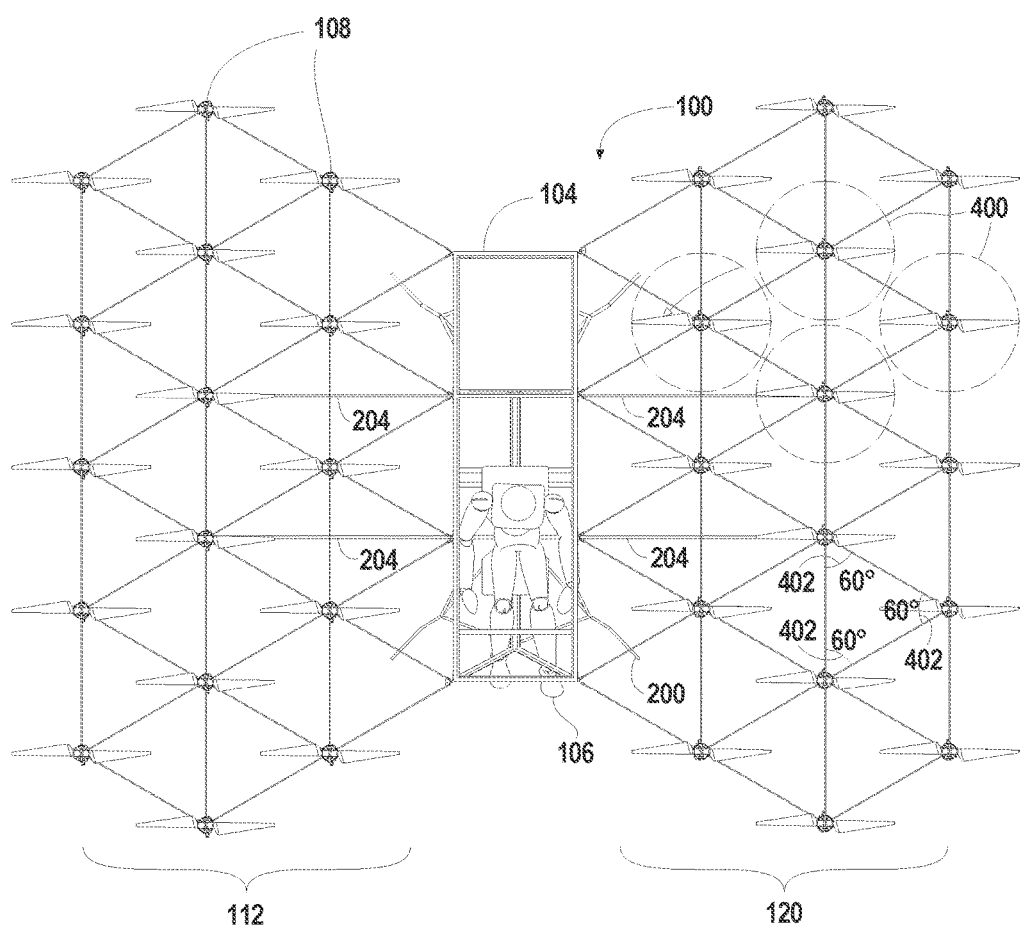
FIG. 4 is a plan view of the multirotor flying vehicle.

Referring next to FIG. 4, a plan view of the multirotor flying vehicle 100 of FIG. 1 is shown. Shown are the fuselage 104, the user 106, the plurality of rotor assemblies 108, the left rotor support frame 112, the right rotor support frame 120, landing gear 200, support struts 204, rotor shadow extents 400, and a plurality of triangular grid angles 402.

As shown in FIG. 4, the triangular grid is comprised of generally linear linkage arms 118 joined in equilateral triangle shapes, i.e. with internal angles of 60 degrees. The rotor shadow extents 400 illustrate the tip-to-tip plan extent of the spinning rotors. For clarity, the rotor shadow extents 400 are shown for only a few of the rotors, but it will be understood that each rotor includes the rotor shadow extent 400. The unit dimension grid is generally equal to the rotor diameter plus a tip clearance dimension between adjacent rotor tips.

Referring again to FIGS. 1-4, the multirotor flying vehicle 100 is shown in one embodiment, with the rotor support frames 112, 120 based on a triangular grid and supporting a total of 32 rotor assemblies 108. Multirotor vehicles with a high number of rotor assemblies 108 benefit from redundancy, reduced kinetic-energy and sonic issues, and have a synergistic effect as adjacent air columns thrust in the same direction. The large number of rotor assemblies 108 result in an increase in efficiency and allowable vehicle payload. The grid-based frame system improves the ability to scale the vehicle up from the 8-10 rotors for conventional multirotor vehicles to 50-100 rotors or more.

Advantages of the grid layout over traditional hub-and-spoke design include increased redundancy (improving safety), frame is mutually reinforcing, side-by-side rotor have a synergistic effect, and may include a shroud coupled to the grid frame to prevent recirculation and further improve efficiency.

The grid configuration of the rotor support frames 112, 120, with the rotor assemblies 108 located at grid intersections, allows rotors to be placed in aerodynamically optimal positions. The rotor assemblies 108 are arranged in a tip-to-tip configuration to avoid inefficiencies incurred when placing a rotor within the down-draft of nearby rotors. However, under/over rotor assembly configurations may also be used.

The grid layout of the rotor support frames 112, 120, when compared to hub-and-spoke frames supporting the same number of rotor assemblies 108, is stronger, more stable, more redundant, and more resistant to vibration. The grid-based rotor support frames 112, 120 are inherently symmetrical and modular, aiding in re-use of frame components. For example, once the support frame linkage arm 118 is designed, multiple instances of the same linkage arm 118 may be used since all hubs and connections are the same. The use of the same component arms simplifies the manufacturing requirements for the rotor support frames 112, 120. In the embodiments shown herein, grid layouts are regular, but irregular rid layouts may also be used.

In some instances, frame modules may have different frame types, material, geometries, dimensions, etc., to optimize strength, weight, or other characteristics. For example, a thicker frame material may be included in high-stress location and a thinner frame material in low-stress areas. In some embodiments the module connection points may be snap together with a safety mechanism. In other embodiments the modules may be connected by tabs, slots, hooks, button, or other suitable fastener.

In the modular configuration electrical, power and communication elements may be built into each module to facilitate easy assembly and/or create a "mesh network" distribution grid to enhance capacity and fault-tolerance using mechanically integrated or detached connectors. In other approaches, isolated power and control subsystems are used to mitigate failure of an electrical circuit, battery or control system.

The high rotor assembly number enabled by the grid layout results in a more fault-tolerant vehicle. Due to geometric factors of low-count (3-4) rotor systems, failure rate (mean time before crash, MTBC) is increased by rotor count since the low-count vehicle cannot fly with a lost rotor. Reliability is then MTBC divided by rotor count. However, in medium-to-high rotor count systems, if the vehicle is able to stabilize itself in flight with one or more lost rotors, the MTBC is multiplied by rotor count. High count systems can be designed to be highly fault tolerant and therefore much safer than low to medium count systems. Also, higher rotor counts diminish fractional loss due to loss of one, two or even three rotors. For example, in a 6-rotor vehicle, a 1-rotor loss results in loss of ⅓ (33%) of thrust (loss of prop+loss of opposite prop for stability reasons=2 prop loss, 6−2=4, 4⁄6=⅔ remaining lifting props and a ⅓ loss of lift). In a 30-rotor vehicle, a 1-rotor loss results in loss of only 6.7% of thrust. By providing a large enough number of rotor assemblies 108, airworthiness of the flying vehicle is preserved when two or more rotors are inoperable.

In a vehicle intended to generate thrust on the −Z axis in order to oppose gravity in the +Z axis, with rotors are arranged to avoid thrust from above for efficiency (over/under being an exception), ideal distribution of rotors is on a given XY plane at a right angle to the axis of thrust (axis of rotation of the rotor except in the case of the intermeshing rotor 'syncopter').

Since rotor motion forms a circular shape, placing rotors tip to tip on an XY plane in a rectangular grid is a suboptimal distribution due to incompact spacing (X=Y) and leaving space inefficient 'thrust holes' between intersections of rotor quadrants. However, when rotors with a tip clearance D are arranged at regular intervals on a horizontal y-axis 116 (forming a row), odd numbered rows placed on the y-axis 116 offset in the X axis by D/2, forming staggered columns, allows the rotor assemblies 108 to be packed more compactly by compressing them in the y dimension (Y=X*sin (45°)) due to increased rotor tip-tip clearance. Thrust holes are also minimized.

The rotor support frames 112, 120 are comprised of a plurality of linkage arms 118 coupled together to form the grid layout. The linkage arms 118 as shown in FIG. 1 are based on a general truss design, and are described further below. The linkage arms 118 are generally designed provide the optimal combination of reduction of thrust shadow (the footprint of the frame located within the rotor downwash shadow) and maximizing of frame strength and stability. The triangular grid layout provides a greater strength and stability when compared to a hexagonal layout, but the hexagonal grid has less thrust shadow as only 3 arms are located within the rotor shadow compared to 6 arms for the triangular layout. Thrust shadow for frames may also be reduced by minimizing the width of the linkage arms 118 while still providing strength and stability requirements.

In order to maximize the strength-to-weight ratio all frame designs comprise a frame where loads are transferred from source (rotors, frame) to the destination (fuselage 104) via the shortest path. For all embodiments shown herein, each rotor assembly 108 may be mounted at a grid intersection, at a linkage arm 118 midpoint, at any other location on a linkage arm 118, or within the void area created between the linkage arms 118 (with additional supporting members). The embodiments described herein generally locate the rotor assembly 108 at the grid intersection, which is generally the strongest structural location. In other embodiments, a mid-arm rotor assembly 108 mounting location may be chosen to minimize frame-induced aerodynamic downwash drag and is an advantageous mounting location choice for the triangle grid frame design.

Although the triangular grid layout incurs 2 times the count of linkage arms 118 in thrust shadow compared to a hexagon grid, the triangular XY grid of linkage arms 118 extruded on the Z axis results in the triangular prism arrangement of surfaces ("plates") laying on their edge, and since on-edge plates have minimal XY plane surface, thrust shadow effects are reduced. Since analysis of the extruded triangle frame is inherently resistant to twisting forces due to mutual reinforcement by adjacent linkage arms 118 wider box-section shapes for linkage arms 118 are unnecessary. The triangular grid layout with plates as linkage arms 118 results in optimal high strength/weight results compared to other grid layouts when all other factors are held to normalized or equivalent values. A symmetrically structurally balanced plate triangular grid design, potentially with side-braces (XY) to adjacent linkage arms 118 helps combat bowing by distributing displacement to adjacent linkage arms 118. To minimize weight yet carry load, removing inefficiently allocated material is important.

Linkage arms 118 comprising vertically oriented plates fastened end-to-end in the triangular grid layout are susceptible to compressive forces and torsion. To strengthen the linkage arms 118 against compression and torsion, various approaches may be applied. Firstly, the linkage arm 118 may include top and bottom "U" shaped beams, where the voids of the U shape face each other with repeating interconnecting lateral segments fastened into the interior area formed by the U and vertical plates at the ends to form a general truss structure. This creates a right/left plate balanced structure with up to three times the section width, providing increased resistance to compression while removing unnecessary weight. This configuration is described further in FIGS. 9 and 10. In other embodiments, separate parallel vertical plates may be used in lieu of the U-shaped beams. Additionally, lateral cross-bracing sub-frames may be placed at mid-arm attached to adjacent linkage arms 118, either at the hub, mid-arm or elsewhere, to provide additional lateral support. Additionally, lateral cross-bracing is not in thrust shadow, so it may contain additional cross-section (one or more right-angle bends) without thrust shadow penalty.

Linkage arms 118 comprising beams, diagonal plates, and/or end plates are interconnected by brackets of various designs, as described further below. Linkage arms 118 are typically connected to adjacent linkage arms 118 only, causing force to be transmitted off-axis through connecting brackets, creating potentially relative weakness in the brackets at the vertices/hubs. Strength/weight can be optimized by varying material selection, thickness, and dimensions of various parts (limited by bendability), and cross-plates that connect in-plane arms (opposite side of the six arms that make up a fully interconnected triangle) added to address hub weakness. Ideally three plates with slots, welded (or connected with fasteners) at 60-deg and 120-deg would carry load in all directions. A modular grid of rotors may be adjusted to meet capacity by easily adding or subtracting grid module sections via quick-connect fasteners and electrical connectors. A grid topology lends itself to being folded to reduce space needed for storage. Mounting rotors within grid width perimeter, intake and exhaust guards would increase safety.

In the triangular grid, triangle intersections (corners of the triangle) form hubs that must fasten adjacent arms top and bottom. Generally this may become a weak point of the design, since mechanical force needs to traverse from one arm, through the hub usually via a series of brackets, and on to another arm. This weakness can be eliminated either by creating an integral one-piece hub design by fastening cross-arm reinforcing plates that extend through the hub directly to the opposing arm.

Other properties of the triangular grid layout design include when the rotor is mounted at the intersection of the legs of a triangle, six frame arms are subject to downwash, necessitating minimizing horizontal area. Additionally, static finite element load analysis indicates that problematic twisting forces of other shapes are not present in the triangle shape.

Figure 9:
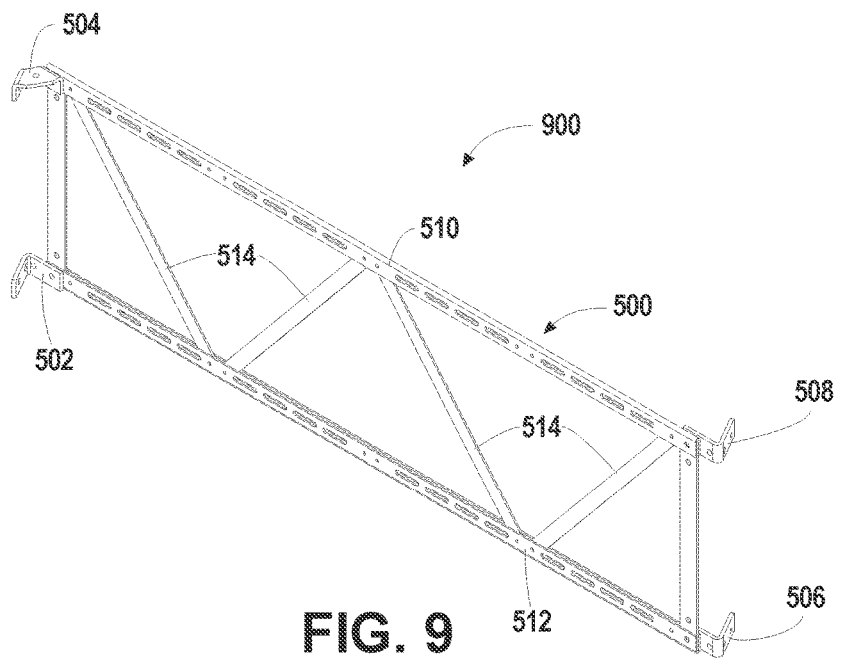
FIG. 9 is a perspective view of a second exemplary linkage arm.
Figure 10:
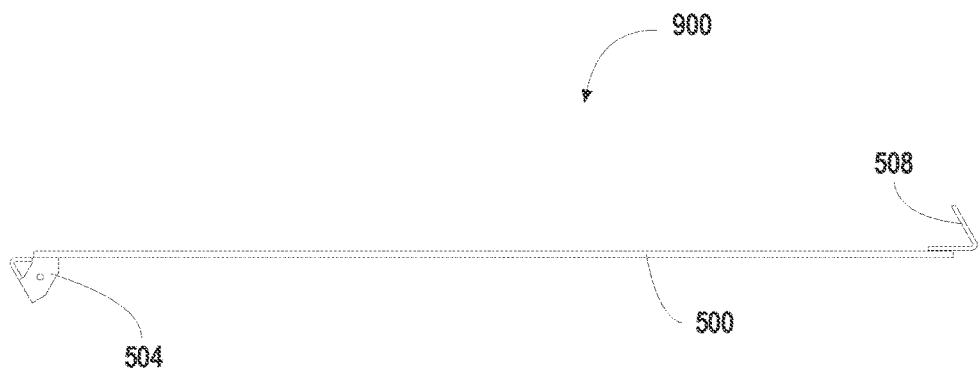
FIG. 10 is a plan view of the second linkage arm.

Due to the high arm downwash count and lack of twisting forces, a plate arm design is optimal. This creates good box section aspect ratio while minimizing downwash shadow. Finite element analysis indicates that plate design weakness is compressive forces manifesting in horizontal displacement at the midpoint of the arm. Two approaches may be used to address the displacement: Lateral linkage arm-to-linkage arm bracing, and/or increasing width of linkage arms 118 by adding lengthwise bends along the edge of the linkage arms 118, although some bends will increase aerodynamic shadow. An advantageous solution may be "U" shaped bent linkage arm top and bottom chords (as shown in FIGS. 9 and 10) with lateral bracing. In other embodiments parallel plate linkage arm top and bottom chords may be an advantageous design.

In some embodiments, the grid frame system may be modular, enabling easy reconfiguration by attaching frame subassemblies. The modular frame system also enables optimization of vehicle capacity. In a modular system, different frame types and geometries may be combined to optimize strength, weight, and other performance characteristics. For example, a thicker frame material may be included in high-stress location and a thinner frame material in low-stress areas.

In some embodiments the module connection points may be snap-together with a safety mechanism. In other embodiments the modules may be connected by tabs, slots, hooks, button, other suitable fastener, or by welding or bonding with adhesive.

The electrical, power and communication elements may be built into each module to facilitate easy assembly and/or create a "mesh network" distribution grid to enhance capacity and fault-tolerance using mechanically integrated or detached connectors. Subsystem isolation (isolated power grids to isolated subsets of motors) enables an entire subsystem to fail and the vehicle is still airworthy for an emergency landing.

Figure 5:
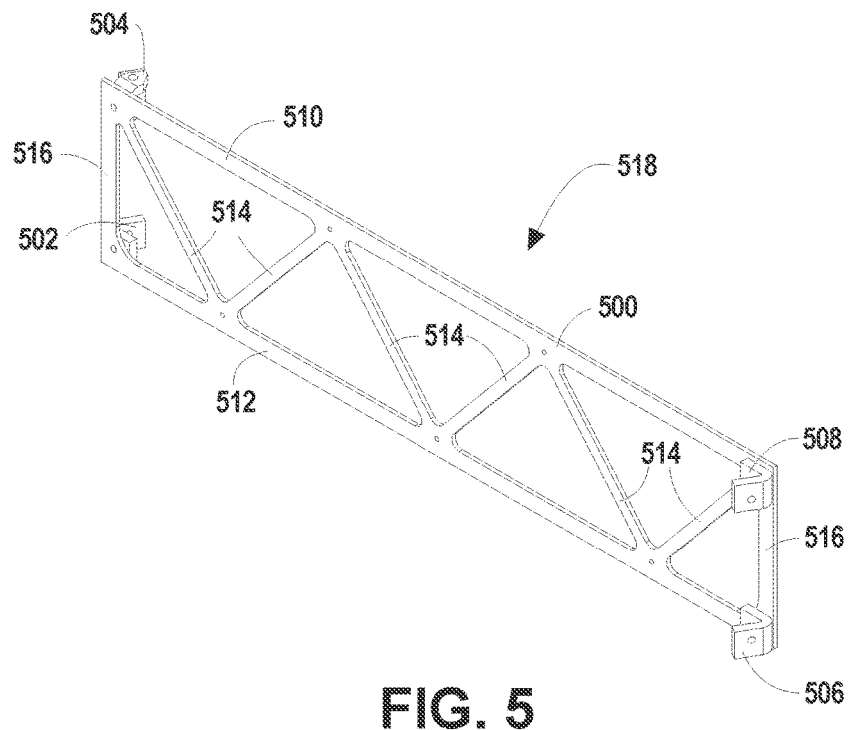
FIG. 5 is a perspective view of a first exemplary linkage arm.

Referring next to FIG. 5, a perspective view of a first exemplary linkage arm 518 is shown. Shown are a truss member 500, a lower left tab 502, an upper left tab 504, a lower right tab 506 and a upper right tab 508, an upper chord 510, a lower chord 512, a plurality of diagonal members 514, and two vertical end chords 516.

In the linkage arm embodiment shown in FIG. 5, each first linkage arm 518 is comprised of a truss member 500 oriented in a vertical plane. The truss member 500 comprises the top chord 510, the parallel bottom chord 512 and the plurality of diagonal members 514 coupling the top chord 510 to the bottom chord 512, forming a truss configuration. As shown, the truss member 500 is formed by removing portions of a single plate, but the truss member 500 may be comprised of separate chord and diagonal members 514 (e.g. bars, angles or tubes) fastened together to form the truss member 500, for example as shown below in FIGS. 9 and 10. The truss member 500 also includes one vertical end chord 516 at each end of the truss member 500. The first linkage arm 518 includes six diagonal members 514, but other numbers of diagonal members 514 may be used.

The first linkage arm 518 includes the plurality of L-shaped tabs 502, 504, 506, 508 with the first leg of the L coupled to the top chord or bottom chord. The tabs 502, 506, 508 are located at the ends of the truss member 500, i.e. at general intersection of the proximate vertical end chord 516 with the top chord 510 or bottom chord 512. The second leg of the L forms an angle of approximately 60 degrees with respect to the first leg, and extends outward from the truss member 500, whereby the tab 502, 504, 506, 508 is configured to couple to the corresponding top or bottom chord of another truss member 500. The upper right tab 508 and the lower right tab 506 are coupled to a front side of the truss member 500, and the upper left tab 504 and the lower left tab 502 are coupled to a back side of the truss member 500. The upper left tab 504 also includes a horizontal portion connecting the legs, with the horizontal portion generally aligned with a top surface of the top chord 510, with the horizontal portion configured to connect to and provide support for the rotor assembly 108.

In one embodiment, the truss member 500 comprises hardened aluminum and the tabs 502, 504, 506, 508 comprise non-hardened aluminum. The tabs comprise non-hardened aluminum due to the difficulty of bending hardened aluminum.

The truss member 500 length-to-height ratio is determined by the required strength and serviceability requirements for the specific vehicle grid geometry and design, but in some embodiments may be from around 3:1 to 6:1.

Figure 6:
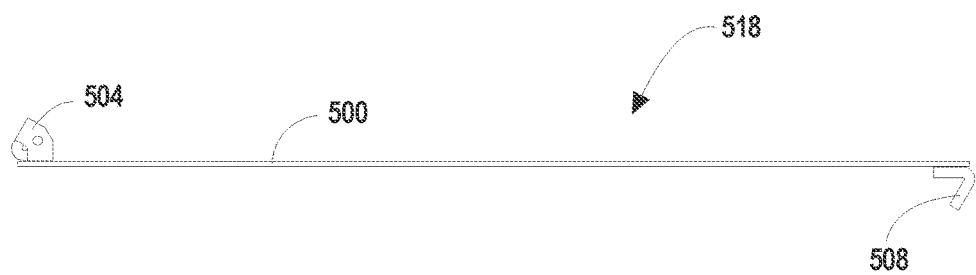
FIG. 6 is a plan view of the first linkage arm.

Referring next to FIG. 6, a plan view of the first linkage arm 518 of FIG. 5 is shown. Shown are the truss member 500, the upper left tab 504, and the upper right tab 508.

As previously described in FIG. 6, the left tabs 502, 504 of the linkage arm 518 extend outward from the rear side of the chords. The upper left tab 504 includes the horizontal portion for coupling to the rotor assembly 108. The right tabs 506, 508 of the first linkage arm 518 extend outward from the front side of the linkage arm 518.

Figure 7:
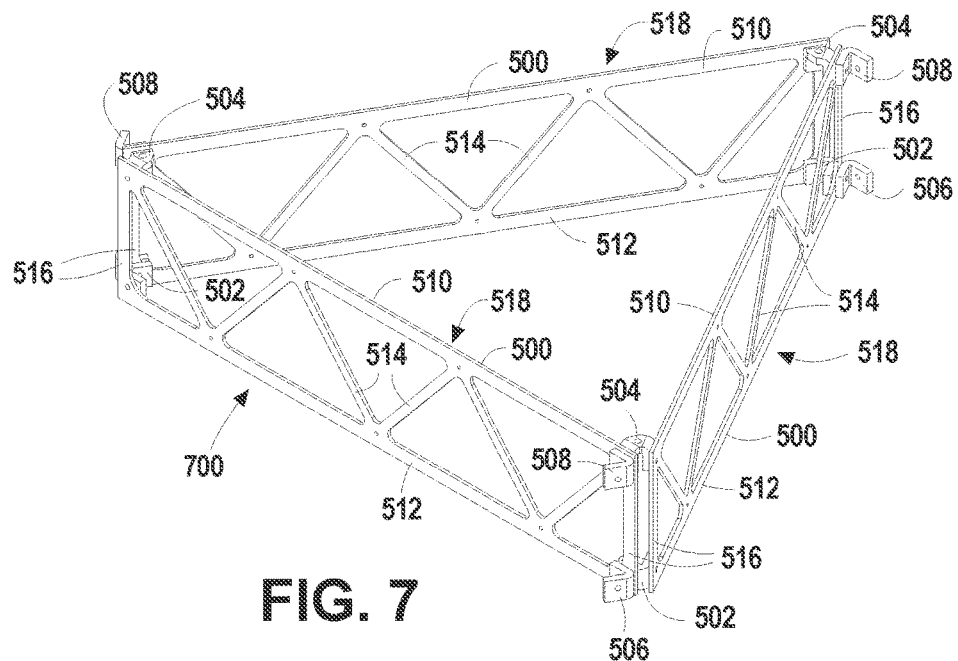
FIG. 7 is a perspective view of a first linkage arm triangle assembly.

Referring next to FIG. 7, a perspective view of a first linkage arm triangle assembly 700 is shown. Shown are the plurality of truss members 500, the lower left tabs 502, the upper left tabs 504, the lower right tabs 506, the upper right tabs 508, the upper chords 510, the lower chords 512, the plurality of diagonal members 514, the vertical end chords 516, and the plurality of first linkage arms 518.

Three linkage arms 518 are coupled together via the tabs to form an equilateral triangle assembly. Each left end of one linkage arm 518 is coupled to a right end of another linkage arm 518 at an approximately 60 degree angle using upper left tabs 504 and the lower left tabs 502. The lower right tabs 506 and the upper right tabs 508 extend outward from the linkage arms 518 for coupling to other first linkage arm triangle assemblies 700.

Figure 8:
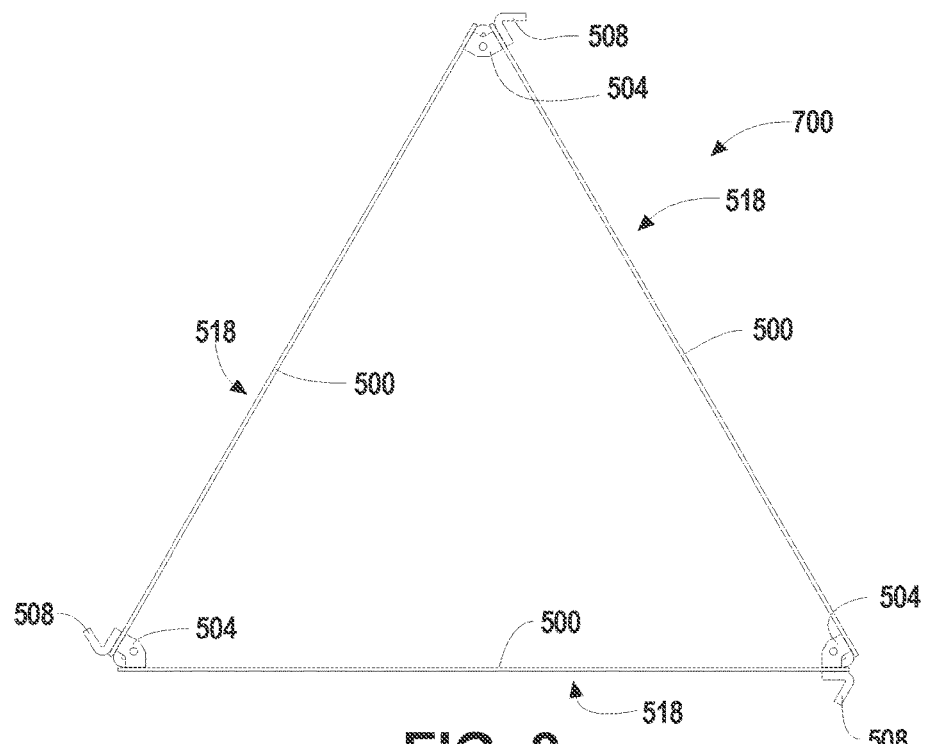
FIG. 8 is a plan view of the first linkage arm triangle assembly.

Referring next to FIG. 8, a plan view of the first linkage arm triangle assembly 700 is shown. Shown are the plurality of first linkage arms 518, the plurality of truss members 500, a plurality of lower left tab 502, the upper left tabs 504, and the upper right tabs 508.

As previously described in FIG. 7, three linkage arms 518 are coupled together to form the equilateral triangle assembly. In one embodiment, the linkage arms 518 are coupled together using tab holes and fasteners such as bolts. In other embodiments, such as for a permanent frame arrangement, the linkage arms 518 may be welded.

Referring next to FIG. 9, a perspective view of a second exemplary linkage arm 900 is shown. Shown are a truss member 500, the lower left tab 502, the upper left tab 504, the lower right tab 506, the upper right tab 508, the upper chord 510, the lower chord 512, the plurality of diagonal members 514, and two vertical end chords 516.

The second exemplary linkage arm 900 includes the same elements and layout as the first exemplary linkage arm 518, but in the embodiment of FIG. 9 the truss member 500 is a built-up member comprises of separate plates or other suitable truss elements that are fastened together. In the second linkage arm 900 shown in FIG. 9, the top and bottom chords comprise a U-shaped cross-section configured to receive the diagonals and ends chords between the legs of the U-shape and couple the diagonals and chords to the top and bottom chords by fastening through the legs of the U-shape. The second linkage arm 900 includes four diagonals 514, but other numbers of diagonals 514 may be used. The top and bottom chords also include optional lateral slots in the legs of the U-shape. The lateral slots reduces the second linkage arm 900 weight, allowing a thicker plate to be used than for a linkage arm without the lateral slots.

The tabs for the second linkage arm 900 are the same as for the first linkage arm 518, but are located in different locations relative to the truss member 500. The left tabs 502, 504 of the second linkage arm 900 extend outward from the front side of the chords. The upper left tab 504 again includes the horizontal portion for coupling to the rotor assembly 108. The right tabs of the second linkage arm 900 extend outward from the rear side of the second linkage arm 900.

Referring next to FIG. 10, a plan view of the second linkage arm 900 of FIG. 9 is shown. Shown are the truss member 500, the upper left tab 504, the upper right tab 508, and the upper chord 510.

The tabs 502, 405, 506, 508 are coupled to the truss member 500 and extend outward, as previously described in FIGS. 5 and 6.

Figure 11:
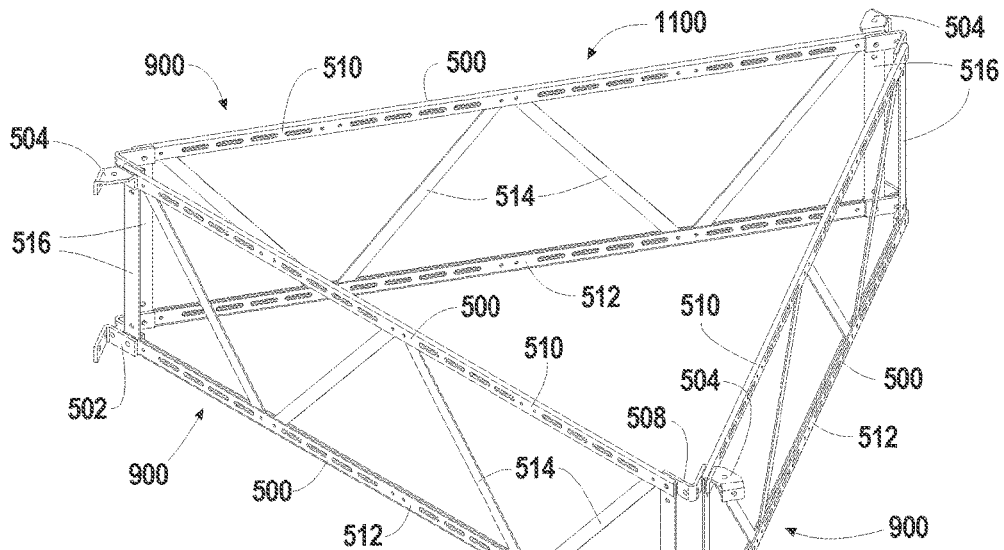
FIG. 11 is a perspective view of a second linkage arm triangle assembly.

Referring next to FIG. 11, a perspective view of a second linkage arm triangle assembly 1100 is shown. Shown are the plurality of truss members 500, the lower left tabs 502, the upper left tabs 504, the lower right tabs 506, the upper right tabs 508, the upper chords 510, the lower chords 512, the plurality of diagonal members 514, the vertical end chords 516, and the plurality of second linkage arms 900.

Figure 12:
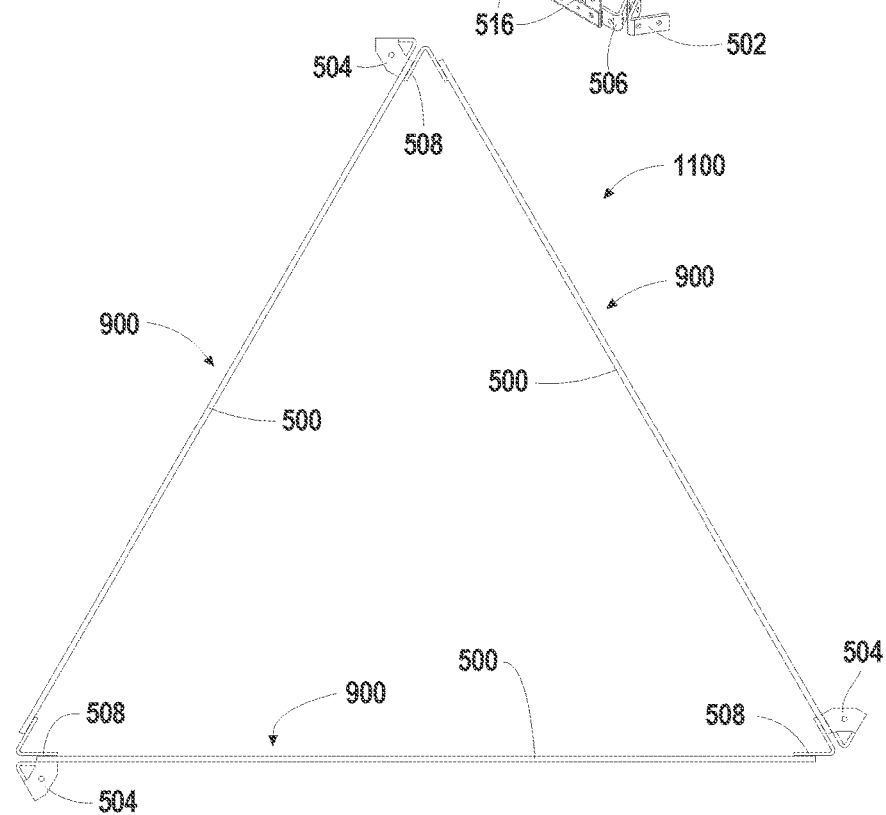
FIG. 12 is a plan view of the second linkage arm triangle assembly.

Referring next to FIG. 12, a plan view of the second linkage arm triangle assembly 1100 is shown. Shown are the plurality of second linkage arms 900, the plurality of truss members 500, the upper left tabs 504, and the upper right tabs 508.

As with the first triangle assembly of FIGS. 7 and 8, the second linkage arms 900 are coupled together end-to-end to form the assembly in the equilateral triangle shape. The method of coupling the second arms 900 using the tabs is similar to that previously shown in FIGS. 7 and 8, with the exception that the right tabs 508 are in the interior of the triangle assembly and are used to couple the second linkage arms 900 together to form the second triangle assembly, and the left tabs 504 are on the outside of the second triangle assembly and are used to couple one triangle assembly to a different triangle assembly.

Figure 13:
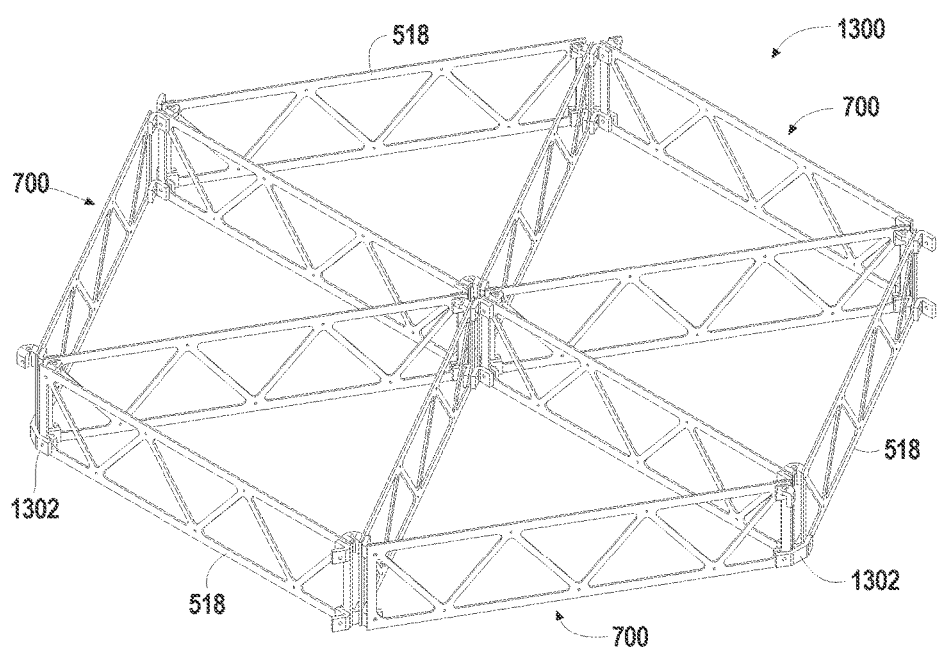
FIG. 13 is a perspective view of an exemplary hexagon assembly including three first linkage arm triangle assemblies.

Referring next to FIG. 13, a perspective view of an exemplary hexagon assembly 1300 including three first linkage arm triangle assemblies 700 is shown. The plurality of first linkage arms 518, and a plurality of plate connectors 1302.

In the embodiment of FIG. 13 the triangle assemblies are first linkage arm triangle assemblies 700, but it will be understood that other embodiments of the triangle assemblies (e.g. the second linkage arm triangle assemblies 1100) may also be used.

Vertexes of three first linkage arm triangle assemblies 700 are coupled together. Each outer vertex is coupled to the proximate outer vertex of the adjacent triangle assembly 700 with the additional first linkage arm 518, whereby the perimeter of the hexagon assembly 1300 forms the shape of a hexagon with six interior triangles. The center of the hexagon assembly 1300 includes the three upper left tabs 504, which are configured to couple to the rotor assembly 108, as described further below. Additional linkage arms 518 may then be coupled to the perimeter members of the hexagon assembly 1300 in triangle and/or hexagon configuration to form the desired layout of the rotor support frame.

The linkage arms 518 are typically connected to each other by the tabs 502, 504, 506, 508 as previously described, but for outer connections where the frame is not coupled to additional linkage arms, the plate connector 1302 coupling the outside faces of two adjacent linkage arms 518 at an approximately 120 degree angle is shown. The plate connectors 1302 are shown coupling the bottom chords 512, but the plate connectors 1302 may also be used at the top chords 510.

Figure 14:
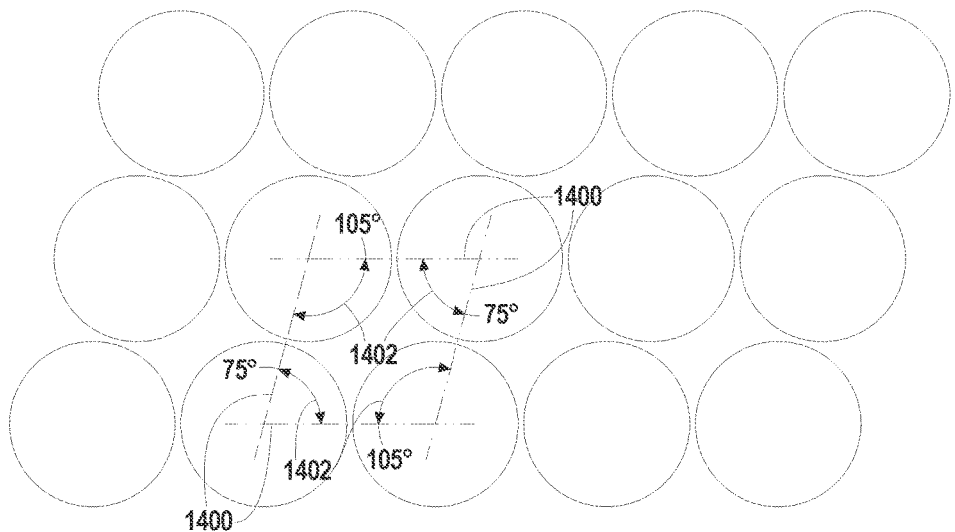
FIG. 14 is a schematic plan view of an exemplary diamond grid layout.

Referring next to FIG. 14, a schematic plan view of an exemplary diamond grid layout is shown. Shown are the rotor shadow extents 400, a plurality of gridlines 1400, and a plurality of grid angles 1402.

As an alternative to the equilateral triangular grid layout shown in FIG. 4, the diamond grid layout may be utilized. In the diamond grid layout, the gridlines 1400 formed by connection the centers of the rotor shadow extents 400 form diamond shapes with interior grid angles 1402 of 105 degrees and 75 degrees. Other angle sizes may be used (e.g. 80 degrees and 100 degrees).

Figure 15:
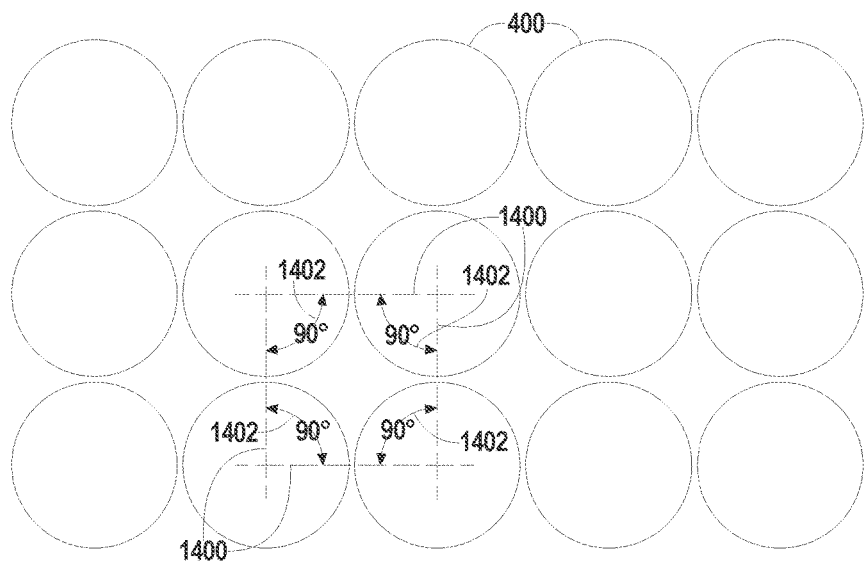
FIG. 15 is a schematic plan view of an exemplary square grid layout.

Referring next to FIG. 15, a schematic plan view of an exemplary square grid layout is shown. Shown are the rotor shadow extents 400, the plurality of gridlines 1400, and the plurality of grid angles 1402.

An embodiment of the diamond grid layout where the interior grid angles 1402 are all 90 degrees results in the square grid layout, where the centers of the rotor shadow extents 400 form gridlines 1400 that are perpendicular to each other.

It will be appreciated that while typically the distance between gridlines 1400 is chosen to minimize the distance between rotor centers, larger distances may be chosen for one or more sets of gridlines 1400. For example, the grid angle 1402 between the vertical and horizontal gridlines 1400 of FIG. 15 could be increased, forming a rectangular grid instead of a square grid.

Frame layouts such as the triangular grid and the diamond grid resist twisting of the frame and are conducive to plate design for the linkage arms 118, but are high in thrust shadow, with 6 and 4 linkage arms 118 within the rotor shadow, respectively. A hexagon grid (as shown below in FIGS. 23 and 24) reduces the linkage arm thrust shadow number to 3, but the hexagon grid is more susceptible to twisting forces and is not suited to linkage arms 118 comprising plates. Diamond and hexagon linkage arms 118, shown below in FIGS. 25-30, provide resistance against twisting but increase the thrust shadow. Ideal structural frame configurations resist anticipated forces on the structural frame while minimizing the thrust shadow (i.e. reduce blockage of the air stream).

Figure 16:
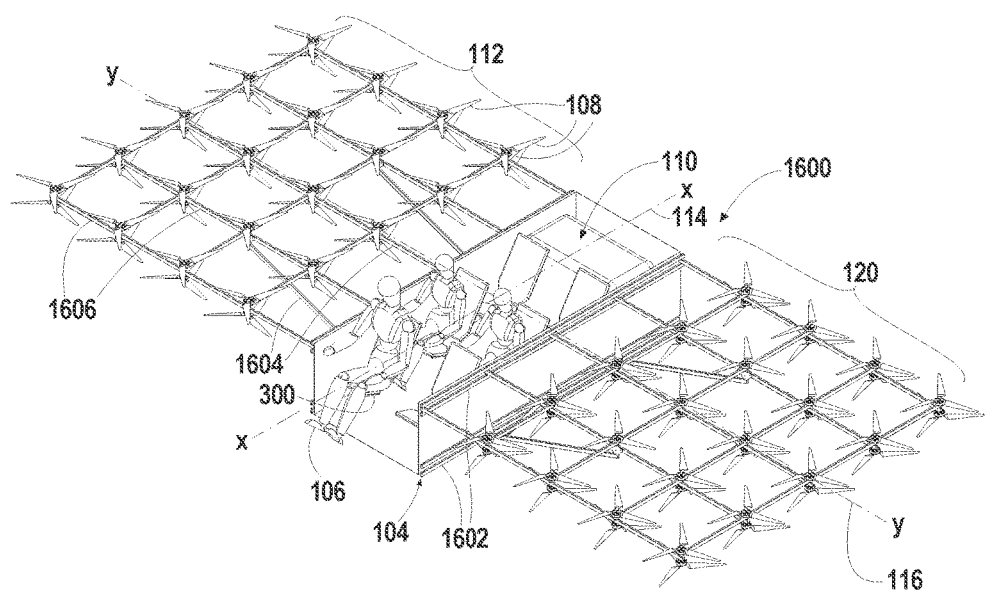
FIG. 16 is a perspective view of a pivoting square grid multirotor flying vehicle in another embodiment of the invention.

Referring next to FIG. 16, a perspective view of an embodiment of a pivoting square grid multirotor flying vehicle 1600 is shown. Shown are the fuselage 104, the user 106, the plurality of rotor assemblies 108, the power assembly 110, the left rotor support frame 112, the x-axis 114, the y-axis 116, the right rotor support frame 120, a plurality of pivot rails 1602, a plurality of pivot support struts 1604, and a plurality of pivoting linkage arms 1606.

In the embodiment of FIG. 16, the fuselage 104 is designed to be a general box shape with closed walls on a lateral side, a rear side, and a base side. The base wall (floor) may also serve as a landing surface.

The fuselage 104 includes the pivot rails 1602 coupled to each side wall of the fuselage 104, one each proximate to the top of the side wall and the bottom of the side wall, for a total of four side rails. The pivoting linkage arms 1606 coupled to the fuselage 104 are pivotally coupled to the support rails for rotation in the horizontal plane.

In the embodiment of FIG. 16, rotor assemblies 108 are again located the grid intersection locations (i.e. at the corners of the square grid layout. The rotor assemblies 108 may be coupled to only a top side of the rotor support frame, as shown in FIG. 1, or may be coupled to a top side and a bottom side of the rotor support frame as shown in FIG. 16, resulting in two rotors per grid intersection.

As with the previous grid embodiments, the grid size is directly related to the rotor diameter, i.e. the grid unit dimension is generally equal to the tip-to-tip rotor size plus the rotor tip clearance dimension.

Figure 17:
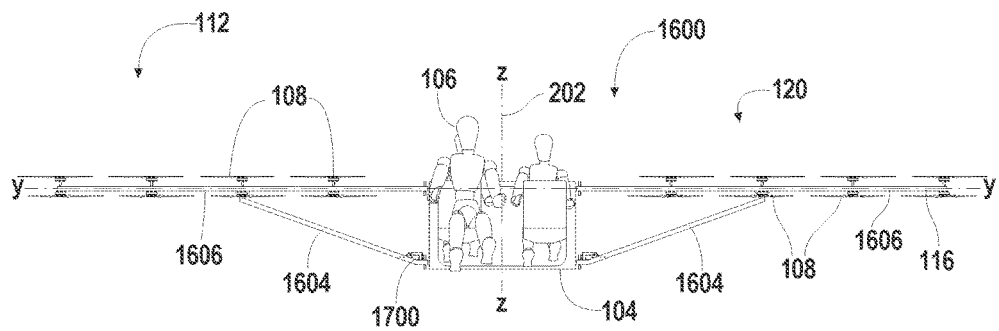
FIG. 17 is a front elevational view of the pivoting square grid multirotor flying vehicle.

Referring next to FIG. 17, a front elevational view of the pivoting square grid multirotor flying vehicle 1600 of FIG. 16 is shown. Shown are the fuselage 104, the user 106, the plurality of rotor assemblies 108, the left rotor support frame 112, the y-axis 116, the right rotor support frame 120, the z-axis 202, the plurality of pivoting linkage arms 1606, the plurality of pivot rails 1602, and the plurality of pivot support struts 1604, and a plurality of pivot actuator struts 1700.

Figure 18:
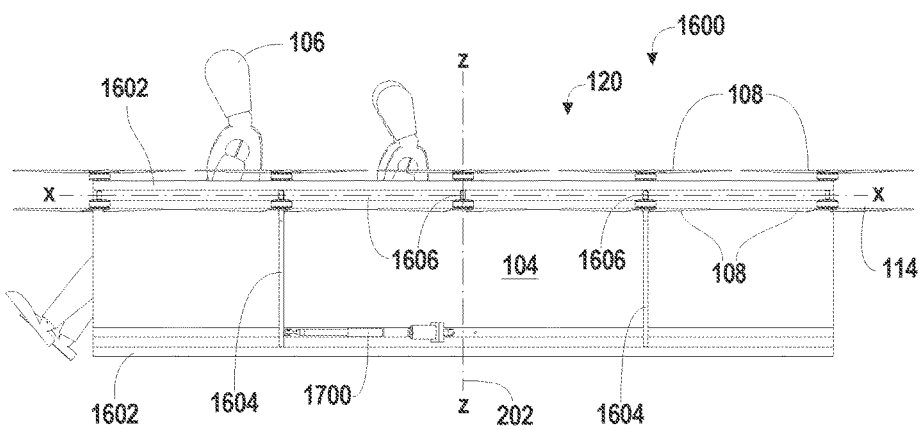
FIG. 18 is a right elevational view of the pivoting square grid multirotor flying vehicle.

Referring next to FIG. 18, a right elevational view of the pivoting square grid multirotor flying vehicle 1600 of FIG. 16 is shown. Shown are the fuselage 104, the user 106, the plurality of rotor assemblies 108, the right rotor support frame 120, the x-axis 114, the z-axis 202, the plurality of pivot rails 1602, the plurality of pivot support struts 1604, the plurality of pivoting linkage arms 1606, and the plurality of pivot actuator struts 1700.

As shown in FIGS. 17 and 18, the pivot support struts 1604 are pivotally coupled to one linkage arm 118 at an upper end of the pivot support strut 1604 and extend diagonally down to and are pivotally coupled to the pivot rail 1602 located at the lower portion of the fuselage 104. In the embodiment shown, four pivot support struts 1604 are included, two coupled to the left rotor frame 112 and two coupled to the right rotor frame 120. In other embodiments, more or fewer pivot supports struts 1604 may be included.

Two pivot support struts 1604, one coupled to each rotor support frame 112, 120, are each coupled to one pivot actuator strut 1700, the pivot actuator struts 1700 interposed between the pivot support strut 1604 and the lower pivot rail 1602. Each pivot actuator strut 1700 includes an actuator coupled to, and receiving power from, the power assembly 110. The pivot actuator strut 1700 and associated power source may be electrical, hydraulic, or pneumatic. The actuator is configured to lengthen and shorten the length of the pivot actuator strut 1700. The actuator is communicatively coupled to and operated by a control system of the vehicle 1600. One end of the pivot actuator strut 1700 is pivotally coupled to the pivot rail 1602, and the other end of the actuator is pivotally coupled to a middle portion of the pivot support strut 1604. In operation, the pivot actuator struts 1700, as controlled by the control system, lengthen and shorten, thereby moving the pivot support struts 1604 coupled to the pivot actuator struts 1700, whereby the connections of the rotor support frames 112, 120 are rotated, whereby the rotor support frames 112, 120 are horizontally pivoted with respect to the fuselage 104. Examples of resulting adjustment of the rotor support frames 112, 120 are shown below in FIGS. 19-22.

Figure 19:
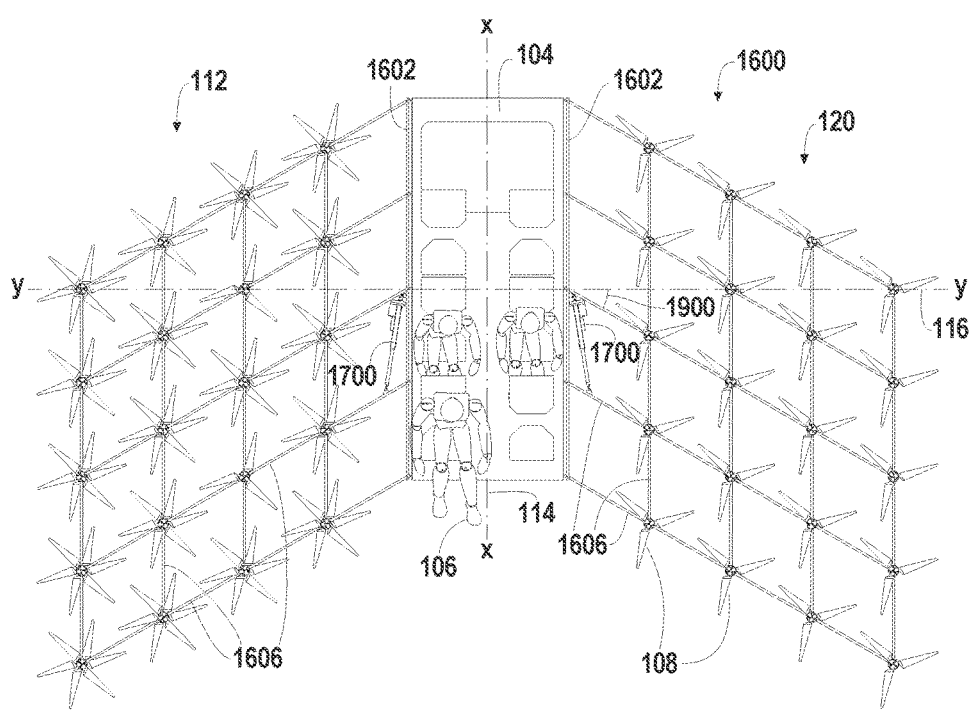
FIG. 19 is a plan view of the pivoting square grid multirotor flying vehicle with the left rotor support frame and the right rotor support frame both skewed forward.

Referring next to FIG. 19, a plan view of the pivoting square grid multirotor flying vehicle 1600, with the left rotor support frame 112 and the right rotor support frame 120 both skewed forward, is shown. Shown are the fuselage 104, the plurality of users 106, the plurality of rotor assemblies 108, the power assembly 110, the left rotor support frame 112, the z-axis 114, the y-axis 116, the plurality of pivoting linkage arms 1606, the right rotor support frame 120, the plurality of seats 300, the pivot rails 1602, the plurality of pivoting linkage arms 1606, the plurality of pivot actuator struts 1700, and a horizontal skew angle 1900.

In the forward skew position shown in FIG. 19, the pivot actuator struts 1700 have been lengthened, rotating the pivot supports struts 1604, and thereby the pivoting linkage arms 1606 coupled to the pivot rails 1602, in a forward angle with respect to the y-axis 116: the horizontal skew angle 1900. The rotor support frames 112, 120 are kept in the horizontal plane, i.e. there is no movement in the vertical (z) direction. The rotor support frames 112, 120 are shown skewed forward but the rotor support frames 112, 120 may be skewed to the rear as well.

Figure 20:
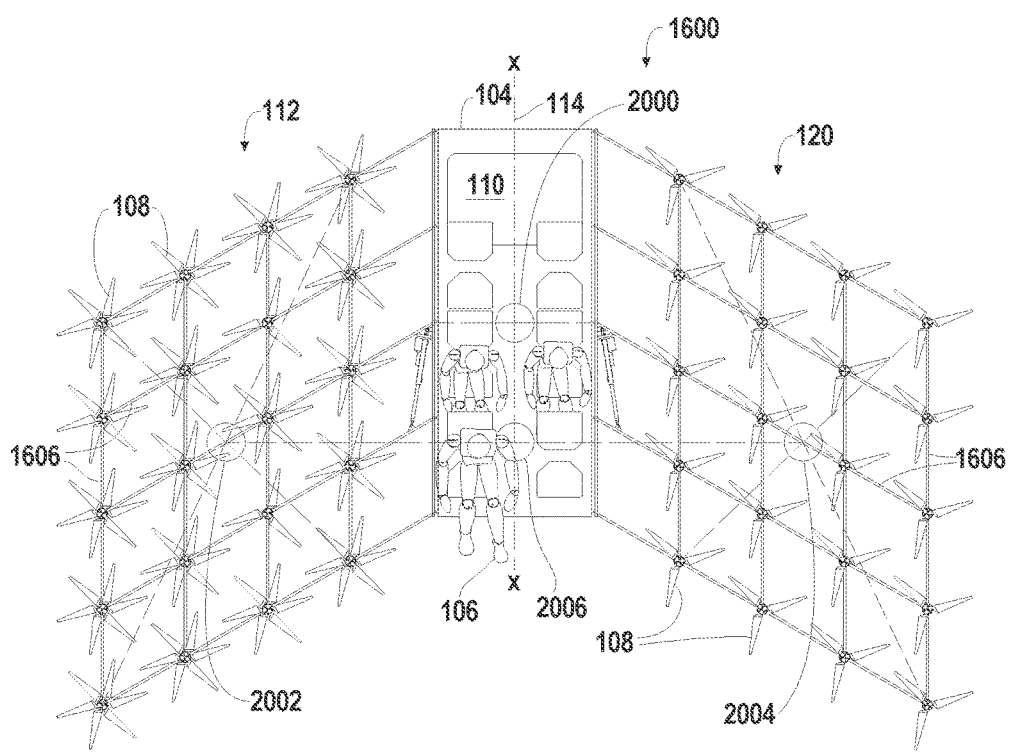
FIG. 20 is a plan view of the pivoting square grid multirotor flying vehicle with the left rotor support frame and the right rotor support frame both skewed forward and showing lift centers.

Referring next to FIG. 20, a plan view of the pivoting square grid multirotor flying vehicle 1600, with the left rotor support frame 112 and the right rotor support frame 120 both skewed forward and showing lift centers, is shown. Shown are the fuselage 104, the users 106, the plurality of rotor assemblies 108, the power assembly 110, the left rotor support frame 112, the y-axis 116, the plurality of pivoting linkage arms 1606, the right rotor support frame 120, a fuselage center of gravity 2000, a left rotor center of lift 2002, a right rotor center of lift 2004, and a total center of lift 2006.

FIG. 20 shows how the skewing of the rotor support frames 112, 120 affects the relationship of the total center of lift 2006 to the center of gravity 2000 of the fuselage 104. With both rotor support frames 112, 120 skewed forward equal amounts as shown in FIG. 20, the total center of lift 2006 is located forward of the center of gravity 2000 but both are still aligned on the y-axis 116.

Figure 21:
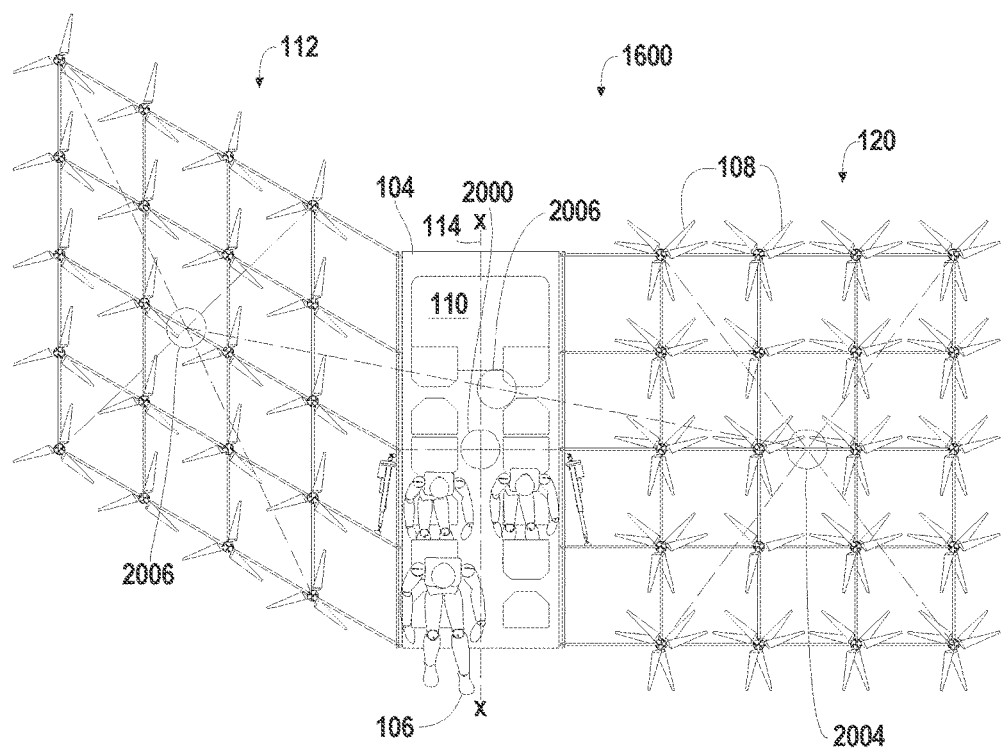
FIG. 21 is a plan view of the pivoting square grid multirotor flying vehicle with the left rotor support frame skewed rearward and showing lift centers.

Referring next to FIG. 21, a plan view of the pivoting square grid multirotor flying vehicle 1600, with the left rotor support frame 112 skewed rearward and showing lift centers, is shown. Shown are the fuselage 104, the users 106, the plurality of rotor assemblies 108, the power assembly 110, the left rotor support frame 112, the y-axis 116, the plurality of pivoting linkage arms 1606, the right rotor support frame 120, a fuselage center of gravity 2000, a left rotor center of lift 2002, a right rotor center of lift 2004, and a total center of lift 2006.

As shown in FIG. 21, the left rotor support frame 112 has been skewed rearward while the right rotor support frame 120 is unskewed. While the location of the center of gravity 2000 remains unchanged and location on the y-axis 116, the total center of lift 2006 has moved to a location rearward and rightward of the center of gravity 2000. The result is the off-axis total center of lift 2006 as shown in FIG. 21, inducing unbalancing of the vehicle and inducing pitch and roll for use in vehicle control by a flight controller or balancing an off-balance vehicle due to load imbalance.

Figure 22:
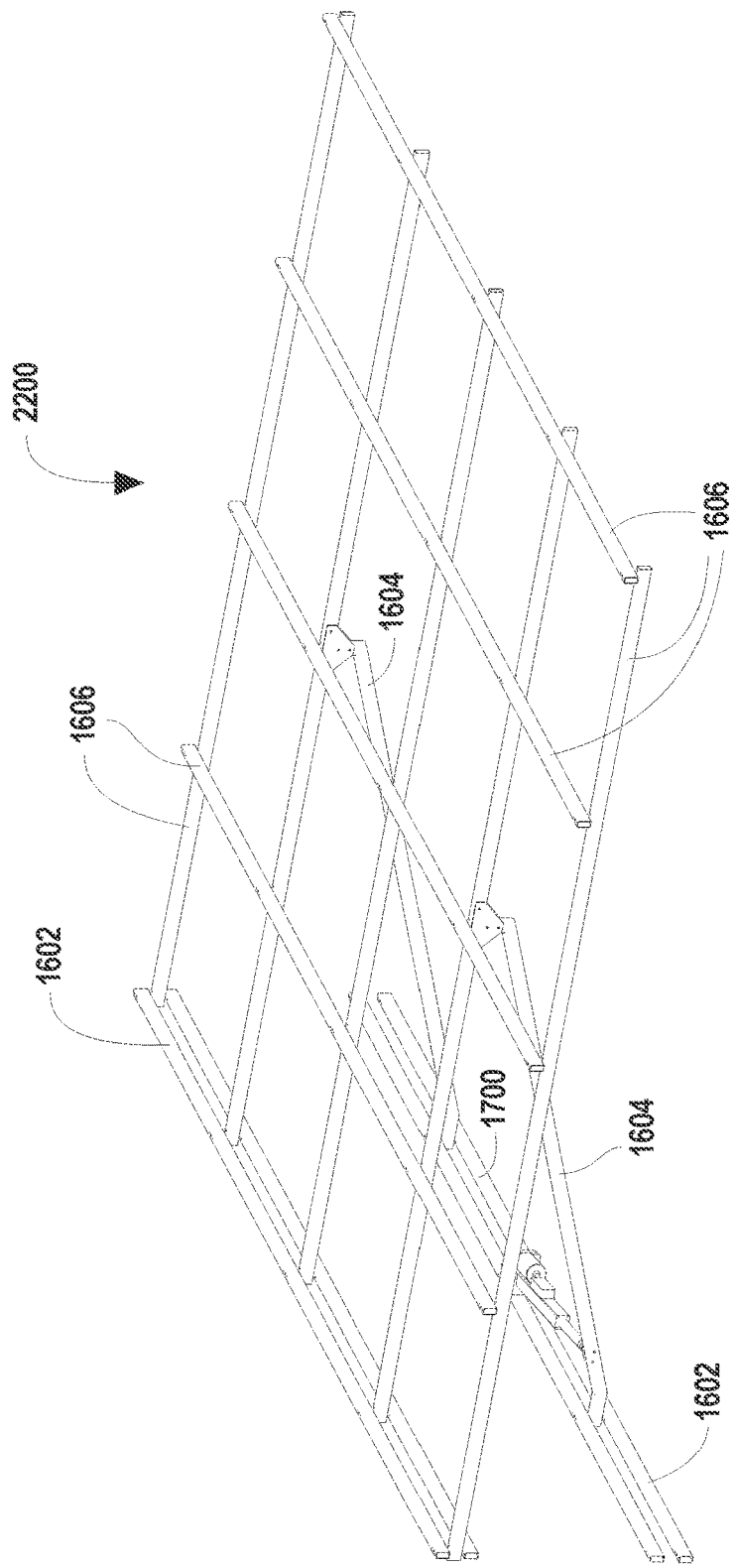
FIG. 22 is a perspective view of an exemplary right pivoting rotor support frame in one embodiment of the present invention.

Referring next to FIG. 22, a perspective view of an exemplary right pivoting rotor support frame 2200 is shown. Shown are the plurality of pivoting linkage arms 1606, the plurality of pivot rails 1602, the plurality of pivot support struts 1604, and the pivot actuator struts 1700.

The exemplary rotor support frame 2200 is comprised of pivoting linkage arms 1606 that extend the length or width of the rotor support frame, in lieu of the linkage arms 118 of the triangular system previously described, wherein the linkage arms 118 span only from connection point to connection point. The pivoting linkage arms 1606 in the x-direction are overlaid with the pivoting linkage arms 1606 in the y-direction, and pivoting connections are made where the x-direction pivot arms cross the y-direction pivot arms, forming the square grid with hinged intersections that are configured to skew in the x-y plane. The continuous y-direction pivot linkage arms 1606 are then pivotally coupled to the pivot rail 1602 as previously described. The coupling of the pivot support struts 1604 to the rotor support frame 112, 120 in this example include a pivot bracket coupled to an underside of the y-direction pivot linkage arm 1606, which in turn is pivotally coupled to the pivot support strut 1604.

The square rotor support frame configuration such as that shown in FIGS. 16-22 provides low thrust shadow, with only two to four arms located within the thrust shadow for each rotor. The lengths of the pivoting linkage arms 1606, which extend the length of the rotor support frame, provide additional strength over the end-to-end connected linkage arms 118 of the triangular grid layout. Additional cross-bracing may be provided in the horizontal axis in lieu of an increased pivot linkage arm cross section. Pivot linkage arms 1606 may vary in geometry and material in order to optimize strength/weight characteristics for a given frame layout geometry.

Figure 23:
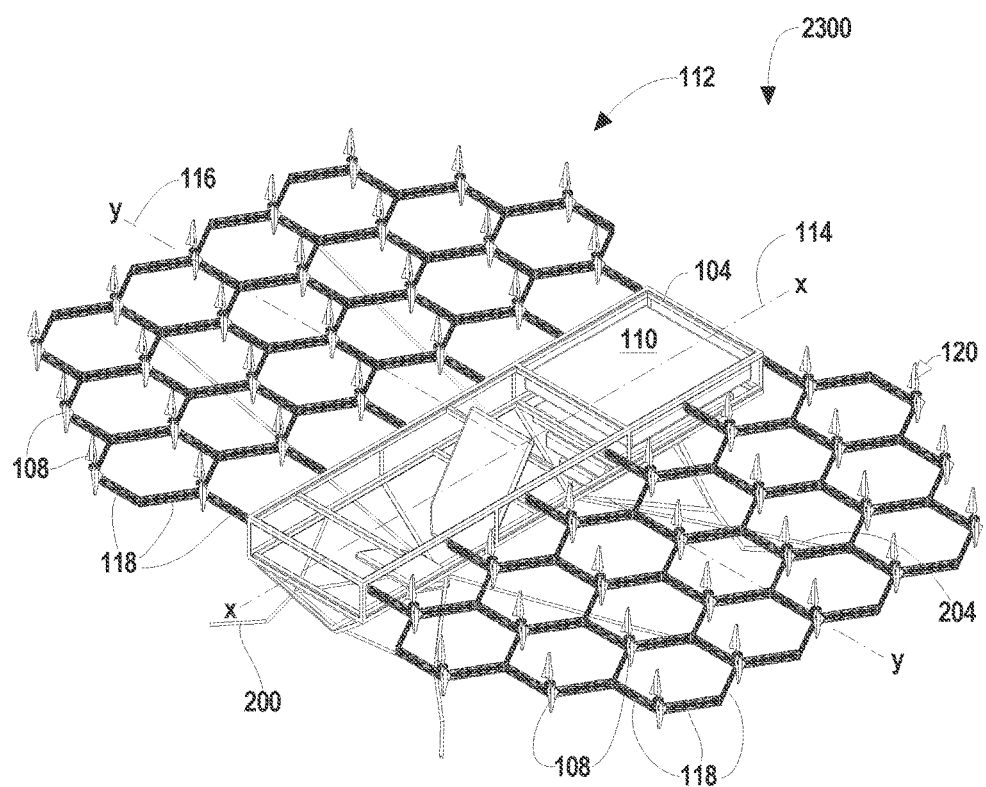
FIG. 23 is a perspective view of a first embodiment of a hexagon grid multirotor flying vehicle.

Referring next to FIG. 23, a perspective view of a first embodiment of a hexagon grid multirotor flying vehicle 2300 is shown. Shown are the fuselage 104, the plurality of rotor assemblies 108, the power assembly 110, the left rotor support frame 112, the x-axis 114, the y-axis 116, the plurality of linkage arms 118, the right rotor support frame 120, landing gear 200, and support struts 204.

In an alternate rotor support frame embodiment, the linkage arms 118 span from vertex to vertex and are arranged in hexagonal grid, i.e. with three linkage arms 118 coupled together at each vertex. In comparison, the triangular grid has six linkage arms 118 coupled together at each vertex. As with the triangular grid embodiment, the rotor assemblies 108 are coupled to the linkage arm vertexes. As with the triangular grid embodiment, linkage arms 118 proximate to the fuselage 104 are coupled to and supported by the fuselage 104, and diagonal support struts 204 provide additional support for the rotor support frames 112, 120. The linkage arms 118 may be of the configurations previously described in FIGS. 5-12, if the structural properties are suitable for strength and serviceability requirements of the hexagonal arrangement, although typically the hexagonal grid requires additional torsional and buckling resistance. Linkage arm designs with greater torsional and buckling resistance are described further below.

The first hexagon grid multirotor flying vehicles 2300 includes rotor assemblies 108 located at every other grid intersection, but rotor assemblies 108 located at every grid intersection, with appropriate reduction in rotor width, may also be permitted.

Figure 24:
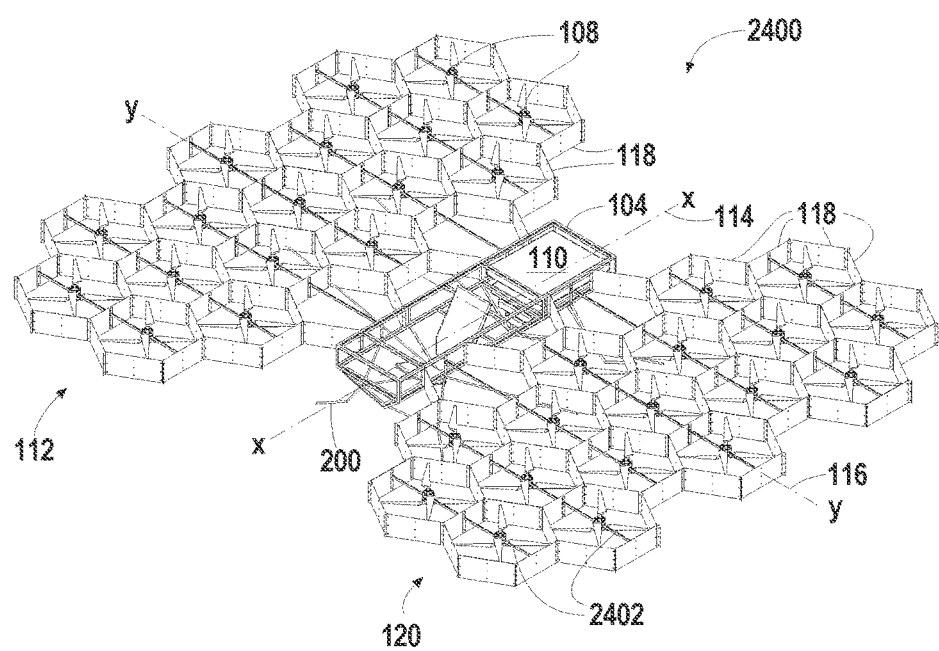
FIG. 24 is a perspective view of a second embodiment of a hexagon grid multirotor flying vehicle.

Referring next to FIG. 24, a perspective view of a second embodiment of a hexagon grid multirotor flying vehicle 2400 is shown. Shown are the fuselage 104, the plurality of rotor assemblies 108, the power assembly 110, the left rotor support frame 112, the x-axis 114, the y-axis 116, the plurality of linkage arms 118, the right rotor support frame 120, landing gear 200, and a plurality of hexagon struts 2402.

In the embodiment shown, in lieu of linkage arms 118 that are of general truss configuration, solid plates may be used, the plates being rigidly coupled together at the linkage arm ends. The additional hexagon struts 2402 are oriented in the horizontal plane and span the interior of each hexagon shape formed by the linkage arms 118, providing additional strength and stability to the shape.

Rotor downwash drag (thrust shadow) minimization requires minimization of surface area subjected to rotor downwash. This can be achieved by a minimizing arm count subject to downwash, minimizing arm horizontal area subject to downwash obstruction, or a combination of both. The triangular grid frame layout allows thinner footprints (i.e. less thrust shadow area) for linkage arms 118, but six arms are within the rotor perimeter. For the hexagon layout, the structural requirements result in the linkage arms 118 with a larger footprint, but only three linkage arms 118 are located within the rotor perimeter.

Figure 25:
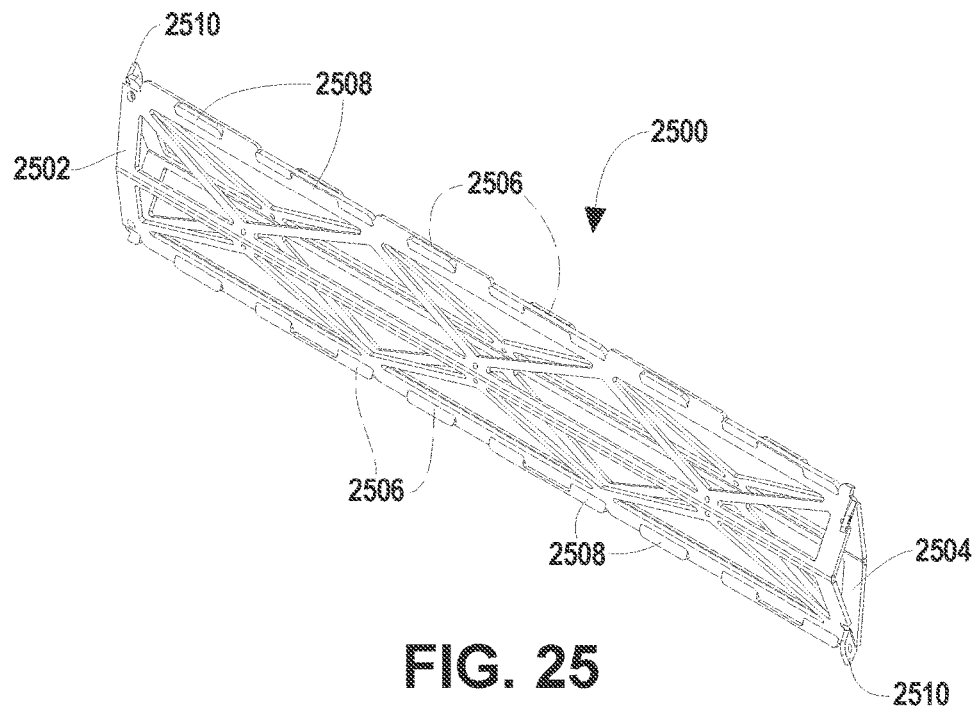
FIG. 25 is a perspective view of a diamond linkage arm.

Referring next to FIG. 25, a perspective view of a diamond linkage arm 2500 is shown in one embodiment of the present invention. Shown are a left truss portion 2502, a right truss portion 2504, a plurality of connection slots 2506, a plurality of connection tabs 2508, and a plurality of linkage arm connection tabs 2510.

The exemplary diamond linkage arm 2500 includes the left truss portion 2502 coupled to the right truss portion 2504 such that the cross section of the diamond linkage arm 2500 is a general diamond shape, with the height of the cross section exceeding the width of the cross-section. Each truss portion 2502, 2504 is formed from a generally rectangular plate. Each truss portion 2502, 2504 has a plurality of triangular cutouts such that the plate is configured as a truss. Each truss portion 2502, 2504 includes the diamond linkage arm connection tabs 2510 at each end of the diamond linkage arm 2500. The linkage arm connection tabs 2510 are configured to couple the end of the diamond linkage arm 2500 to the end of a different diamond linkage arm 2500.

The truss portions 2502, 2504 are bent at the longitudinal midpoint of the truss portion, such that a top portion of the truss portion is bent at an angle relative to a bottom portion of the truss portion. When the top edge of the left truss portion 2502 is coupled to the tog edge of the right truss portion 2504, and the bottom edge of the left truss portion 2502 is coupled to the bottom edge of the right truss portion 2504, the diamond shape is formed. Each truss portion 2502, 2504 includes alternating tabs and slots 2506 along the top edge and the bottom edge. The tabs 2508 and slots 2506 are configured such that folded tabs 2508 from the right truss portion 2504 are inserted into the slots 2506 of the left truss portion 2502, and the folded tabs 2508 of the left truss portion 2502 are inserted in to the slots 2506 of the right truss portion 2504. In other embodiments the tabs 2508 are folded after insertion.

Figure 26:
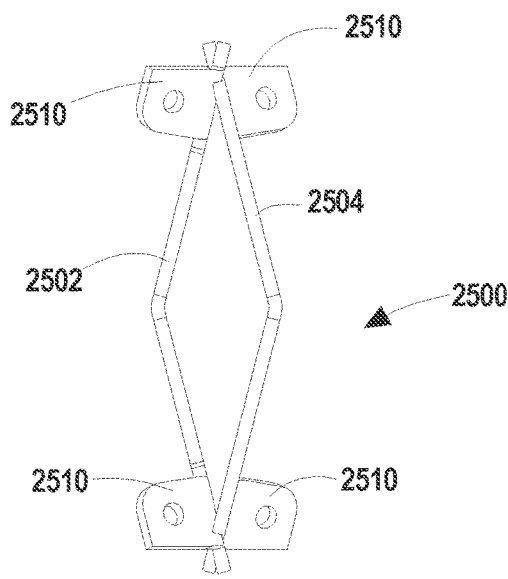
FIG. 26 is an end view of the diamond linkage arm.

Referring next to FIG. 26, an end view of the diamond linkage arm 2500 is shown. Shown are the left truss portion 2502, the right truss portion 2504, and the plurality of linkage arm connection tabs 2510.

As previously described, the connection of the right truss portion 2504 to the left truss portion 2502 forms the diamond cross-sectional shape. The linkage arm connection tabs 2510 at each end of the diamond linkage arm 2500 are configured to connect to adjacent diamond linkage arms 2500.

Figure 27:
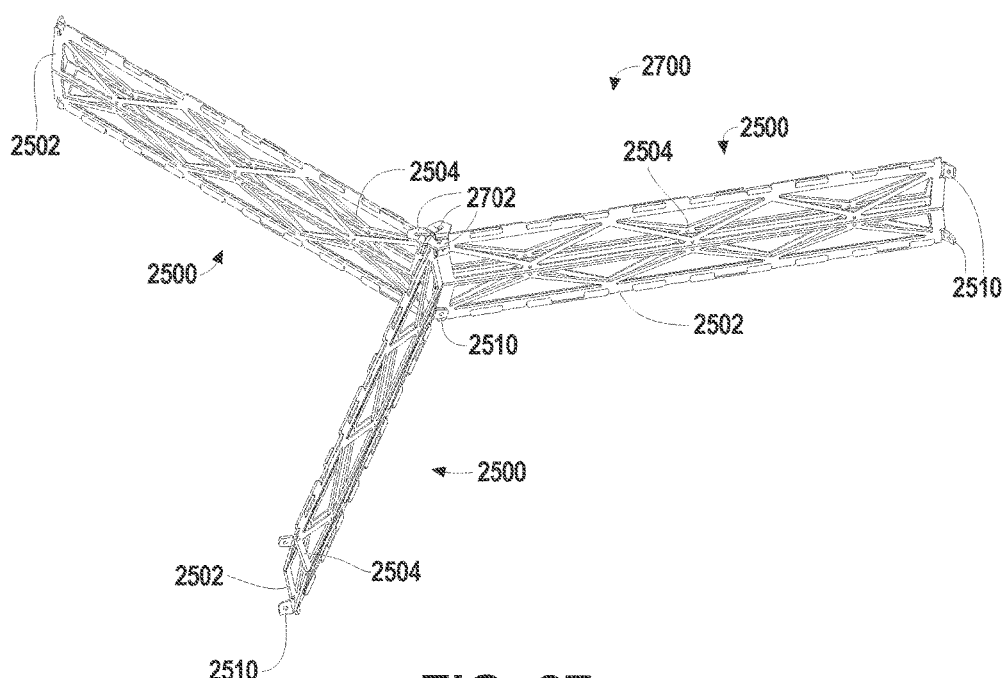
FIG. 27 is a perspective view of a first hexagon linkage arm assembly.

Referring next to FIG. 27, a perspective view of a first hexagon linkage arm assembly 2700 is shown in one embodiment of the present invention. Shown are the plurality of diamond linkage arms 2500, the plurality of left truss portions 2502, the plurality of right truss portions 2504, the plurality of linkage arm connection tabs 2510, and rotor assembly tabs 2702.

In order to form the hexagonal frame structure as shown in FIG. 23, the ends of three diamond linkage arms 2500 are coupled together to form a Y-configuration, with equal angles between the diamond linkage arms 2500. The diamond linkage arms 2500 include the rotor assembly tabs 2702 located at the vertex of the hexagon linkage arm assembly 2700 and configured to couple to and support the rotor assembly 108.

The hexagon linkage arm assembly 2700, when coupled to additional hexagon linkage arm assemblies 2700, forms the hexagonal frame structure shown in FIG. 23.

Figure 28:
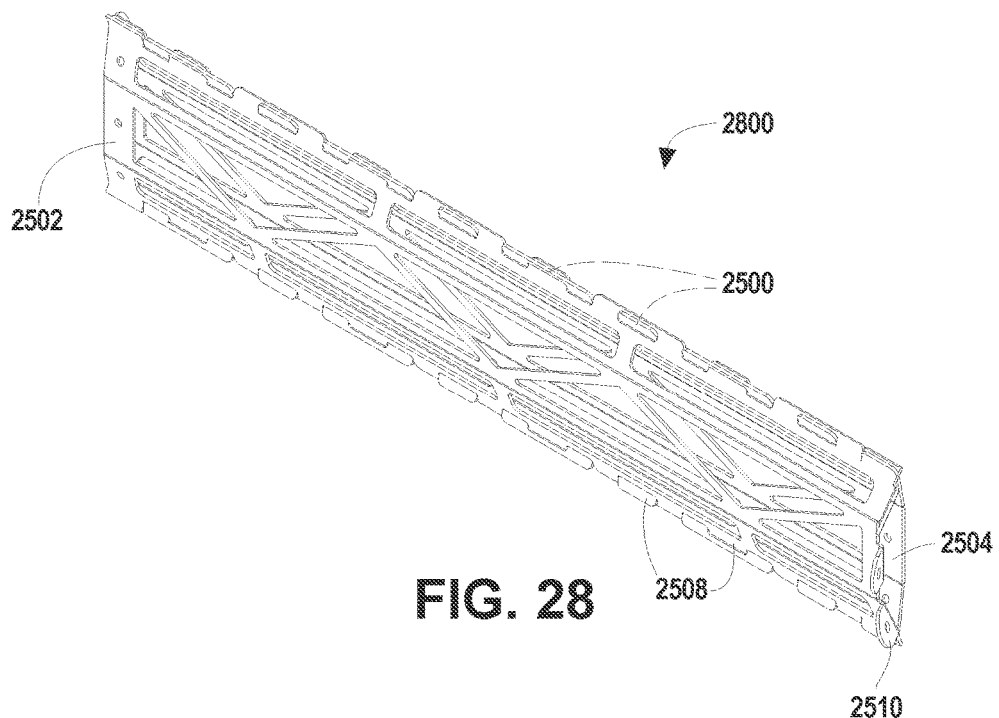
FIG. 28 is a perspective view of a hexagon linkage arm.

Referring next to FIG. 28, a perspective view of a hexagon linkage arm 2800 is shown in another embodiment of the present invention. Shown are the left truss portion 2502, the right truss portion 2504, the plurality of connection slots 2506, the plurality of connection tabs 2508, and the plurality of linkage arm connection tabs 2510.

The hexagon linkage arm 2800 is similar to the diamond linkage arm 2500, with the exception of the truss portions 2502, 2504 being bent twice, so that the cross section of each portion includes a vertical portion in the middle and a top portion and a bottom portion at an angle relative to the vertical portion. As a results, when coupled together the hexagon linkage arm cross section is a hexagon shape, where the height of the hexagon is greater than the width of the hexagon.

Figure 29:
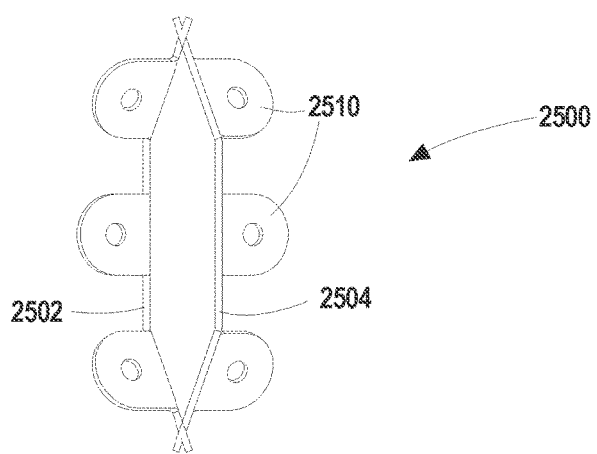
FIG. 29 is an end view of the hexagon linkage arm.

Referring next to FIG. 29, an end view of the hexagon linkage arm 2800 is shown. Shown are the left truss portion 2502, the right truss portion 2504, and the plurality of linkage arm connection tabs 2510.

In the embodiment shown, the hexagon linkage arm 2800 includes six linkage arm connection tabs 2510 at each end, as compared to the four linkage arms connection tabs 2510 of the diamond linkage arm 2500 embodiment.

Figure 30:
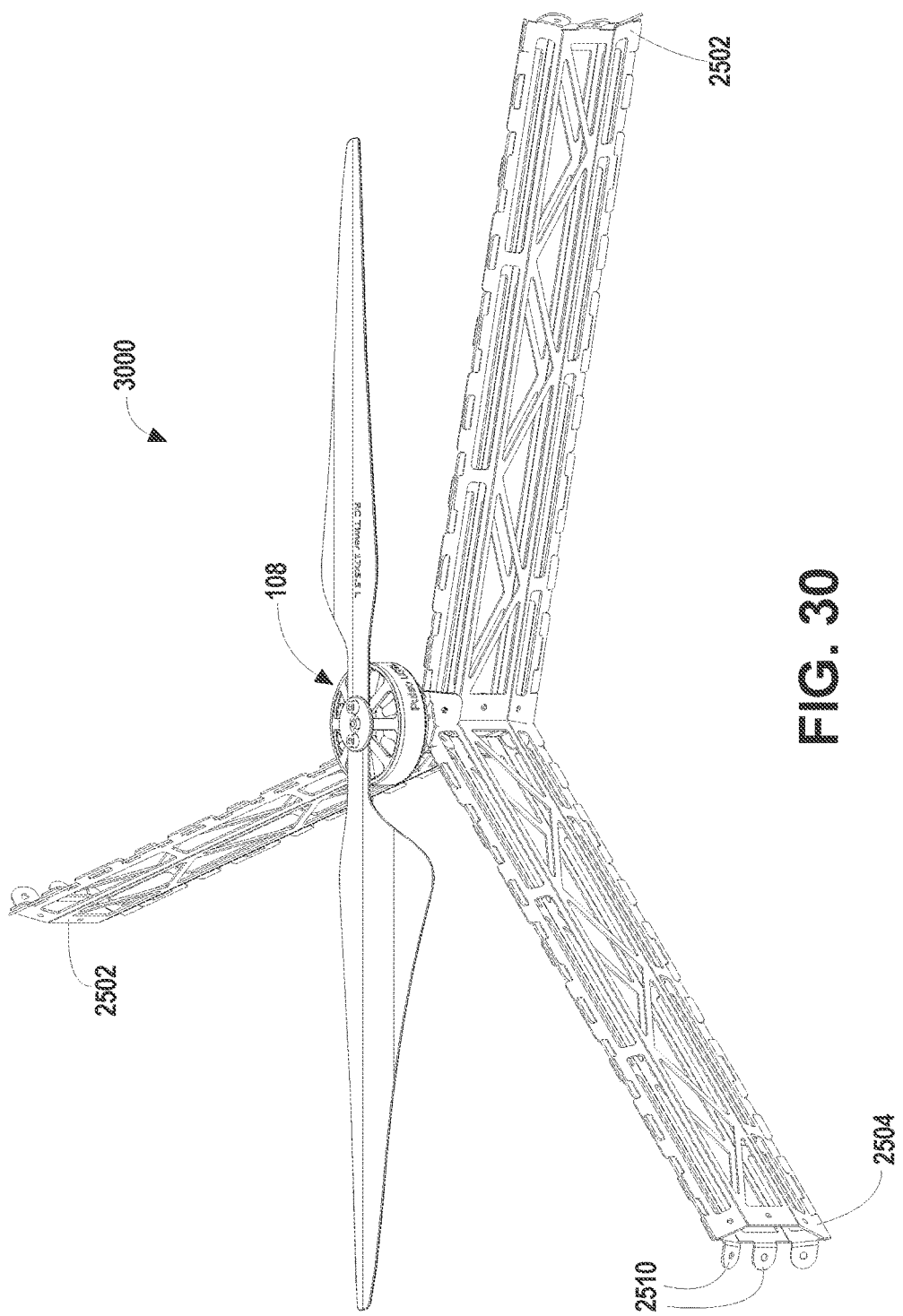
FIG. 30 is a perspective view of a second hexagon linkage arm assembly.

Referring next to FIG. 30, a perspective view of a second hexagon linkage arm assembly 3000 is shown in one embodiment of the present invention. Shown are the plurality of hexagon linkage arms 2800, the plurality of left truss portions 2502, the plurality of right truss portions 2504, the plurality of linkage arm connection tabs 2510, and the rotor assembly 108.

The hexagon linkage arms 2800 are coupled in the Y-configuration as with the diamond linkage arms 2500, using the linkage arm connection tabs 2510. The rotor assembly 108 is coupled to the intersection of the assembly as shown, using rotor assembly tabs 2702 or other suitable connection.

Figure 31:
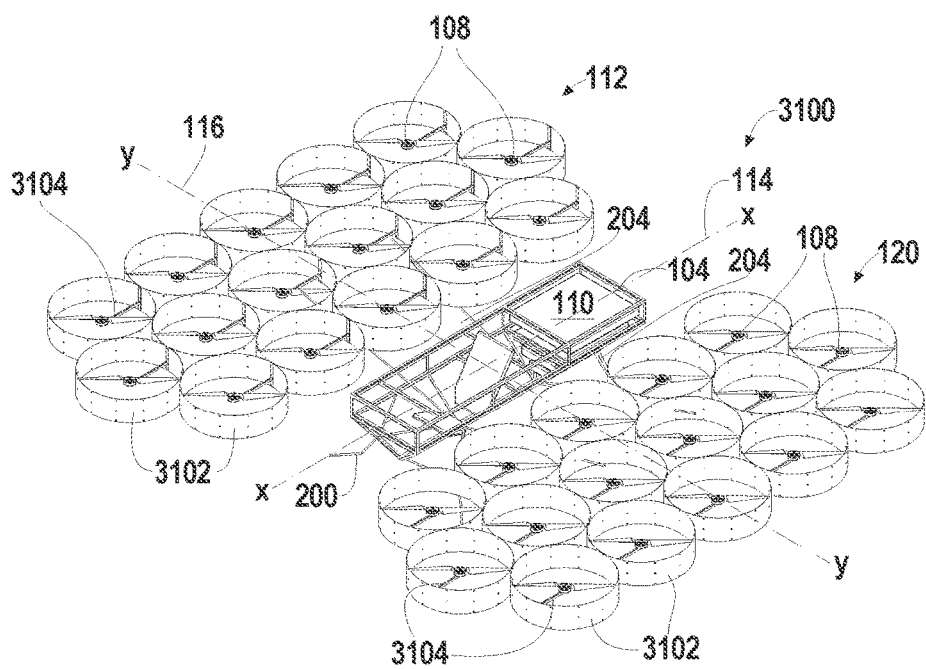
FIG. 31 is a perspective view of an embodiment of a circle grid multirotor flying vehicle.

Referring next to FIG. 31, a perspective view of an embodiment of a circle grid multirotor flying vehicle 3100 is shown. Shown are the fuselage 104, the plurality of rotor assemblies 108, the power assembly 110, the left rotor support frame 112, the x-axis 114, the y-axis 116, the support struts 204, a plurality of rotor tubes 3102, and a plurality of horizontal struts 3104.

The circle grid embodiment comprised the plurality of shallow rotor tubes 3102 arrayed in a staggered horizontal grid layout and coupled to each other at the perimeter of the rotor tubes 3102. Each rotor assembly 108 is located at the center of each tube 3102 and is supported by the horizontal struts 3104 which extends inward from the perimeter of the rotor tube 3102 to the center of the tube 3102. The left rotor support frame 112 and the right rotor support frame 120 are coupled to the fuselage 104 by the support struts 204. Each rotor tube 3102 is sized to have a diameter slightly larger than the tip-to-tip rotor dimension.

Figure 32:
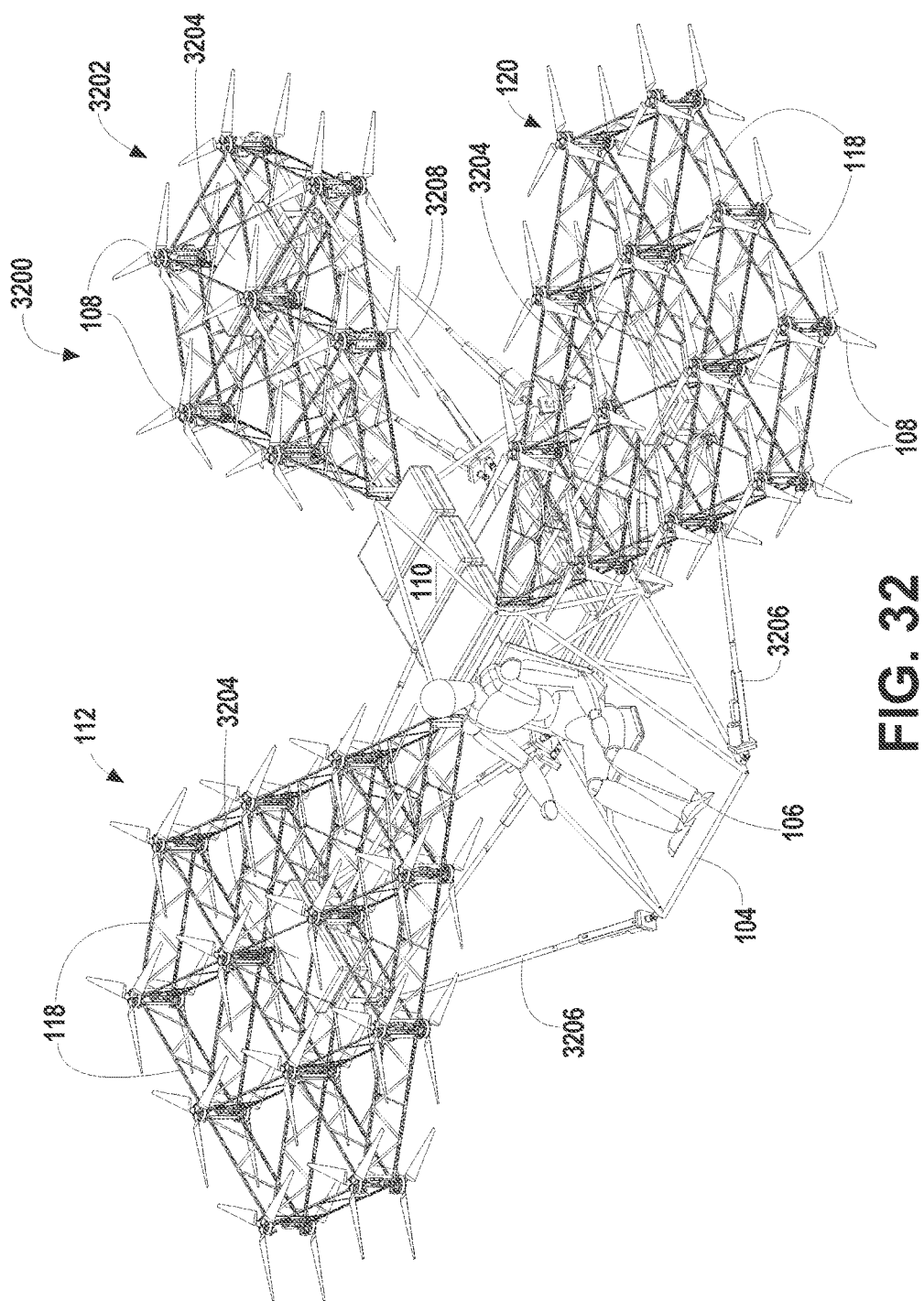
FIG. 32 is a perspective view of a tri-grid multirotor flying vehicle in another embodiment of the present invention.

Referring next to FIG. 32, a perspective view of an embodiment of a tri-grid multirotor flying vehicle 3200 in is shown. Shown are the fuselage 104, the user 106, the plurality of rotor assemblies 108, the power assembly 110, the left rotor support frame 112, the plurality of linkage arms 118, the right rotor support frame 120, a tail rotor support frame 3202, a plurality of auxiliary power assemblies 3204, and a plurality of actuator supports 3206.

As shown in FIG. 32-35, the rotor support frames 112, 120, 3202 are in a nonrotated position, i.e. the frames 112, 120, 3202 are generally in a horizontal plane.

The tri-grid multirotor flying vehicle 3200 includes the same basic elements of the triangular grid multirotor embodiment shown previously in FIGS. 1-13. The fuselage 104 has been modified to provide support points for the modified rotor support frames 112, 120, 3202, actuator supports 3206, and the auxiliary power assemblies 3204.

The left rotor support frame 112 and the right rotor support frame 120 are comprised of the linkage arms 118 in the triangular grid configuration as previously described, with each rotor assembly 108 coupled to a grid vertex location. In the tri-grid embodiment shown, the frame is configured to support rotors in a 2-3-4-3 row configuration, with the 2-rotor row proximate to the fuselage 104. The left rotor support frame 112 and the right rotor support frame 120 terminate at a single point at the fuselage 104 and are each pivotally coupled to the fuselage 104 at a single grid intersection. The termination at a single point allows each rotor support frame 112, 120, 3202 to rotate in three dimensions with respect to the fuselage 104.

The tail rotor support frame 3202 is comprised of the same triangular grid linkage arms 118 configuration as the left rotor support frame 112 and the right rotor support frame 120. The tail rotor support frame 3202 also terminates at a single point at the rear of the fuselage 104 and is pivotally coupled to the fuselage 104 at that point. The tail rotor support frame 3202 extends rearward from the fuselage 104 and is symmetric with respect to the x-axis 114 of the tri-grid multirotor flying vehicle 3200. The tail rotor in the present embodiment is configured to support rotors in a 2-3-2 row configuration.

The rotor support frames 112, 120, 3202 are also supported by the actuator supports 3206. The actuator supports 3206 comprise a strut and an in-line actuator and extend diagonally from the underside of one rotor support frame 112, 120 to a bottom portion of the fuselage 104. The actuator supports 3206 provide structural supports and also lengthen and contract, whereby the frames 112, 120, 3202 are rotated.

As shown in FIG. 32, each rotor support frame 112, 120, 3202 is coupled to the fuselage 104 via four actuator supports 3206. One end of each actuator supports 3206 is pivotally coupled to the fuselage 104, and an opposite end of each actuator supports 3206 is pivotally coupled to one rotor support frame 112, 120, 3202. As a result, by actuating the actuators include in each actuator supports 3206, each rotor support frame 112, 120, 3202 can be rotated in three dimensions with respect to the point connection of the rotor support frame 112, 120, 3202 to the fuselage 104. Various exemplary rotation configurations of the tri-grid multirotor flying vehicle 3200 are shown below in FIGS. 36-44.

The tri-grid multirotor flying vehicle 3200 includes rotor assemblies 108 coupled to the underside of the rotor support frames 112, 120, 3202, as well as the top side of the rotor support frames 112, 120, 3202. It will be understood that rotor assemblies 108 may be only coupled to thy tops sides, only the underside, or various combinations of top sides and undersides.

The fuselage 104 is also configured to support the user 106 and the power assemblies 110, 3204. The fuselage 104 is described further below in FIG. 45. In addition to the central power assembly 110, as previously described, the tri-grid multirotor flying vehicle 3200 may include the auxiliary power assemblies 3204 coupled to the fuselage 104 proximate to each of the rotor support frames 112, 120, 3202, as shown in FIG. 32. The location of auxiliary power assemblies 3204 closer to the demand location (the rotor assemblies 108) can mitigate potential issues with DC voltage drops. In some embodiments, one or more of the auxiliary power assemblies 3204 may be used in lieu of one central power assembly 110.

Figure 33:
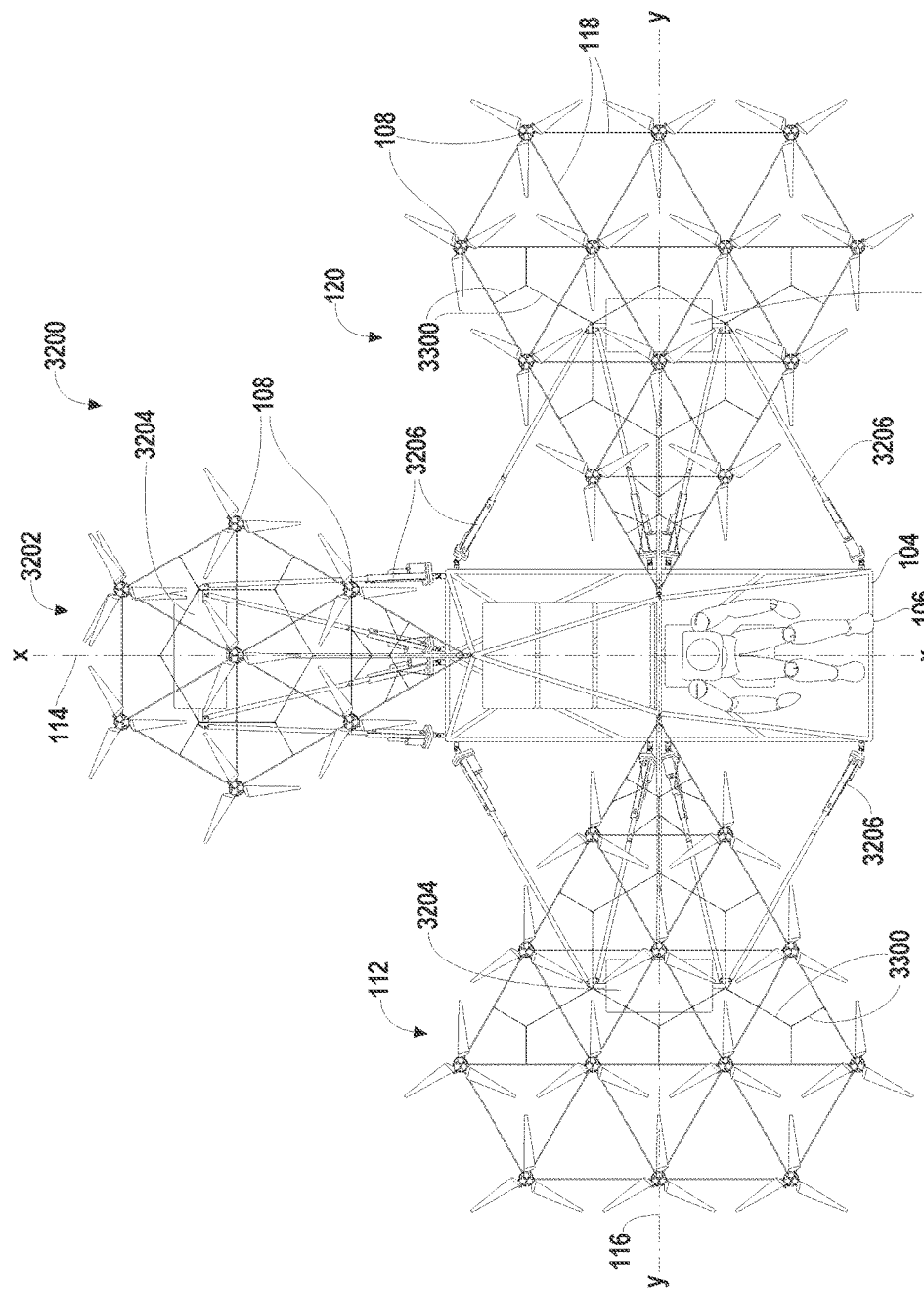
FIG. 33 is a plan view of the tri-grid multirotor flying vehicle.

Referring next to FIG. 33, a plan view of the tri-grid multirotor flying vehicle 3200 is shown. Shown are the fuselage 104, the user 106, the plurality of rotor assemblies 108, the power assembly 110, the left rotor support frame 112, the plurality of linkage arms 118, the right rotor support frame 120, the plurality of actuator supports 3206, the tail rotor support 3202, the plurality of auxiliary power assemblies 3204, and a plurality of pylons 3300.

As shown in the plan view of FIG. 33, the actuator supports 3206 are also oriented diagonally in the horizontal x-y plane. At each side of the fuselage 104 coupled to one rotor support frame 112, 120, 3202, the actuator supports 3206 are coupled to two locations on the corresponding rotor support frame 112, 120, 3202. Each pair of adjacent actuator supports 3206 are angled in an opposite direction in plan view, such that in plan view the four actuator supports 3206 form two side-by-side triangles, with the two apexes of the triangles coupled to one of the rotor support frames 112, 120, 3202, and the bases of the triangles coupled to the fuselage 104.

Also shown in FIG. 33 is the plurality of pylons 3300 spanning horizontally between non-grid linkage arm locations. The pylons 3300 provide a mounting location for each actuator support 3206 so that the actuator supports 3206 mount to the frame 112, 120 without interfering with the lower rotor assemblies 108. In another embodiment, the lower rotor could be removed at a mounting location and the actuator support 3206 mounted at the former rotor location.

Figure 34:
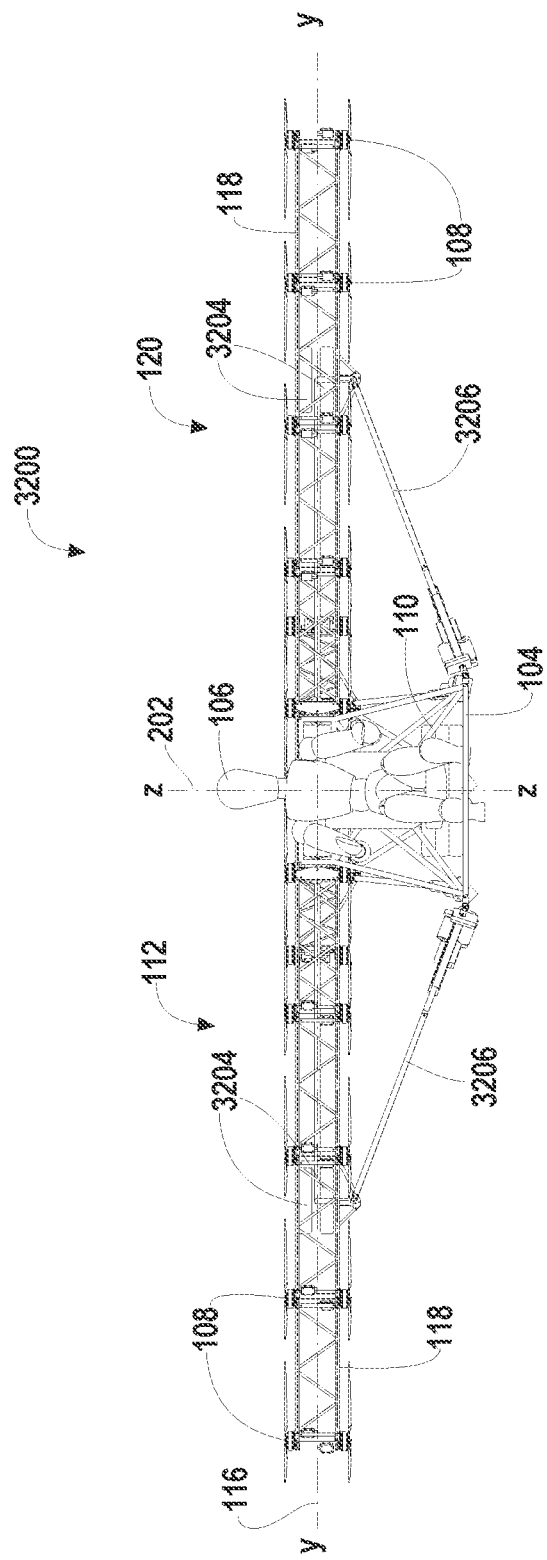
FIG. 34 is a front elevational view of the tri-grid multirotor flying vehicle.

Referring next to FIG. 34, a front elevational view of the tri-grid multirotor flying vehicle 3200 is shown. Shown are the Shown are the fuselage 104, the user 106, the plurality of rotor assemblies 108, the power assembly 110, the left rotor support frame 112, the y-axis 116, the z-axis 202, the plurality of linkage arms 118, the right rotor support frame 120, the plurality of actuator supports 3206, and the plurality of auxiliary power assemblies 3204.

As previously described, the actuator supports 3206 extend from a bottom portion of the fuselage 104, diagonally outward and upward, coupling to the underside of the proximate rotor support frame 112, 120 at a distance from the fuselage 104. In some embodiments the actuator supports 3206 couple to the underside of the frame 112, 120 a distance of about ¼-½ of the frame width, but generally depends on actuator speed, actuation maximum length and strength (leverage ratios), In the exemplary tri-grid multirotor flying vehicle 3200, the actuator supports 3206 do not couple to the proximate rotor support frame at a grid vertex. Additional supporting elements couple the actuator supports 3206 to the rotor support frame 112, 120.

Figure 35:
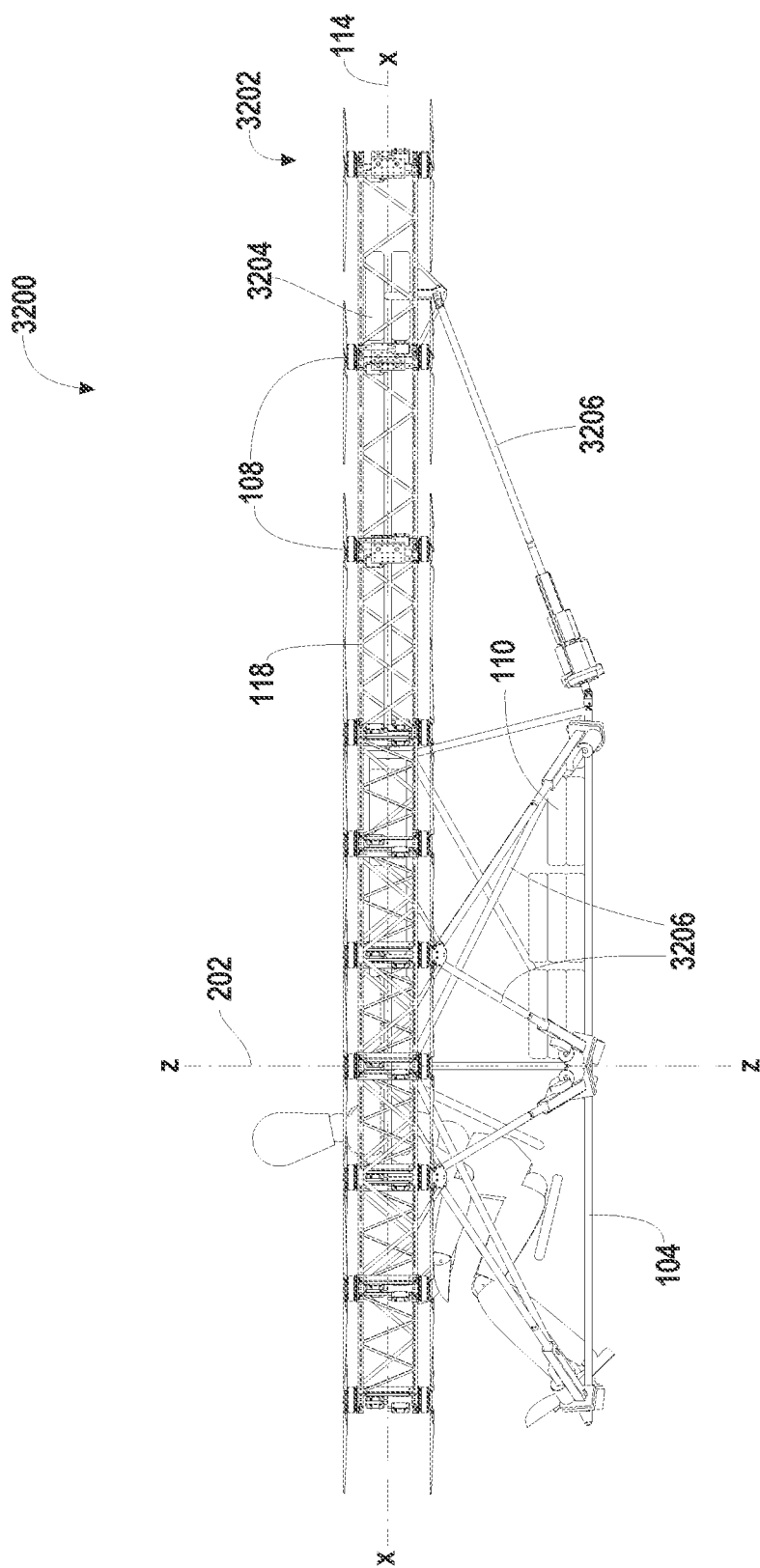
FIG. 35 is a right elevational view of the tri-grid multirotor flying vehicle.

Referring next to FIG. 35, a right elevational view of the tri-grid multirotor flying vehicle 3200 is shown. Shown are the fuselage 104, the user 106, the plurality of rotor assemblies 108, the power assembly 110, the x-axis 114, the z-axis 202, the plurality of linkage arms 118, the right rotor support frame 120, the plurality of actuator supports 3206, the tail rotor support 3202, and the auxiliary power assemblies 3204.

As previously described in FIGS. 32-34, the tri-grid multirotor flying vehicle 3200, for the rotor support frames 112, 120, 3202 in the nonrotated position the rotor support frames 112, 120, 3202 are in a generally horizontal plane. The actuator supports 3206 extend from one rotor support frame down to the bottom portion of the fuselage 104, in this example a lower fuselage assembly. The central power assembly 110 is supported on the lower chord of the lower fuselage assembly. Auxiliary power assemblies 3204 are supported within the rotor support frames 112, 120, 3202.

Figure 36:
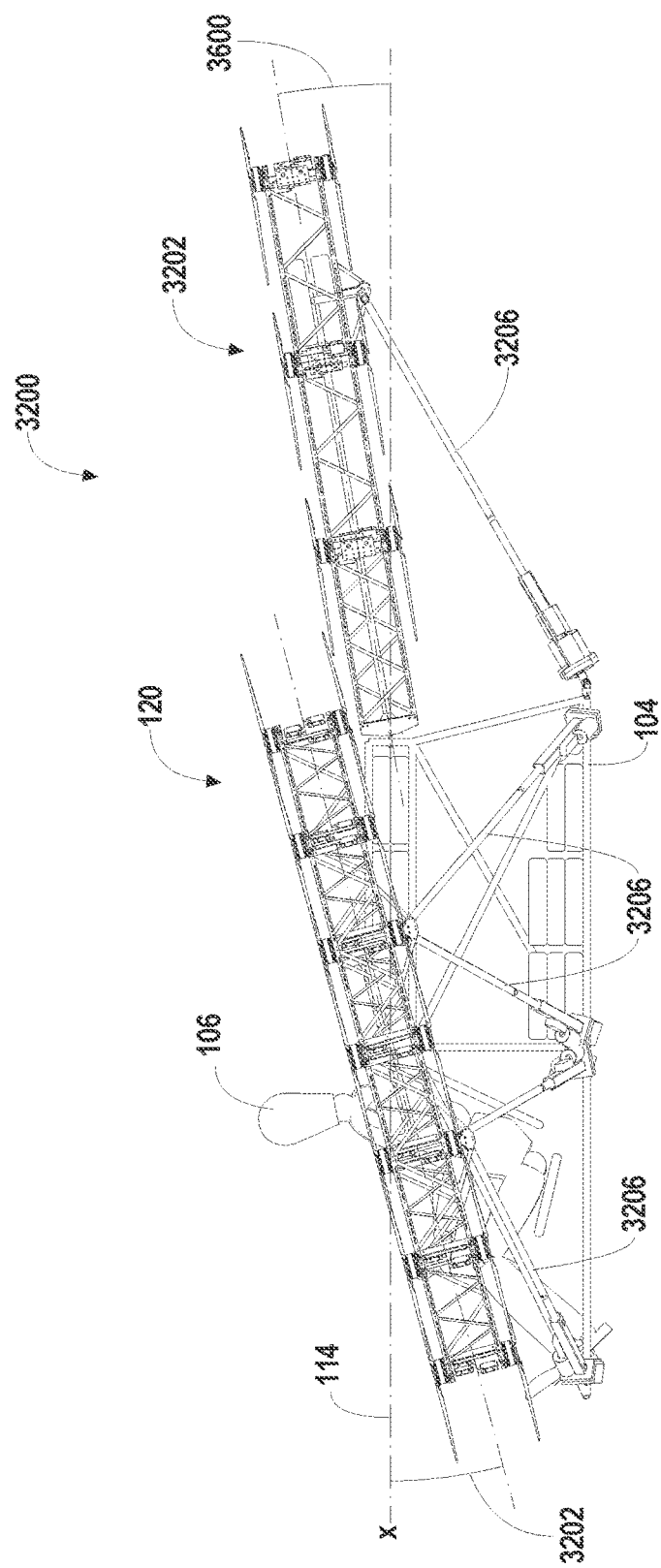
FIG. 36 is a right elevational view of the tri-grid multirotor flying vehicle in a first rotated position.

Referring next to FIG. 36, a right elevational view of the tri-grid multirotor flying vehicle 3200 in a first rotated position is shown. Shown are the fuselage 104, the user 106, the x-axis 114, the right rotor support frame 120, the plurality of actuator supports 3206, the tail rotor support 3202, a first frame rotation angle 3602 and a second frame rotation angle 3600.

The tri-grid multirotor flying vehicle 3200 of FIGS. 32-35 is shown in an exemplary position with the left rotor support frame 112, the right rotor support frame 120, and the tail rotor support frame 3202 rotated at angles 3600, 3602 with respect to the x-axis 114. The left rotor support frame 112 is rotated the same as the right rotor support frame 120, and therefore is not visible in FIG. 36 since the left rotor support frame 112 is therefore behind the right rotor support frame 120.

The left rotor support frame 112 and the right rotor support frame 120 are rotated at the pivot point of the connection of each rotor support frame 112, 120 to the proximate side of the fuselage 104. In the exemplary rotation, the rotor support frames 112, 120, 3202 are rotated with the front of the rotor support frames 112, 120 angled downward, forming the first frame rotation angle 3602 between the lateral axis of the rotor support frames and the x-axis 114. The front portion of the rotor support frames 112, 120 is thereby below the x-axis 114 and the rear portion of the rotor support frames 112, 120 is thereby above the x-axis 114.

The tail rotor support frame 3202 is rotated at the pivot point of the connection between the tail rotor support frame 3202 and the rear of the fuselage 104. In the exemplary rotation, the tail rotor support frame 3202 is rotated upwards, forming the second angle 3600 between the lateral axis of the tail rotor support frame 3202 and the x-axis 114. Due to the location of the pivot point at the front portion of the tail rotor support frame 3202, all of the lateral axis is at or above the z-axis 114.

Figure 37:
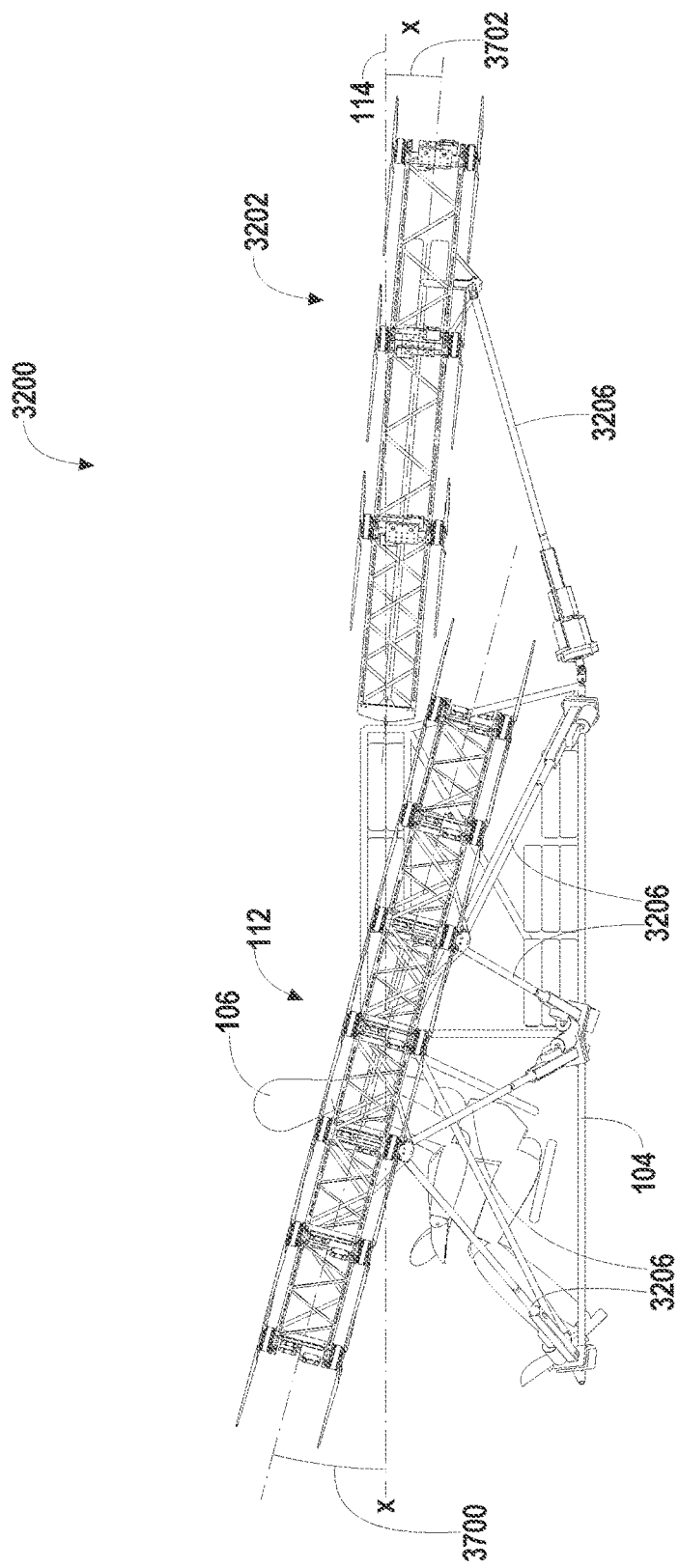
FIG. 37 is a right elevational view of the tri-grid multirotor flying vehicle in a second rotated position.

Referring next to FIG. 37, a right elevational view of the tri-grid multirotor flying vehicle 3200 in a second rotated position is shown. Shown are the fuselage 104, the user 106, the plurality of rotor assemblies 108, the plurality of linkage arms 118, the right rotor support frame 120, the plurality of actuator supports 3206, the tail rotor support 3202, a third frame rotation angle 3700 and a fourth frame rotation angle 3702.

As with the first rotated position, the rotor support frames 112, 120 and 3202 are rotated with respect to the pivot points and relative to the x-axis 114. In the second rotated position, the rotor support frames 112, 120, 3202 are rotated in the opposite directions, with the rear portions of the left and right rotor support frames 112, 120 rotated downward (below the z-axis 114) at the third angle 3700 with respect to the x-axis 114, and the tail rotor support frame 3202 rotated downward (below the x-axis 114) at the fourth angle 3702 with respect to the x-axis 114.

Figure 38:
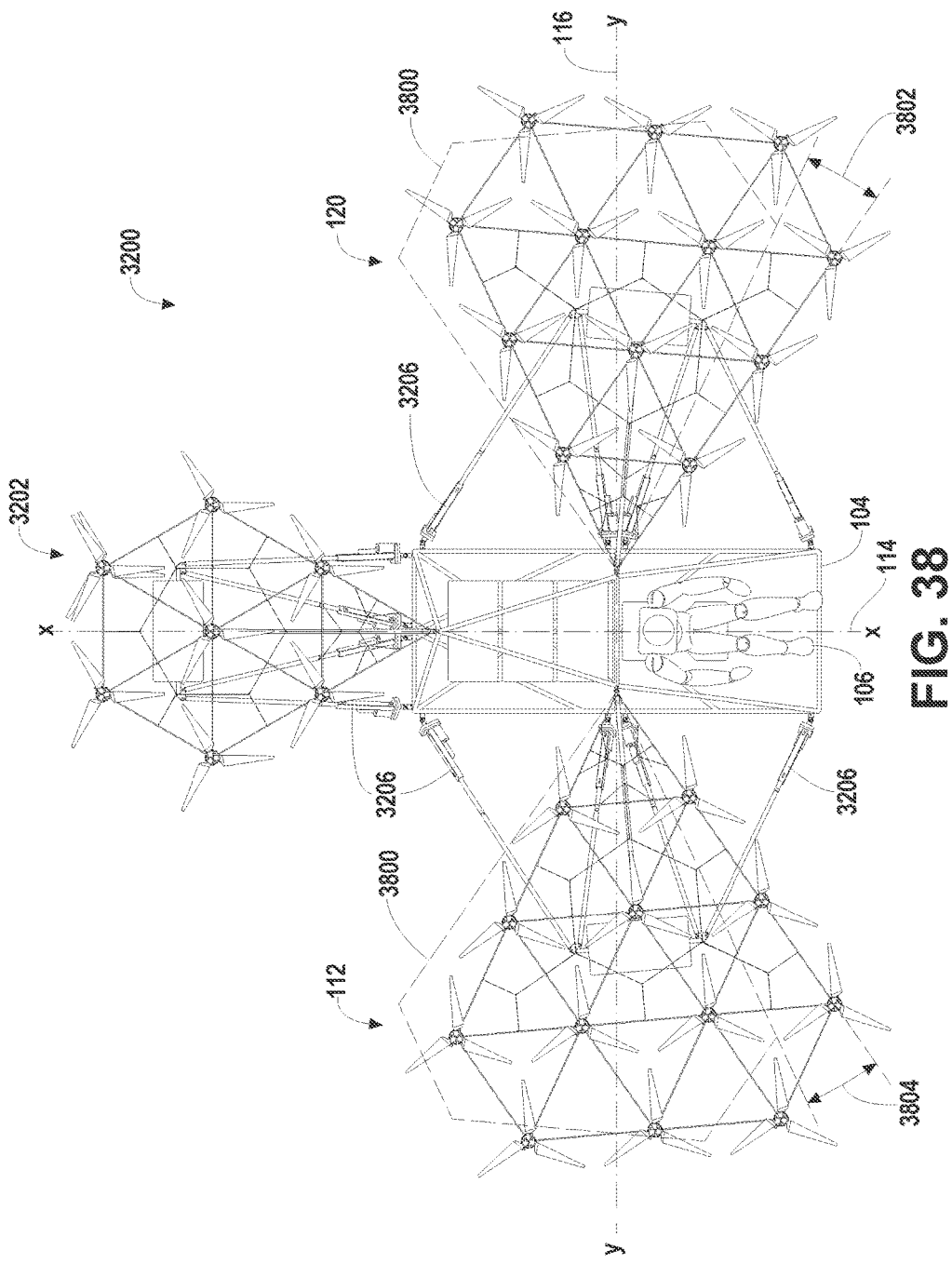
FIG. 38 is a plan view of the tri-grid multirotor flying vehicle in a third rotated position.

Referring next to FIG. 38, a plan view of the tri-grid multirotor flying vehicle 3200 in a third rotated position is shown. Shown are the fuselage 104, the user 106, the plurality of rotor assemblies 108, the left rotor support frame 112, the x-axis 114, the y-axis 116, the plurality of linkage arms 118, the right rotor support frame 120, the plurality of actuator supports 3206, the tail rotor support 3202, an original frame position 3800, a fifth rotation angle 3802, and a sixth rotation angle 3804.

The left rotor support frame 112 and the right rotor support frame 120 have been maintained in the horizontal position, but have been pivoted about the z-axis 202 of each corresponding pivot joint. An outline of the rotor support frames 112, 120 in the original (nonrotated) position is shown as the original frame position 3800. The frames 112, 120 have maintained the same horizontal planar orientation but have been rotated forward with respect to the vertical z-axes located at each pivot point. The left rotor support frame 112 has been rotated forward at the sixth angle 3804. The right rotor support frame 120 has been rotated forward at the fifth angle 3802. The left rotor support frame 112 and the right rotor support frame 120 may also be rotated rearward. The tail rotor support frame 3202 is shown in the nonrotated position, but may also be rotated about the corresponding pivot point, i.e. leftward or rightward.

Figure 39:
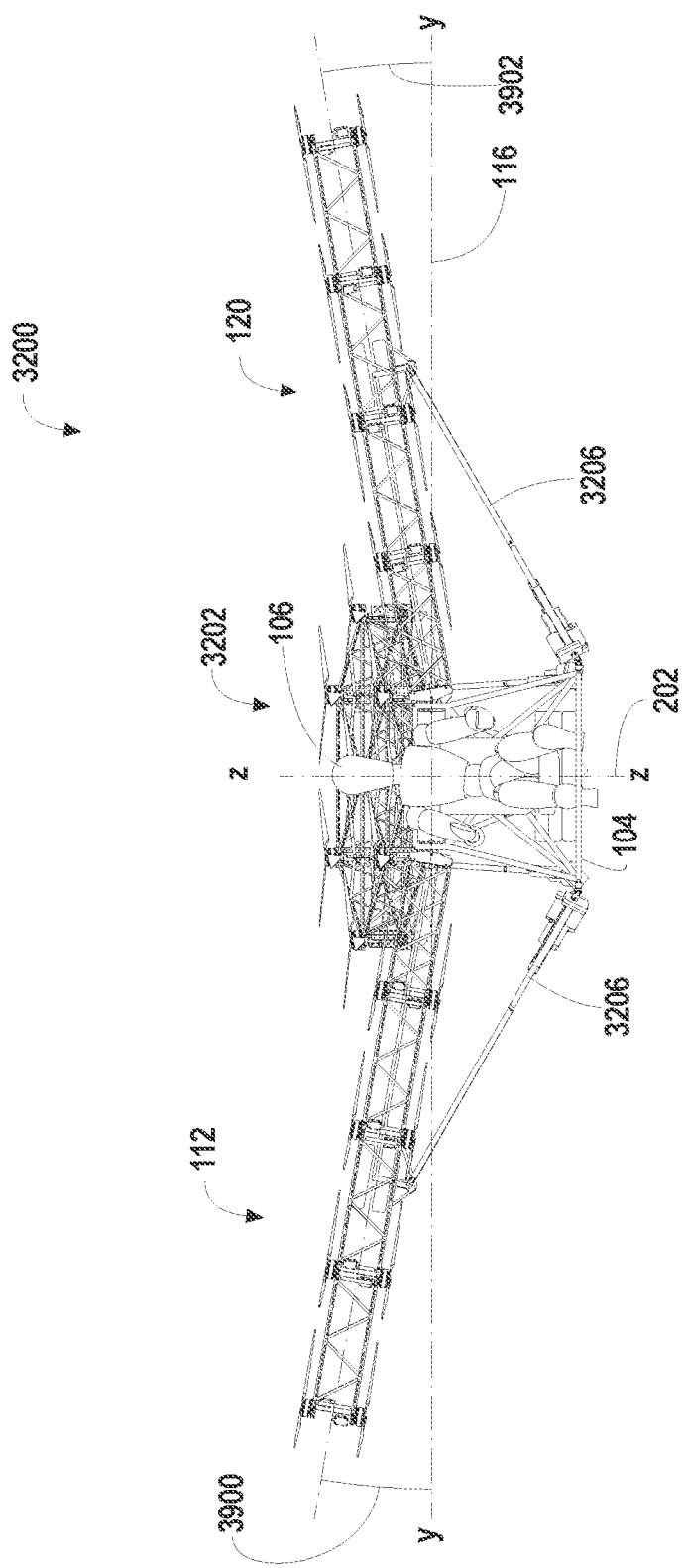
FIG. 39 is a front elevational view of the tri-grid multirotor flying vehicle in a fourth rotated position.

Referring next to FIG. 39, a front elevational view of the tri-grid multirotor flying vehicle 3200 in a fourth rotated position is shown. Shown are the fuselage 104, the user 106, the plurality of rotor assemblies 108, the left rotor support frame 112, the y-axis 116, the z-axis 202, the plurality of linkage arms 118, the right rotor support frame 120, the plurality of actuator supports 3206, and the tail rotor support frame 3202, a seventh rotation angle 3900, and an eighth rotation angle 3902.

The left and right rotor support frames 112, 120 are rotated at the pivot points as previously described. In the exemplary rotation of FIG. 39, each rotor support frame 112, 120 is rotated upward with respect to the y-axis 116, such that the lateral axis of each rotor support frame forms an angle with the y-axis 116. In the exemplary fourth rotated position, the left rotor support frame 112 is rotated the seventh rotation angle 3900, and the right rotor support frame 120 is rotated the eighth rotation angle 3902. It will be understood that the rotation angles 3900, 3902 may be the same angle or may be different angles. The rotor support frames 112, 120 may also be rotated downward with respect to the y-axis 116.

The tail rotor support frame 3202 is shown rotated upwards, similarly to the rotation shown in FIG. 36.

Figure 40:
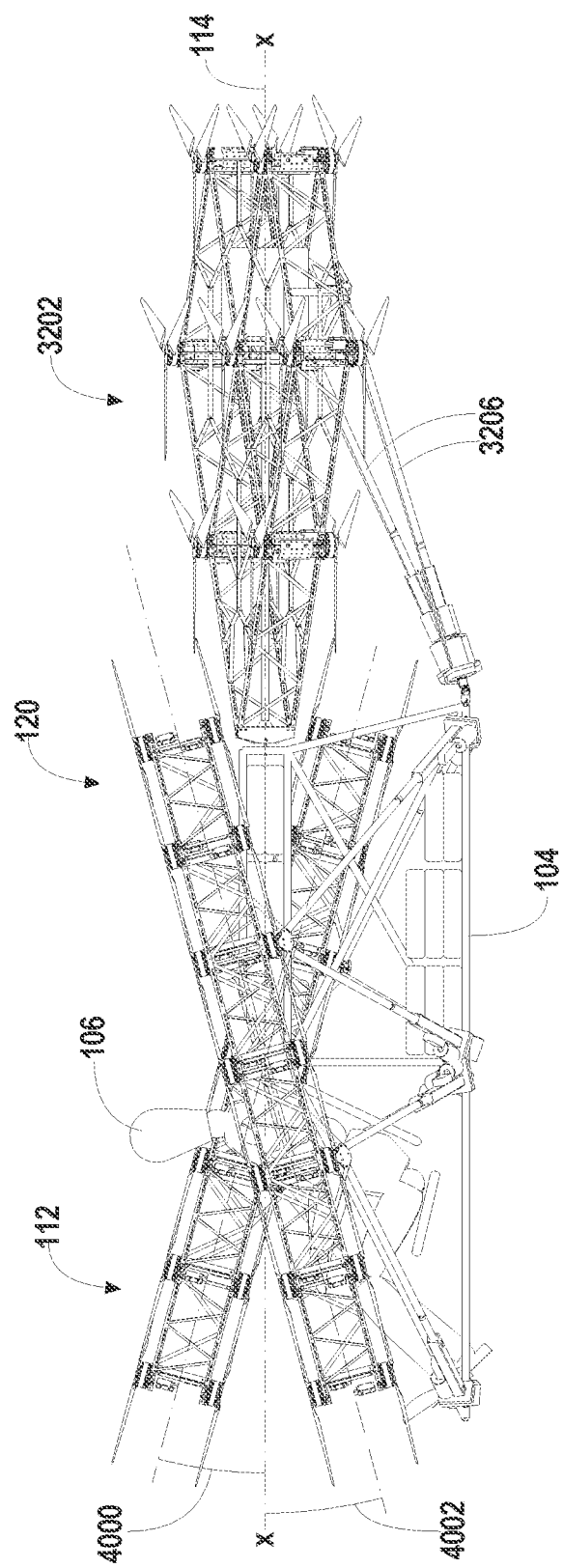
FIG. 40 is a right elevational view of the tri-grid multirotor flying vehicle in a fifth rotated position.

Referring next to FIG. 40, a right elevational view of the tri-grid multirotor flying vehicle 3200 in a fifth rotated position is shown. Shown are the fuselage 104, the user 106, the x-axis 114, the right rotor support frame 120, the plurality of actuator supports 3206, the tail rotor support 3202, a ninth frame rotation angle 4000, and a tenth rotation angle 4002.

As shown in FIG. 40, combinations of rotation directions may be used. The left rotor support frame 112 has been angled forward upward with respect to the x-axis 114 by the ninth angle 4000, and the right rotor support frame 120 has been angled forward downward with respect to the x-axis 114 by the tenth angle 4002, resulting in an X-configuration formed by the rotor support frames 112, 120 when viewed from the side. The tail rotor support frame 3202 has been angled downward to the right with respect to the y-axis 116 (similar to the frame rotations shown in FIG. 39).

Although in the exemplary rotated position of FIGS. 36-40 the rotor support frames 112, 120, 3202 have been shown rotated with respect to a single axis at a time, it will be understood that rotations may occur about multiple axes simultaneously, as long as permitted by the configuration of the pivot point connections.

Figure 41:
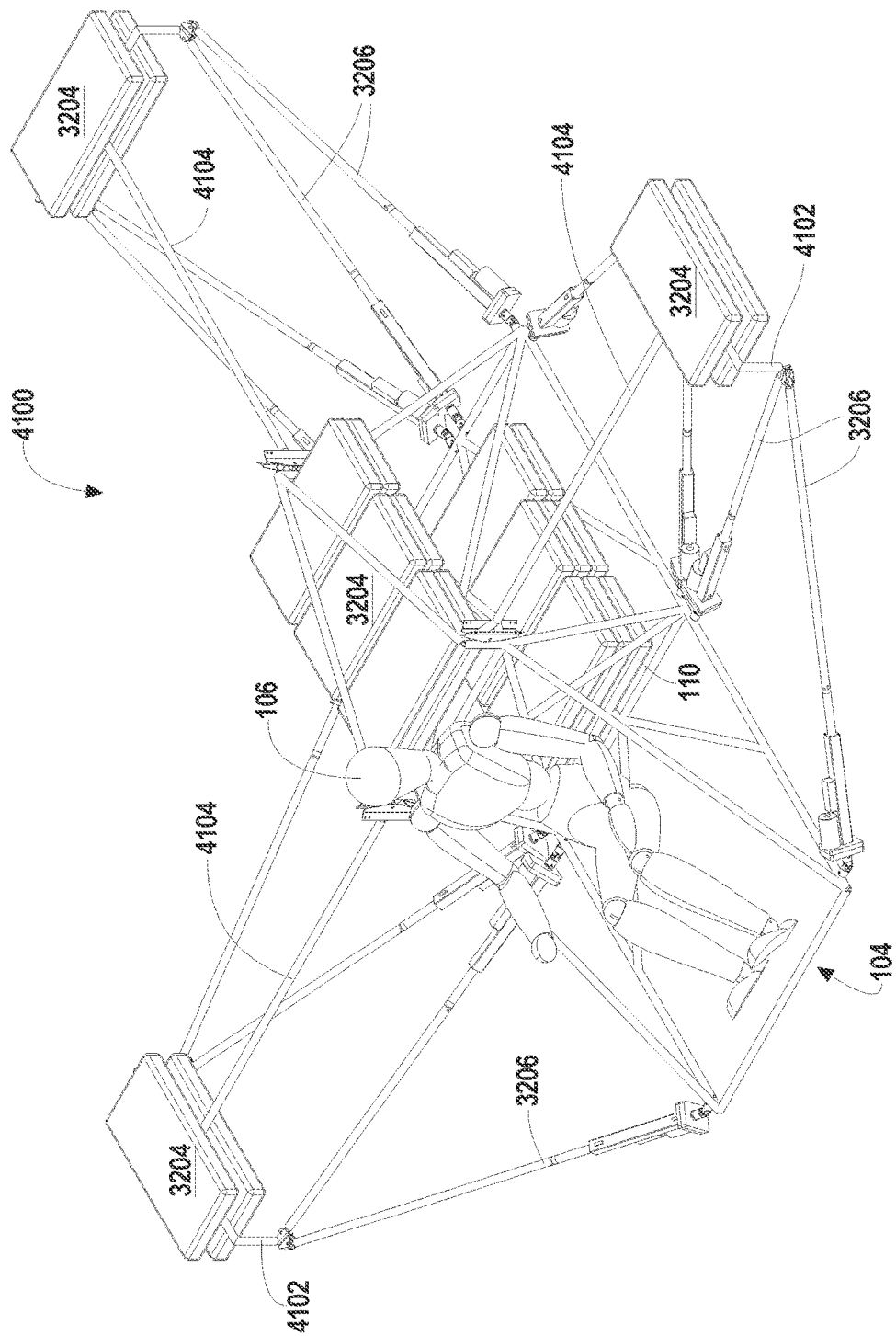
FIG. 41 is a perspective view of an exemplary tri-grid fuselage assembly.

Referring next to FIG. 41, a perspective view of an exemplary tri-grid fuselage assembly 4100 is shown. Shown are the fuselage 104, the user 106, the power assembly 110, the plurality of actuator supports 3206, the plurality of auxiliary power assemblies 3204, a plurality of power assembly supports 4102, and a plurality of struts 4104.

The fuselage 104 in the embodiment of FIG. 41 is generally comprised of a plurality of struts 4104 providing a general lower box shape, with additional diagonals and chords as required to support the user 106, the central power assembly 110, and provide sufficient structural support to the vehicle. The actuator supports 3206 are coupled to the lower box portion on the fuselage 104.

At each side of the fuselage 104 and at the rear of the fuselage 104, the optional power assembly support 4102 is fixedly coupled to the distal ends of the actuator supports 3206. The power assembly supports 4102 are configured to support auxiliary power assemblies 3204 at each frame location.

At least one additional strut 4104 extends generally horizontally from the fuselage 104 to the proximate power assembly support 4102 for additional structural support and stability.

Figure 42:
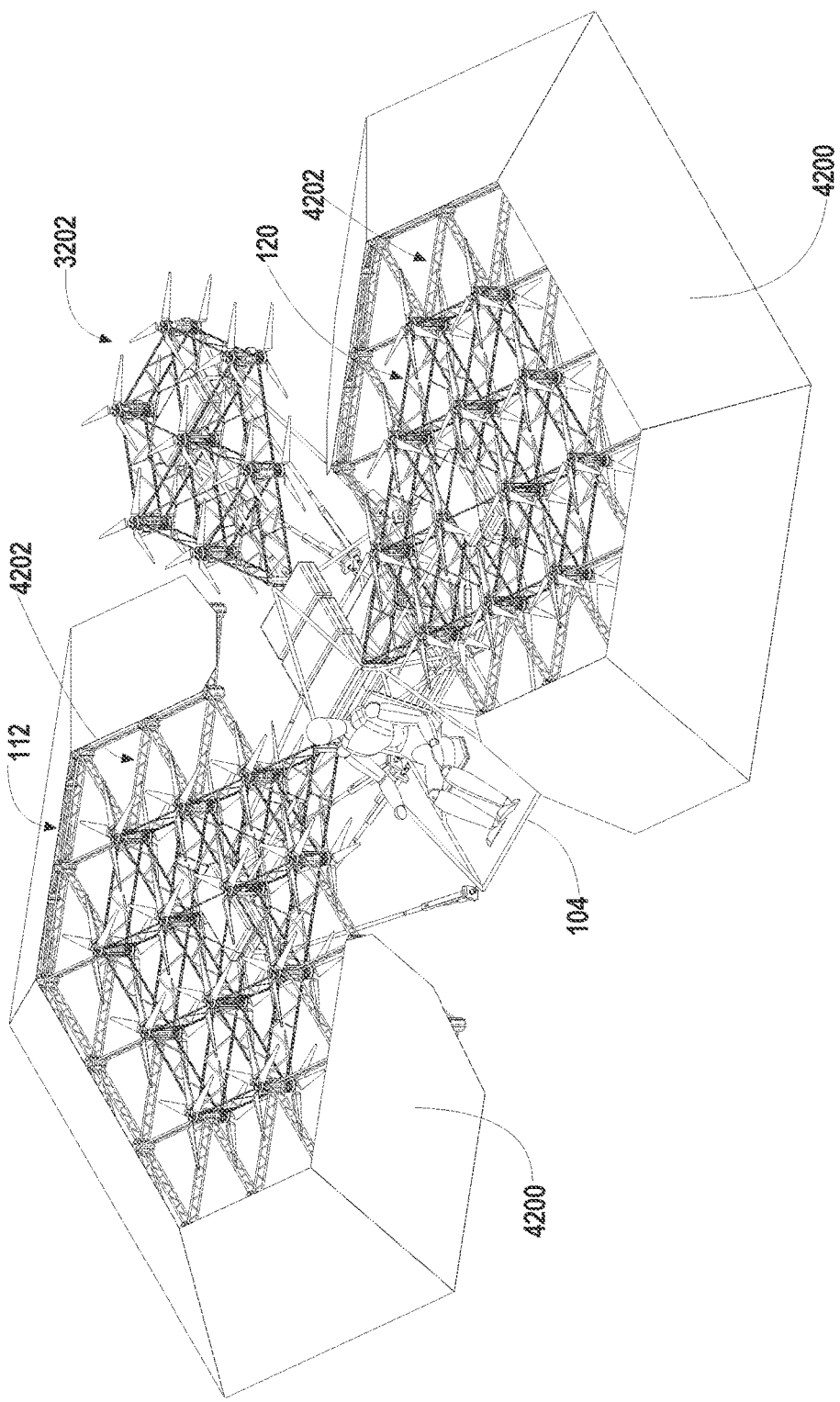
FIG. 42 is a perspective view of an embodiment of the tri-grid multirotor flying vehicle including perimeter shrouds.

Referring next to FIG. 42, a perspective view of an embodiment of the tri-grid multirotor flying vehicle 3200 including perimeter shrouds 4200 is shown. Shown are the left rotor support frame 112, the right rotor support frame 120, the tail rotor support frame 3202, the fuselage 104, the plurality of perimeter shrouds 4200, and a plurality of auxiliary support frames 4202.

Each shroud 4200 is comprised of plate segments coupled around the perimeter of the proximate frame and angled downward and outward from the perimeter of the frame. In the embodiment shown the left rotor support frame 112 and the right rotor support frame 120 include the perimeter shroud 4200 coupled to the frame. In some embodiments the tail rotor support frame 3202 may also include one perimeter shroud 4200.

The perimeter support shrouds 4200 extend continuously around the perimeter of each frame, except for a side of the frame proximate to the fuselage 104.

Each perimeter shroud 4200 may be coupled directly to the linkage arms 118 of the frame, or as shown in FIG. 42 additional linkage arms 118 may be coupled to the perimeter of the corresponding support frame to form the auxiliary support frame 4202. In the embodiment shown in FIG. 42, the auxiliary support frame 4202, using the same triangular frame layout as the support frames 112, 120 extends horizontally from the corresponding support frame for one grid width. The interior edge of the perimeter shroud 4200 is coupled to the outer horizontal edge of the auxiliary support frame 4202.

Without perimeter shrouds 4200, the air flow follows a short recirculation path, reducing the size and pressure differential. The rotor blades act as wings, and the blades force air down creating downwards airflow. The downwards airflow creates a low pressure zone above the rotors and a high pressure zone below the rotors. The pressure differential between the high and low pressure zones aids in lift. With conventional rotor design, upwards airflow travels just outside the perimeter of the rotor, creating a continuous circular airflow. This short recirculation path is undesirable because it reduces the zone sizes and the pressure differential. The addition of the perimeter shroud 4200 creates an airflow recirculation barrier that increases the air recirculation path, as the air has to travel outward under the shroud 4200, around the outer edge of the shroud 4200, then inward over the shroud 4200 to reach the rotor area. The results is an increased size of high/low pressure zones, creating lift and increasing efficiency. The airflow recirculation barrier increases the size of the pressure zones and creates lift (increasing efficiency).

The perimeter shrouds 4200 may comprise sheet metal or a lightweight material such as composite panels, sailcloth, or Mylar film. In some embodiments that perimeter shrouds 4200 may comprise an inflatable structure or any material that forms a strong, light, non or low permeable sheet that sufficiently blocks air. Lift is generated in the shroud 4200 and material comprising the shroud 4200 and supporting frame must be able to support anticipated forces.

Figure 43:
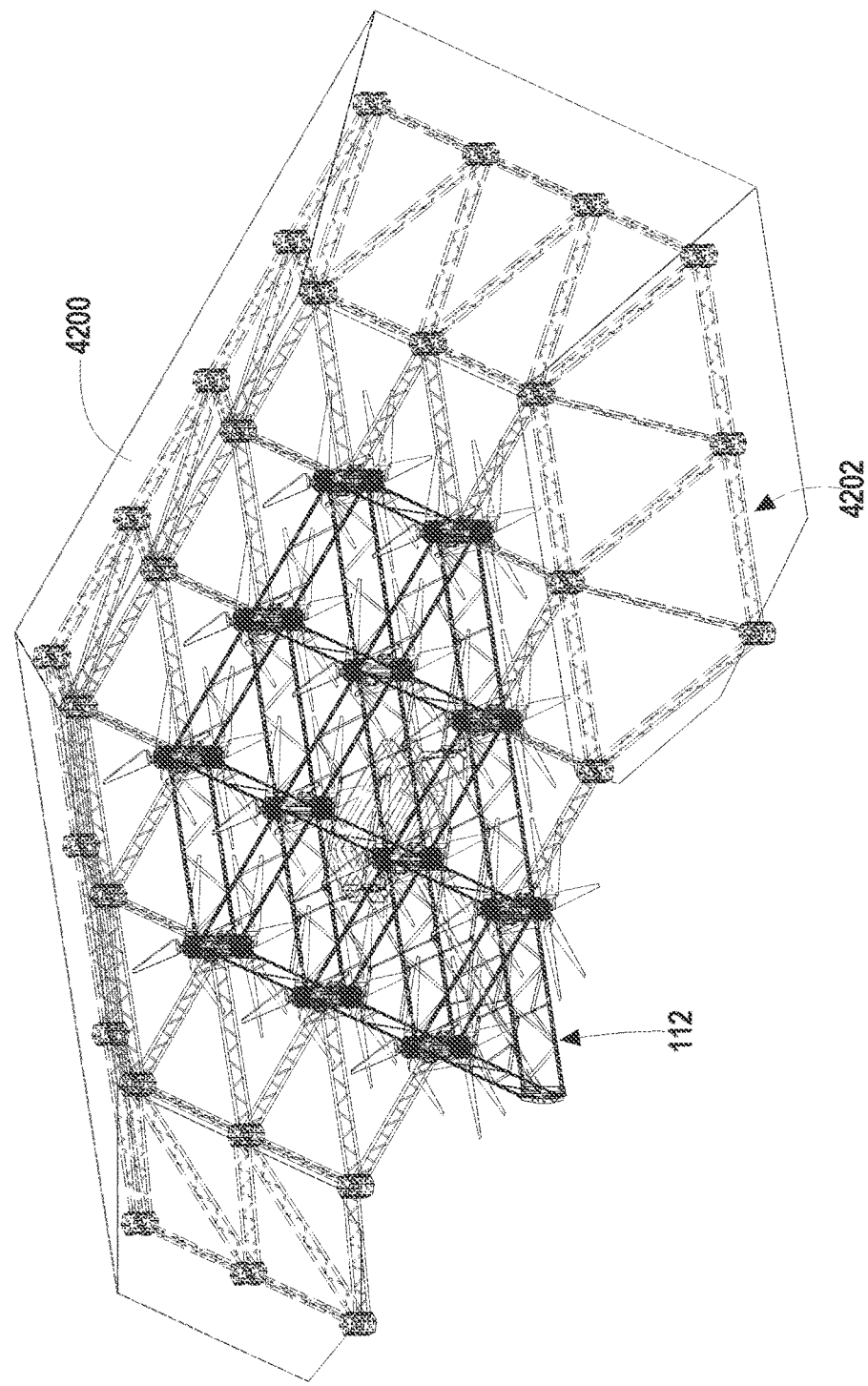
FIG. 43 is a perspective view of an exemplary right rotor support frame including the auxiliary shroud support frame.

Referring next to FIG. 43, a perspective view of an exemplary right rotor support frame 112 including the auxiliary shroud support frame 4202 is shown. Shown are the perimeter shroud 4200 and the auxiliary support frame 4202.

The auxiliary support frame 4202 extends below the perimeter shroud 4200 at the same downward angle as the shroud, and is coupled to the perimeter shroud 4200. As shown in FIGS. 42 and 43, the auxiliary support frame 4202 comprises linkage arms 118 of smaller size than the corresponding rotor support frame, but the auxiliary support frame 4202 may also comprise the same linkage arms 118 as for the rotor support frames 112, 120.

Figure 44:
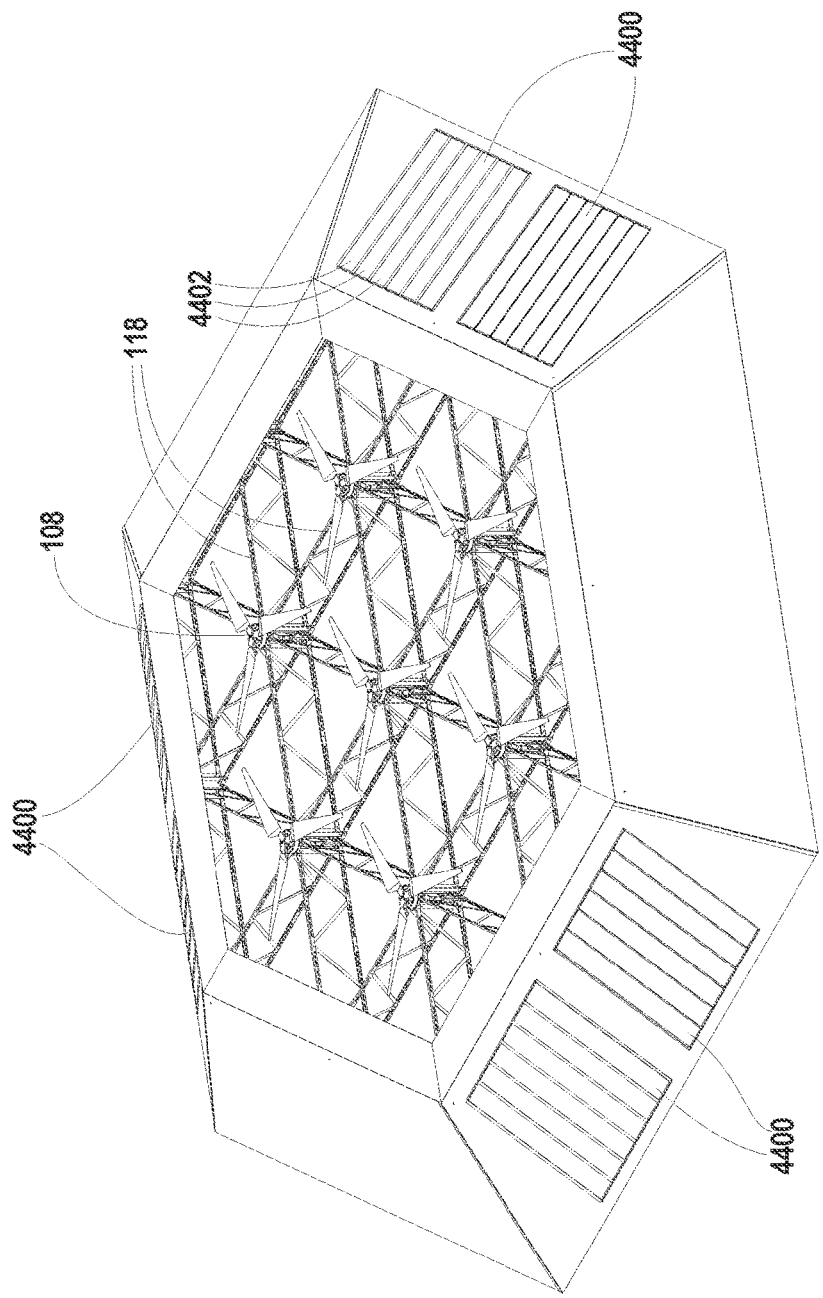
FIG. 44 is a perspective view of an embodiment of the perimeter shroud including vents.

Referring next to FIG. 44, a perspective view of an embodiment of the perimeter shroud 4200 including vents is shown. Shown are the perimeter shroud 4200, the plurality of rotor assemblies 108, the plurality of linkage arms 118, a plurality of shroud vents 4400, and a plurality of vent panels 4402.

The perimeter shroud 4200 may include a plurality of shroud vents 4400. In the embodiment shown, two shroud vents 4400 are included in alternate panels of the perimeter shroud 4200. Each shroud vent 4400 includes a plurality of rotatable vent panels 4402. Five vent panels 4402 per shroud vent 4400 are shown in FIG. 44. Each generally rectangular vent panel 4402 is rotatable coupled to the perimeter shroud 4200 such that in a closed position the vent panel 4402 is closed, and in an adjustable position, the vent panel 4402 is rotated about an axis generally perpendicular to the shroud 4200 perimeter.

Figure 45:
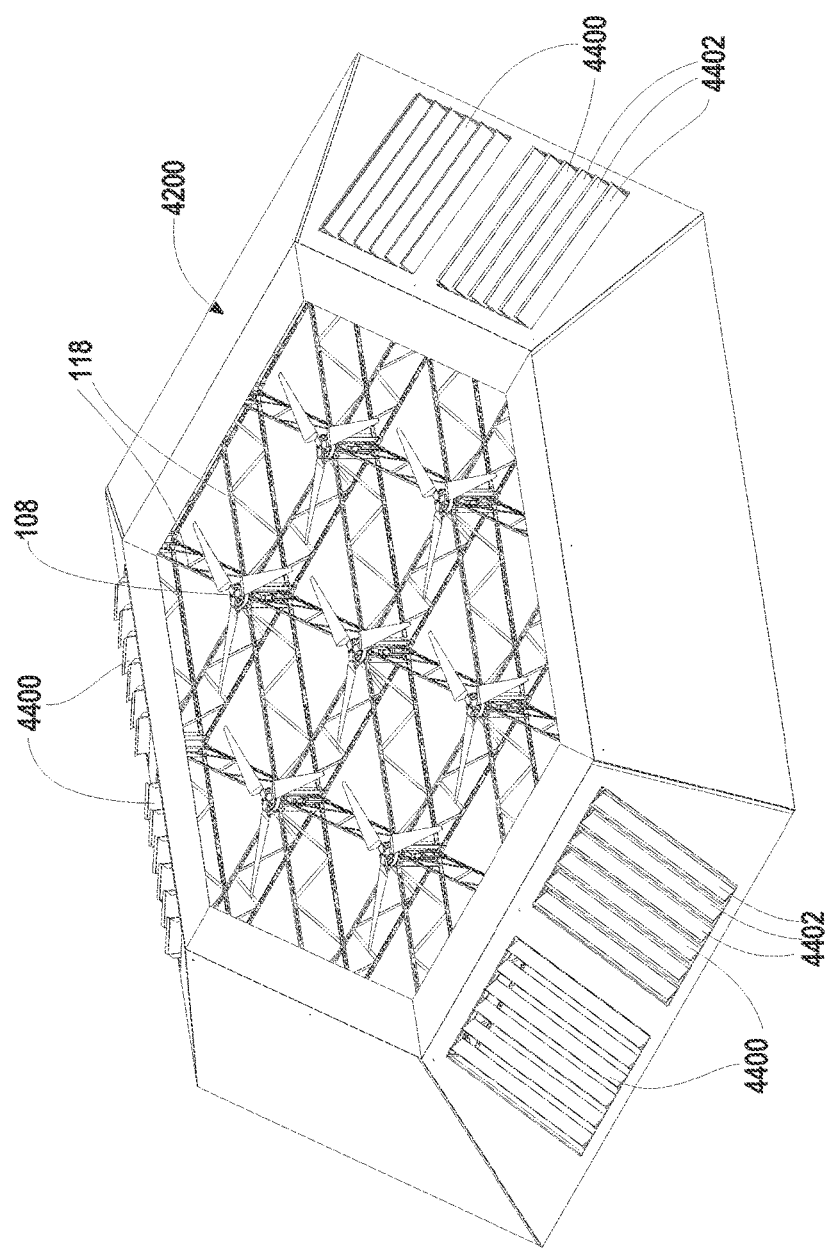
FIG. 45 is a perspective view of an embodiment of an extended multirotor flying vehicle including an extended rotor support frame system.

Referring next to FIG. 45, a perspective view of the perimeter shroud 4200 including shroud vents 4400 is shown with the vent panels 4402 in a partially open position. Shown are the perimeter shroud 4200, the plurality of rotor assemblies 108, the plurality of linkage arms 118, the plurality of shroud vents 4400, and the plurality of vent panels 4402.

As shown in FIG. 45, the vent panels 4402 have been rotated from the closed position shown in FIG. 44 and are in a partially open position. The vent panels 4402 are operable by an actuator coupled to each shroud vent 4400, the actuator coupled to and controlled by the control system.

The shroud vents 4400 create or add to stability control of the multirotor vehicle by reducing pressure and thus lift in the region of the vent 4400. One vent 4400 with vent panels 4402 opened to a 45-degree angle creates yaw force as air escapes on a tangential vector and when used in conjunction with other vents 4400 can be used to yaw the vehicle.

Figure 46:
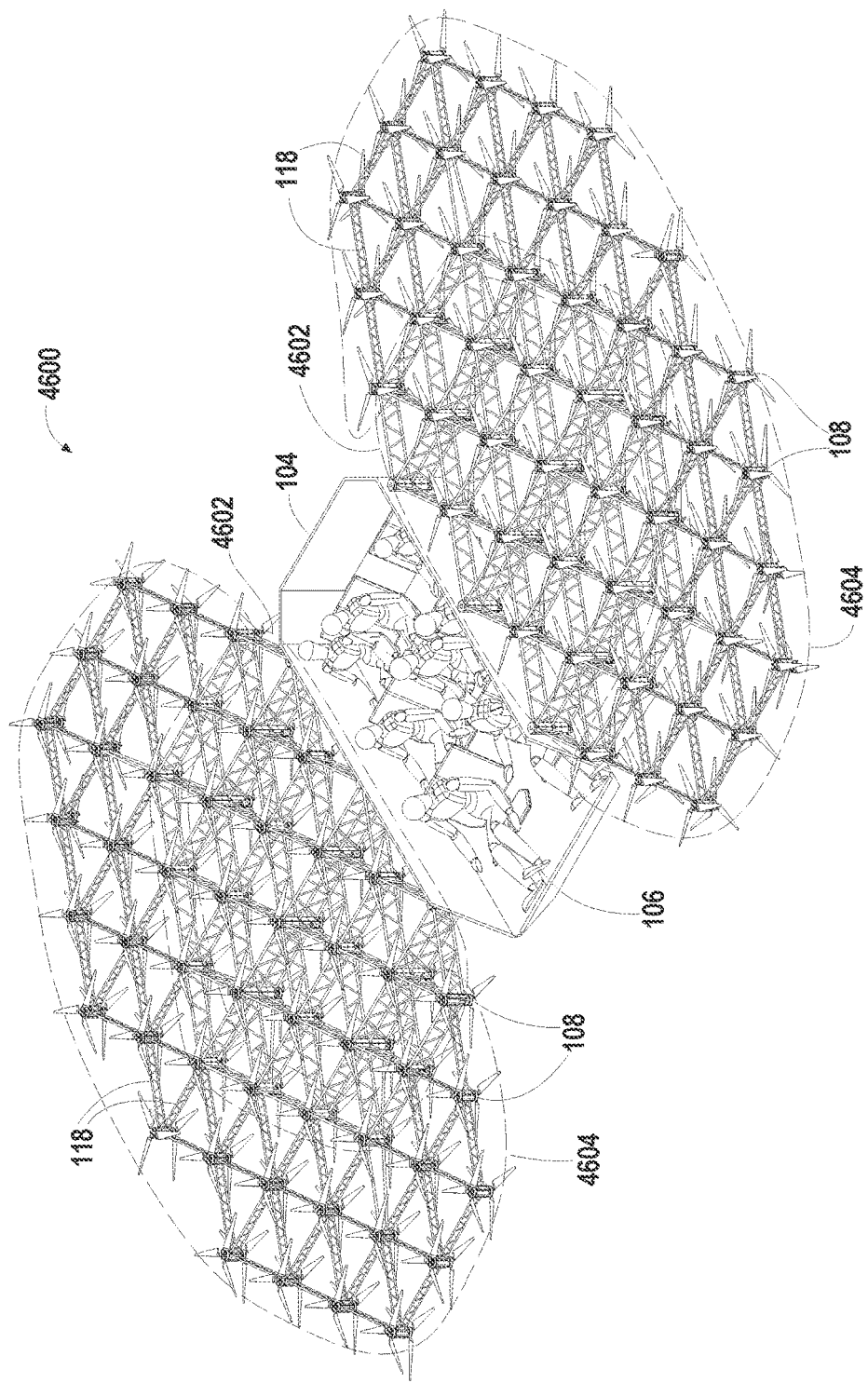
FIG. 46 is a perspective view of an embodiment of an extended multirotor flying vehicle including an extended rotor support frame system.

Referring next to FIG. 46, an embodiment of an extended multirotor flying vehicle 4600 including an extended rotor support frame system is shown in one embodiment of the present invention. Shown are the left rotor support frame 112, the right rotor support frame 120, the fuselage 104, the plurality of users 106, a plurality of rotor assemblies 108, the plurality of linkage arms 118, two main frames 4602, and two perimeter frames 4604.

The extended multirotor flying vehicle 4600 is constructed similarly to the previous embodiments, with the central fuselage 104 juxtaposed between the generally planar left rotor support frame 112 and right rotor support frame 120. The frame layout is the triangular grid layout previously described, with linkage arms 118 spanning between grid vertices and coupled to each other end-to-end to form the triangular grid layout. The rotor assemblies 108 are coupled to the linkage arms 118 at the grid vertices, as previously described.

Each rotor support frame 112, 120 includes the main frame 4602 directly coupled to and supported by the fuselage 104. Each rotor support frame 112, 120 also includes the perimeter frame 4604 coupled to the corresponding main frame 4602 distal to the fuselage 104. Rotor assemblies 108 are coupled to the grid vertices and powered and controlled as previously described.

Figure 47:
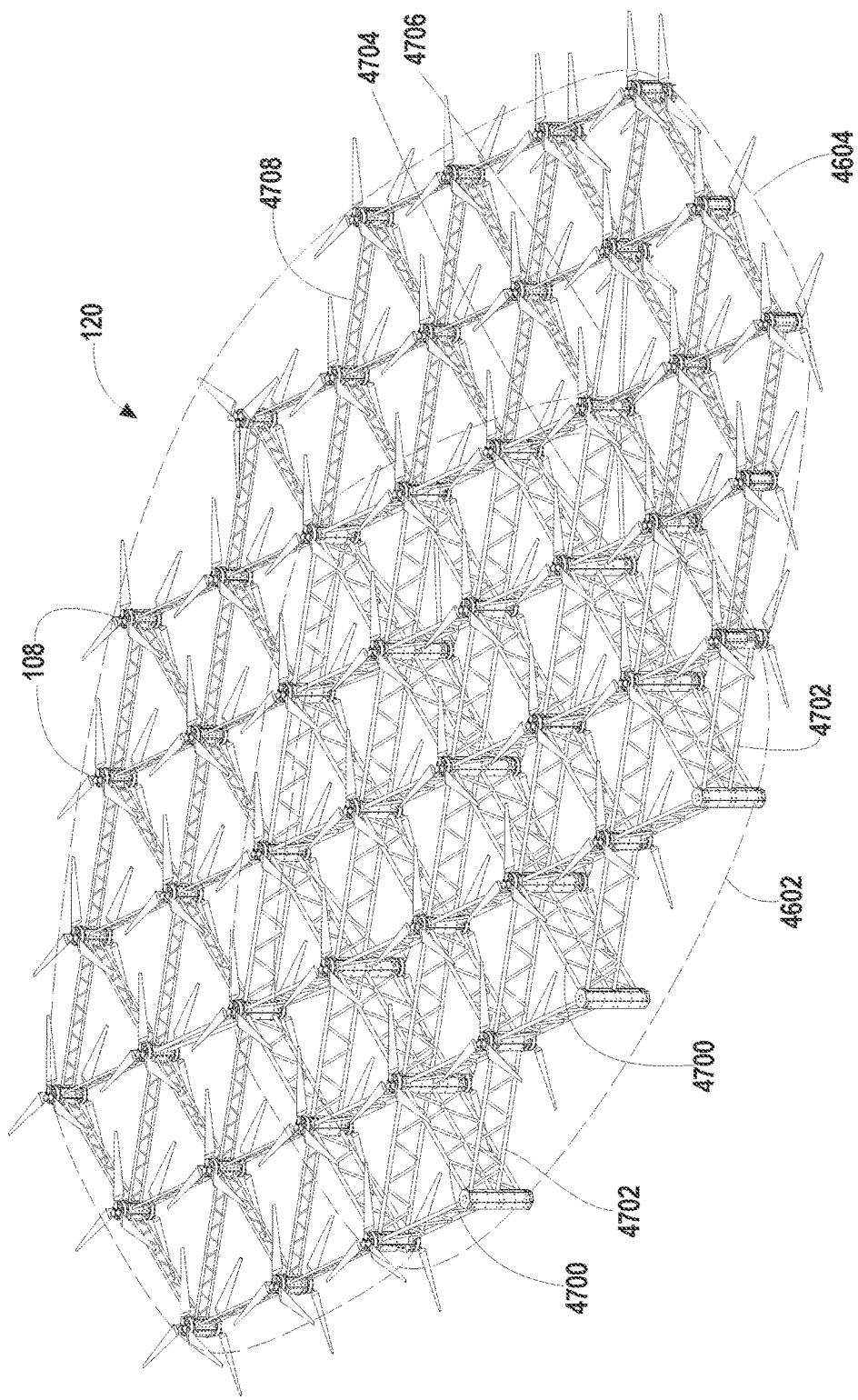
FIG. 47 is a perspective view of the right rotor support frame of the extended multirotor flying vehicle.

Referring next to FIG. 47, a perspective view of the right rotor support frame 120 of FIG. 46 is shown. Shown are the plurality of rotor assemblies 108, a plurality of double main truss linkage arms 4700, a plurality of main truss linkage arms 4702, a plurality of strut truss linkage arms 4704, a plurality of strut linkage arms 4706, and a plurality of perimeter truss linkage arms 4708.

In the present embodiment, the main frames 4602 are comprised of double main truss linkage arms 4700, main truss linkage arms 4702, and strut truss linkage arms 4704. Each main truss linkage arm 4702 comprises a central truss portion with a connection plate 4900 coupled to each send of the main truss linkage arm 4702. Each double main truss linkage arm 4700 comprises a top truss and a bottom truss, wherein a bottom chord of the top truss is also a top chord for the bottom truss. Generally, the main truss linkage arms 4702 have a height-length ratio of between 1:4 and 1:2, although depending on various factors the ratio may be outside that range.

The double main truss linkage arms 4700 include the connection plate 4900 similar to that for the main truss linkage arms 4702, with the connection plate 4900 extending to generally the full height of the double main truss linkage arm 4700. When one double main truss linkage arm 4700 is coupled to a main truss linkage arm 4702, the main truss linkage arm 4702 is aligned with the top truss of the double main truss linkage arm 4700, such that the bottom chord of the main truss linkage arm 4702 generally aligns with the bottom chord of the top truss of the double main truss linkage arm 4700.

The main frame 4602 also includes the strut linkage arms 4704, configured similarly to the main truss linkage arm 4702 with one end including the connection plate 4900 extending below the truss portion, and a strut extending from the bottom end of the extended connection plate 4900 diagonally upward to the opposite end of the bottom chord.

Generally, the double main truss linkage arms 4700 as used at main frame locations requiring the largest amount of strength and stability, which is generally extending outward from the fuselage 104 at the locations where the frame 112, 120 is coupled to the fuselage 104. The main truss linkage arms 4702 are generally used to infill between the double main truss linkage arms 4700 to form the triangular grid in the portion of the frame 112, 120 proximate to the fuselage 104. In the embodiment shown, the main frame 4602 supports rotors in a 4-3-4-3-4-3-2-1 configuration (with each rotor at a grid vertex), starting with the first row of rotors proximate to the fuselage 104.

At some main frame locations proximate to the perimeter frame 4604, strut truss linkage arms 4704 are used to provide additional lateral support to an end of a connecting double main truss linkage arm 4700, as the lower end of the strut generally aligns with the bottom chord of the double main truss linkage arm 4700.

The perimeter frame 4604 includes the plurality of strut linkage arms 4706 and the plurality of perimeter truss linkage arms 4708. The perimeter truss linkage arms 4708 include a truss portion interposed between two end connection plates 4900, but the truss height is smaller than for the main truss linkage arms 4702. The actual height is dependent on the overall design requirements, but in the embodiment shown, the perimeter truss portion height is around 4 inches. Each strut linkage arm 4706 includes a top chord and a diagonal bottom chord sloping upward from one end of the linkage arm to the opposite end. The strut linkage arms 4706 also includes the connection plates 4900 at each end of the strut linkage arm 4706. The distance between the top chord and the lower end of the bottom chord is generally same as the height of the main truss linkage arm 4702. The strut linkage arm 4706 is generally coupled to one strut truss linkage arm 4704 on the lower end of the bottom chord, and coupled to one perimeter truss linkage arm 4708 at the opposite end of the strut linkage arm 4706.

Figure 48:
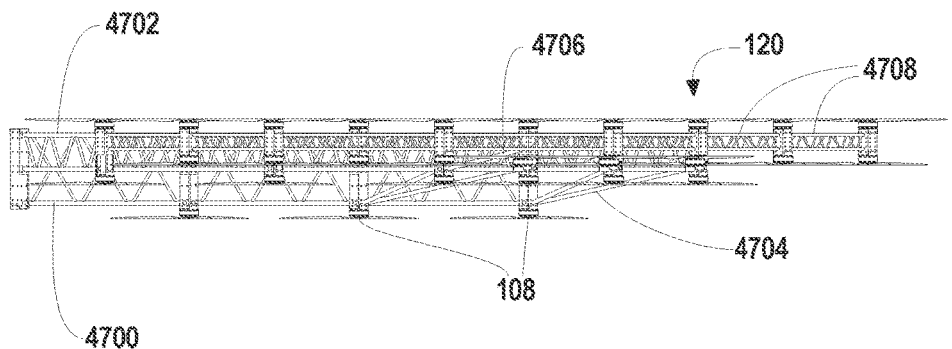
FIG. 48 is a front elevational view of the right rotor support frame of the extended multirotor flying vehicle.

Referring next to FIG. 48, a front elevational view of the right rotor support frame 120 of FIG. 47 is shown. Shown are the plurality of rotor assemblies 108, the plurality of double main truss linkage arms 4700, the plurality of main truss linkage arms 4702, the plurality of strut truss linkage arms 4704, the plurality of strut linkage arms 4706, and the plurality of perimeter truss linkage arms 4708.

As shown in FIG. 48, the top chord of the various linkage arms 4700, 4702, 4704, 4706, 4708 generally align. The lower truss portion of the double main truss linkage arms 4700 extends below the upper truss portions. The rotor assemblies 108 coupled to the top side of the right rotor support frame 120 are generally horizontally aligned, but the rotor assemblies 108 coupled to the underside of the right rotor support frame 120 have various elevations based on the height of the linkage arm 4700, 4702, 4704, 4706, 4708.

Referring again to FIGS. 46, 47 and 48, the extended multirotor flying vehicle 4600 includes additional linkage arm embodiments to support the additional rotors. In order to economize on frame construction, several different linkage arms types are utilized as needed for strength and stability. The linkage arms 4700, 4702, 4704, 4706, 4708 generally comprise steel, aircraft aluminum, carbon fiber, or any other suitable material. The support frame may utilize the triangular grid, as shown in FIGS. 46, 47 and 48, or may use one of the other grid systems previously described, e.g. square, hexagonal, etc. Additionally, previously described linkage arm embodiments may be used, e.g. plate, diamond or hexagonal designs.

Figure 49:
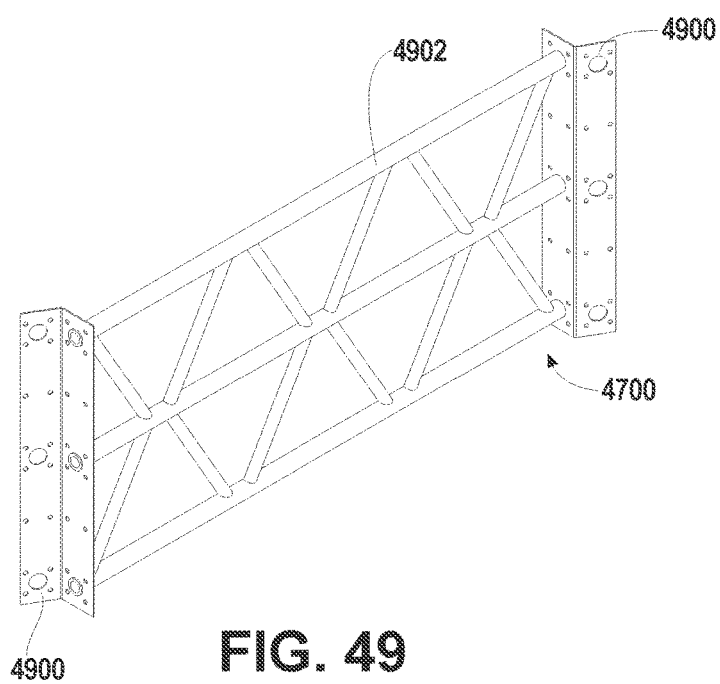
FIG. 49 a perspective view of a double main truss linkage arm of the extended multirotor flying vehicle.

Referring next to FIG. 49, a perspective view of the double main truss linkage arm 4700 is shown in one embodiment of the present invention. Shown are a plurality of connection plates 4900, and a double truss 4902.

The double truss 4902 includes a top chord, a middle chord, and a bottom chord. The top chord, bottom chord and middle chord are all generally parallel, with the diagonals coupling the top chord and the bottom chord to the middle chord, forming the vertical double truss structure. The chords are coupled to the vertical connection plates 4900 at each end of the double truss 4902. The chords and diagonals for the linkage arms of FIGS. 49, 50, and 52-54 generally comprise tubular sections. The connection plates 4900 are generally L-shaped with the face of a first leg of the L coupled to the double truss 4902 and a second leg extending outward at an angle of 120 degrees with respect to the first leg. In some embodiments there may be an interior support plate depending on the anticipated load.

Figure 50:
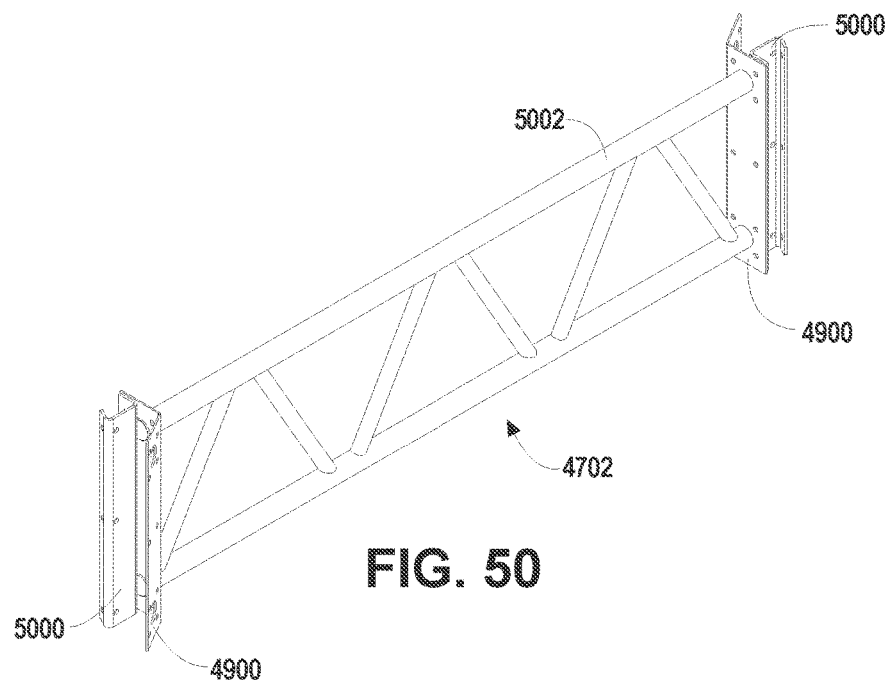
FIG. 50 is a perspective view of a main truss linkage arm of the extended multirotor flying vehicle.

Referring next to FIG. 50, a perspective view of the main truss linkage arm 4702 is shown in one embodiment of the present invention. Shown are the connection plates 4900, a plurality of hub plates 5000, and a single truss 5002.

The main truss linkage arm 4702 includes the single-height single truss 5002 interposed between the vertical connection plates 4900. The connection plates 4900 are of the same general L-cross-section as those for the double main truss linkage arm 4700, except shorter to accommodate the lesser height of the single-height single truss 5002. In general, the connection plates 4900 generally extend slightly above and slightly below the vertical extents of the truss end the connection plate 4900 is coupled to. The main truss linkage arms 4702 also includes one hub plate 5000 coupled to the first leg of the connection plate 4900 and extending outward. The hub plates 5000 reinforce the connection and allow the main truss linkage arms 4702 to pass forces to the adjacent frame members in a direct, on-axis path, allowing the connection to be made of thinner and/or lighter material.

Figure 51:
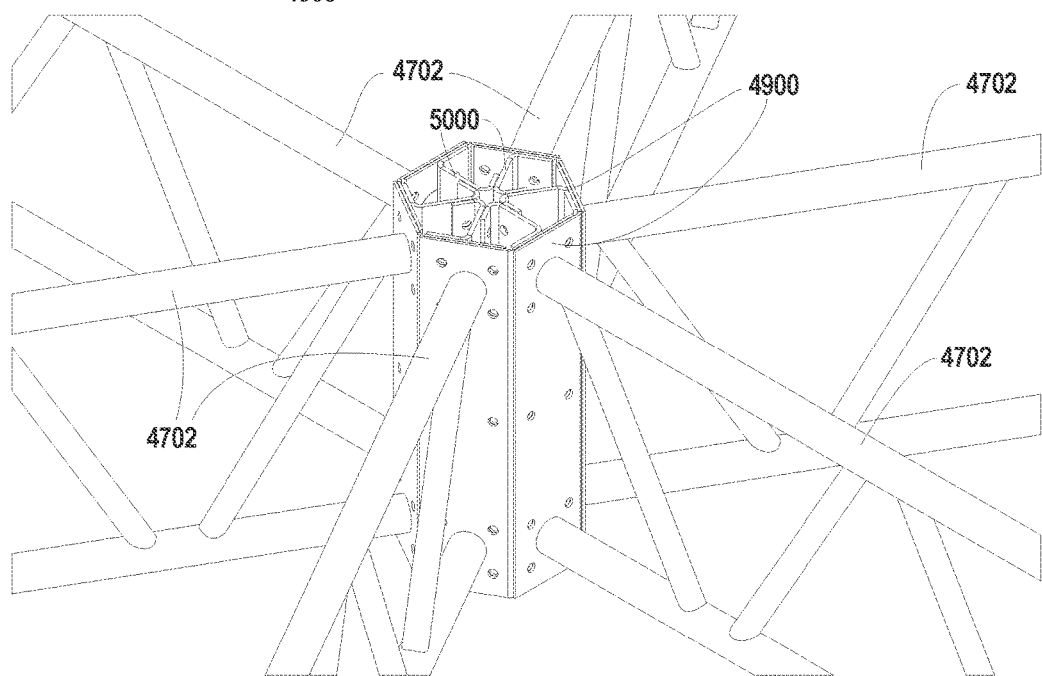
FIG. 51 is a perspective view of a main truss linkage arm hub connection of the extended multirotor flying vehicle.

Referring next to FIG. 51, a perspective view of a main truss linkage arm hub connection is shown in one embodiment of the present invention. Shown are the plurality of main truss linkage arms 4702 and the plurality of connection plates 4900.

As for the previous triangular grid embodiments, ends of six linkage arms 4702 are coupled together to form each interior vertex. As shown in FIG. 51, each first leg of the connection plate 4900 of each main truss linkage arm 4702 overlaps the second arm of the adjacent connection plate 4900. Each first leg is then coupled to the overlapping second leg, forming a central hexagonal hub. The hub plates 5000 are enclosed within the hexagonal hub.

Figure 52:
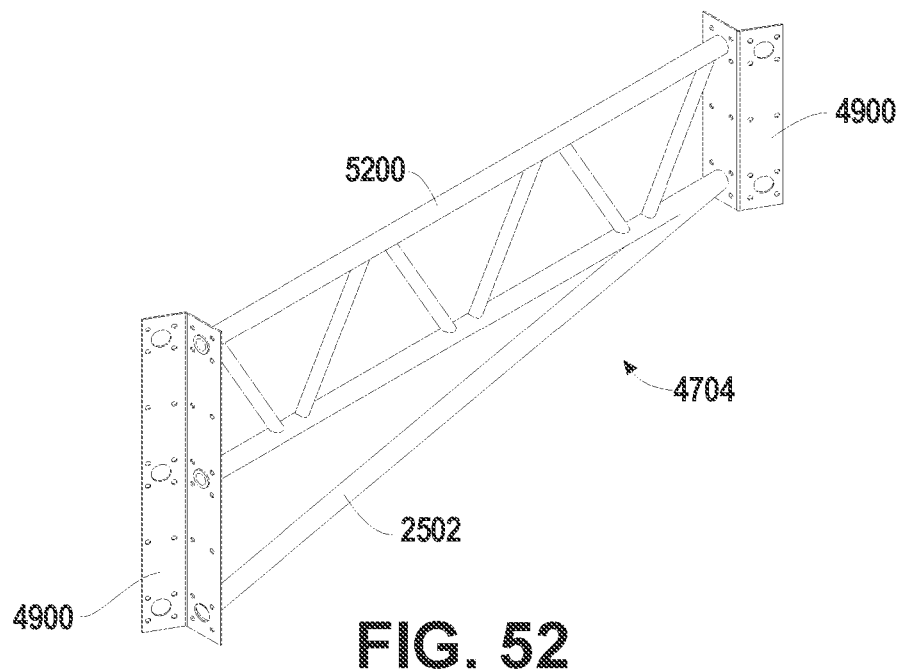
FIG. 52 is a perspective view of a strut truss linkage arm of the extended multirotor flying vehicle.

Referring next to FIG. 52, a perspective view of the strut truss linkage arm 4704 is shown in one embodiment of the present invention. Shown are the connection plates 4900, a strut truss 5200, and a first strut 5202.

The strut truss linkage arm 4704 is similar to the main truss linkage arm 4702, with the strut truss 5200 similar to the truss 5002, and the strut truss 5200 juxtaposed between the two connection plates 4900. One connection plate 4900 extends below the strut truss 5200, approximately the length of the connection plates 4900 of the double main truss linkage arm 4700. The lower portion of the extended portion of the connection plate 4900 is coupled to the first strut 5202, which extends diagonally upward from the connection plate 4900 to the lower chord of the strut truss 5200 proximate to the opposite connection plate 4900. The additional strut truss 5200 typically provides a braced transition from the double main truss linkage arm 4700 coupled to the side with the extended connection plate 4900, to the perimeter truss linkage arm 4708 coupled to the other side of the strut truss linkage arm 4704.

Figure 53:
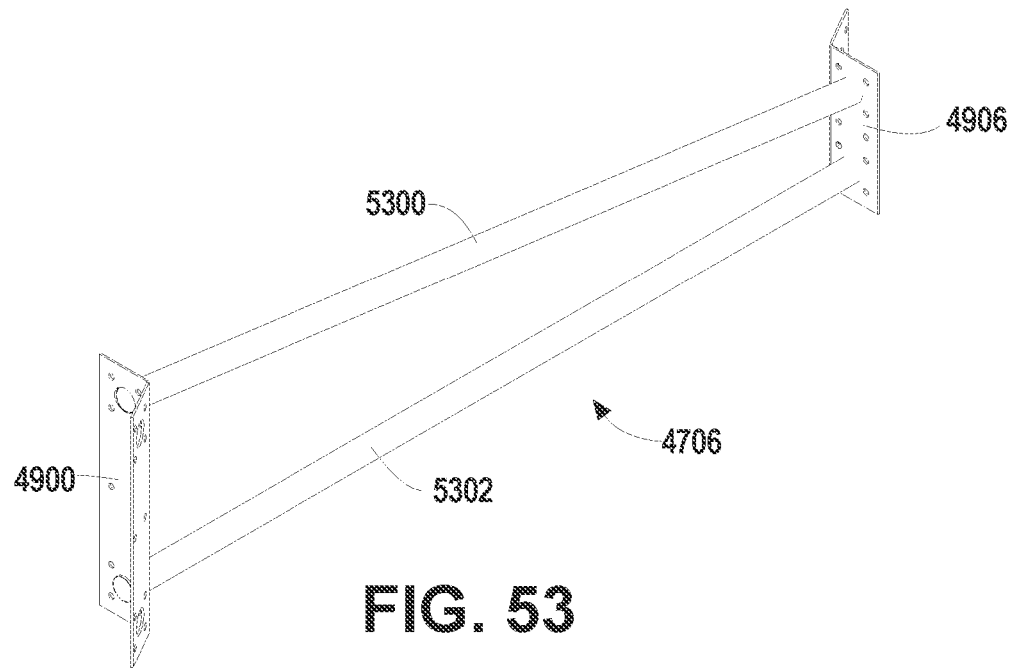
FIG. 53 is a perspective view of a strut linkage arm of the extended multirotor flying vehicle.

Referring next to FIG. 53, a perspective view of the strut linkage arm 4706 is shown in one embodiment of the present invention. Shown are the connection plates 4900, a second strut 5300 and a third strut 5302.

The strut linkage arm 4706 includes the upper horizontal second strut 5300 interposed between the two connection plates 4900, and the lower diagonal third strut 5302 also interposed between the connection plates 4900. On one side, the connection plate length is configured for the height of the connection plate 4900 for the main truss linkage arm 4702. On the other side, the connection plate length is configured for the height of the perimeter truss linkage arm 4708. In general, the strut linkage arm 4706 is a transition linkage arm between the main truss linkage arm 4702 and the perimeter truss linkage arm 4708.

Figure 54:
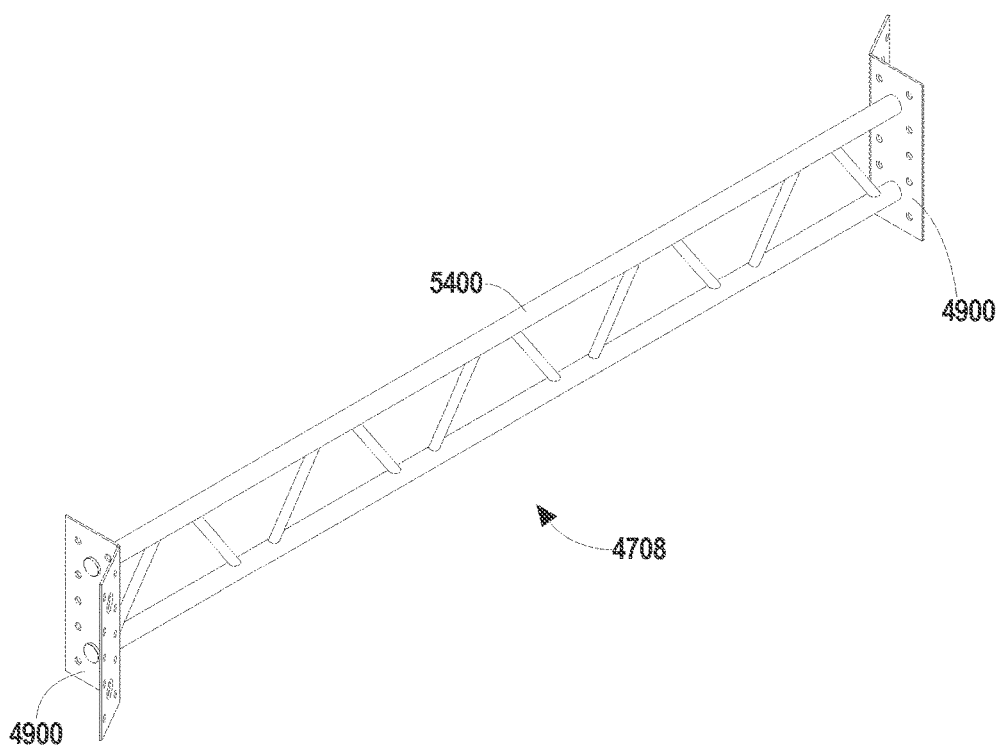
FIG. 54 is a perspective view of a perimeter truss linkage arm of the extended multirotor flying vehicle.

Referring next to FIG. 54, a perspective view of the perimeter truss linkage arm 4708 is shown in one embodiment of the present invention. Shown are the connection plates 4900 and a perimeter truss 5400.

The perimeter truss linkage arm 4708 is similar to the main truss linkage arm 4702, with the perimeter truss 5400 interposed between the two connection plates 4900. The height of the perimeter truss 5400 is smaller than the height of the truss 5002. In some embodiments, the height of the perimeter truss 5400 is approximately 4 of the height of the truss 5002.

Figure 55:
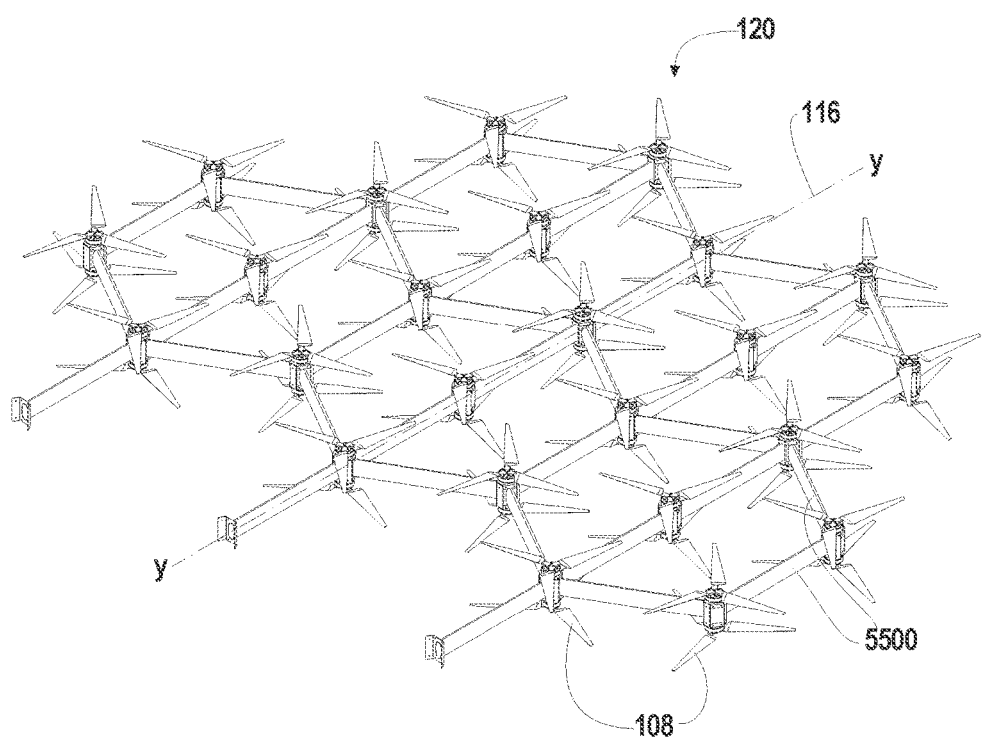
FIG. 55 is a perspective view of a right rotor support frame in yet another embodiment of the present invention.

Referring next to FIG. 55, a perspective view of a right rotor support frame 120 is shown in yet another embodiment of the present invention. Shown are the plurality of rotor assemblies 108, the y-axis 116, and a plurality of tube linkage arms 5500.

In another frame embodiment, a modified hexagon frame layout with tube linkage arms 5500 is used. The modified hexagon layout includes additional linkage arms 5500 across each hexagon shape, splitting the hexagon in half. The additional linkage arm are oriented parallel to the y-axis 116.

Figure 56:
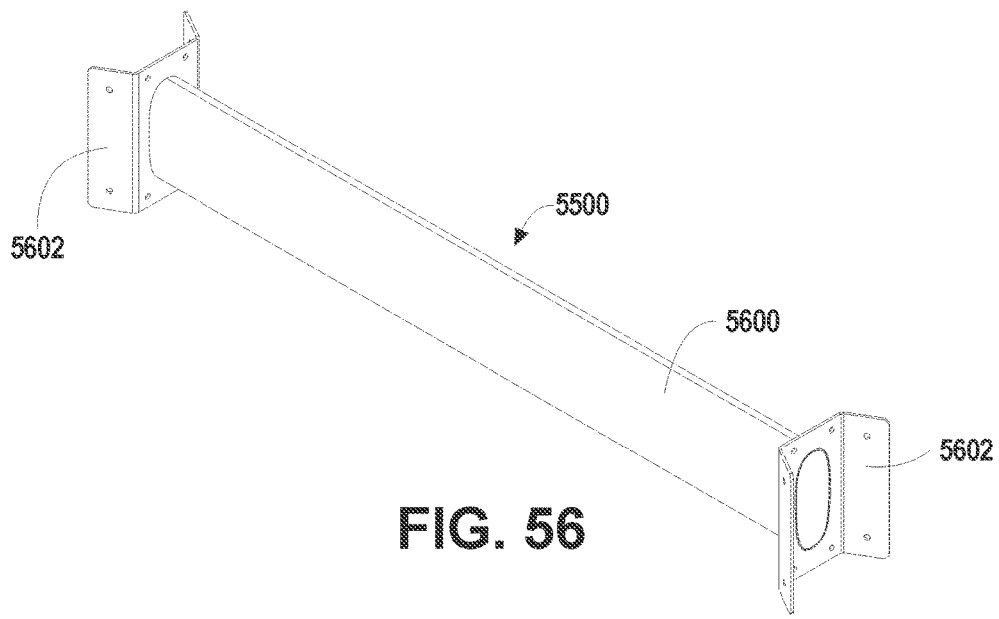
FIG. 56 is a perspective view of a tube linkage arm.

Referring next to FIG. 56, a perspective view of the tube linkage arm 5500 is shown in one embodiment of the present invention. Shown are a tube member 5600 and two tube connection plates 5602.

The tube linkage arm 5500 comprises the tube member 5600 interposed between the two tube connection plates 5602. The tube member 5600 is shown as an oval shape oriented vertically, but other tube/pipe shapes may be used. The tube connection plates 5602 are general U-shapes, with the base of the U-shape coupled to the proximate end of the tube member 5600 and the U legs extending away and outward from the base at an 120 degree angle (i.e. in a general V-shape with the point flattened).

Figure 57:
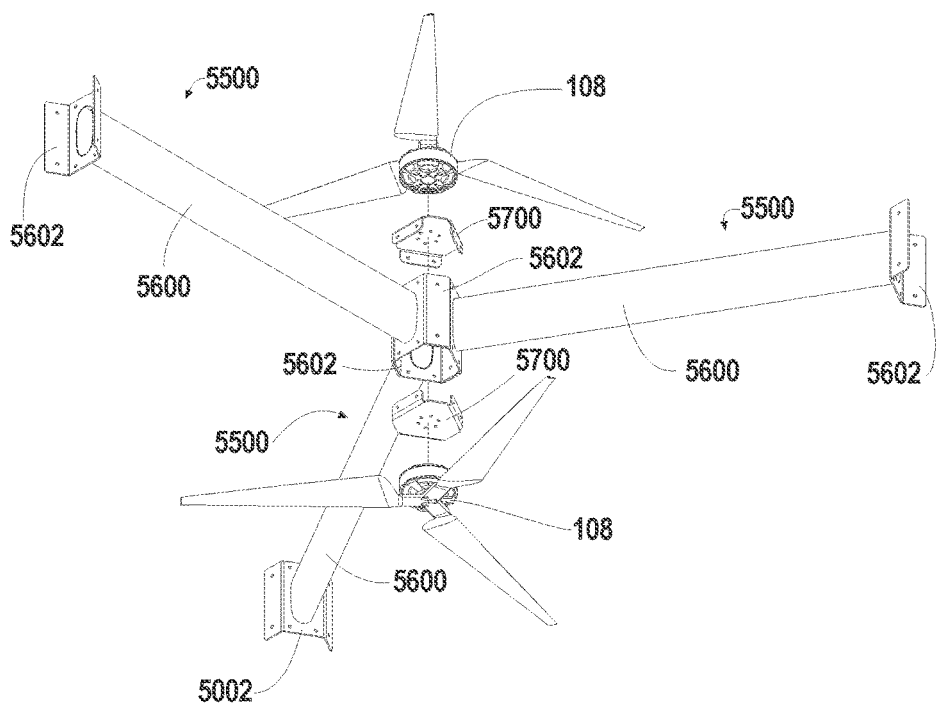
FIG. 57 is a perspective view of an exploded view of two rotor assemblies coupled to three tube linkage arms.

Referring next to FIG. 57, a perspective exploded view of two rotor assemblies 108 coupled to three tube linkage arms 5500 is shown. Shown are the rotor assemblies 108, a tube mounting plate 5700, the plurality of truss members 5600, the plurality of tube connection plates 5602, and two tube mounting plates 5700.

In the exemplary frame vertex shown in FIG. 57, three tube linkage arms 5500 are coupled together forming a Y-shape. The U-legs of the tube connection plates 5062 at the vertex overlap and are coupled together, forming a hollow asymmetric hexagon shape. The tube mounting plates 5700 are configured to couple to each end of the hexagon shape and provide a mounting location for each rotor assembly 108.

Figure 58:
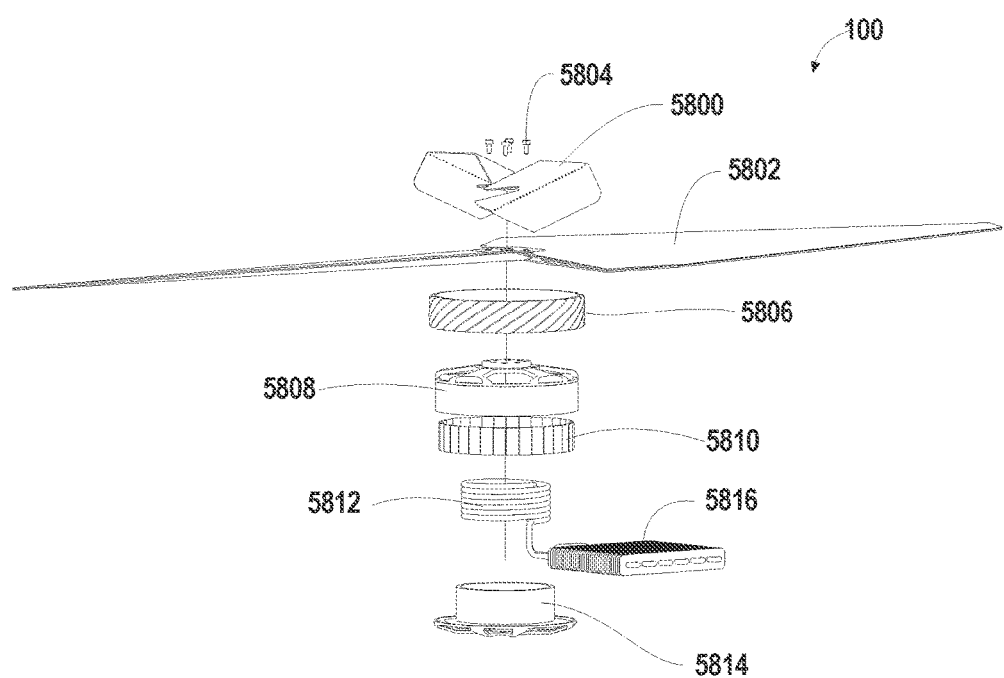
FIG. 58 is a front elevational exploded view of a rotor assembly.

Referring next to FIG. 58, a front elevational exploded view of a rotor assembly 108 is shown in one embodiment of the present invention. Shown are an air scoop 5800, a rotor 5802, a plurality of fasteners 5804, a heatsink 5806, a bellhousing 5808, a magnet assembly 5810, a coolant circulator 5812, a radiator 5816, and a stator 5814.

The propulsion system of the single rotor assembly 108 includes the rotating subassembly comprising the air scoop 5800, the rotor 5802, the heatsink 5806, the bellhousing 5808, and the magnet assembly 5810. The rotating subassembly is rotationally coupled to a fixed subassembly coupled to the frame. The motor in some embodiments is an electric turbine motor as commonly known in the art. The fixed base assembly comprises the coolant circulator 5812, the radiator 5816, and the stator 5814.

The tubular fixed stator 5814 is coupled to the frame, typically by a mounting plate configured for the frame design. The coolant circulator 5812 comprises piping arranged in a spiral tubular configuration that fits within the stator 5814. The piping is fluidly coupled to the radiator 5816 and is configured to carry coolant. The radiator 5816 includes a pump and is configured to cool the coolant and pump it through the coolant circulator system in a closed-loop fashion. The coolant circulator 5812 is conductive to (i.e. thermally doped to) the interior face of electromagnetic laminations of the stator 5814. The radiator 5816 may use the rotor assembly's generated air column to aid in heat dissipation, and may be coupled to a single rotor or multiple rotors. The radiator 5816 may optionally be coupled to a thermostat. The interior coolant circulator 5812 provides for heat dissipation in all-weather or dirty environments where a motor design including an open housing may allow water or debris intrusion.

The tubular magnet assembly 5810 and the outer bellhousing 5808 are rotationally coupled to the stator 5814, with the magnet assembly 5810 housed within the bellhousing 5808. The bellhousing 5808 includes vents in the top portion of the bellhousing 5808. The tubular heatsink 5806 is coupled to and surrounds the perimeter of the bellhousing 5808. The heatsink 5806 includes a plurality of exterior diagonal radiator fins providing passive cooling for the magnet assembly 5810. As the heatsink 5806 rotates with the bellhousing 5808, the fins move through the air, improving heat transfer. The magnets of the magnet assembly 5810 lose their magnetism above a certain temperature threshold, causing premature motor wear and failure. The fins improve heat conduction from the magnets through the bellhousing 5808, then dissipating the heat outward into the air.

The rotor 5802 is coupled to the top portion of the bellhousing 5808, in the embodiment shown via the plurality of fasteners 5804. The air scoop 5800 is coupled to the top center portion of the rotor 5802. The air scoop 5800 increases the air pressure at the bellhousing 5808 vents as the air scoop 5800 rotates with the rotor 5802, forcing airflow through the motor to dissipate heat. This is important because hovering vehicles don't benefit as much from airflow induced by moving rapidly through a column of air as airplanes do. Integration of the air scoop 5800 with the rotor design is preferred but the air scoop 5800 may also be bolted on to a conventional rotor 5802 as shown in FIG. 58.

Each rotor assembly 108 is electrically coupled to and powered by at least one power assembly 110. Each rotor assembly 108 is also coupled to and operated by the control system.

Propeller, motor cost, and efficiency design improvements are key factors in feasibility of a high-MR system. Due to the nature of the multirotor design where thrust is adjusted not by rotor pitch but by blade velocity (RPM), light-weight and efficient at lower speed rotors are one area for improvement. Since quantity of rotors in a high-multirotor design are relatively high, a more manufacturable and low cost design is important. In some embodiments rotors 5802 may be made from sheet metal for ease of manufacturing. A two-plate propeller design, connected by spacers and contoured to an aerodynamic profile, covered by a high-strength thin polycarbonate film, with plate cut-outs to reduce weight in non-critical areas may be ideal. Bends forming blade contour extending to the hub improve strength. In some embodiments stacked plates may be used towards the root of the blade to optimize the blade strength. Conceptual designs are weight-competitive with state-of-the-art carbon-fiber rotors yet would cost a fraction to produce.

Motor capacity is mostly limited by thermal issues, where efficiency is lost as internal heat generated by friction and electrical current ($I^2*R$) causes the motor to exceed its efficiency zone, and maximum operating temperature is limited by heat limitations of the fixed magnets determined by the magnets' Curie point. New 'pancake motor' designs open the motor housing to increase cooling, but more is required and several design innovation options are available. By affixing the rotationally-mirrored air scoop 5800 on top of or below the rotor 5802, ideally integrated with the rotor design, increased cooling air can be forced through the motor, increasing capacity per motor size and improving motor life by lowering operating temperatures. Cooling fins on the outside of the motor's rotating bellhousing 5808 would aid in cooling magnets mounted in the interior. A heat-pump solution where coolant is circulated internally through the stator 5814 of the motor and dissipated via a radiator mounted in the rotor airstream may also be utilized because it can be thermally regulated and would lead towards a more weather-proof closed motor design.

Power supply options for the rotor assemblies 108 108 vary and may include any solution that provides adequate electrical power while not exceeding maximum weight requirements. Typically lithium-ion batteries may be used as either a primary power source or as a backup power source to facilitate emergency landing in the event of a primary power failure. Other power sources may be based on fuel cells, a combustion engine coupled to an electrical generator, or other suitable forms of electric power generation.

In some embodiments each rotor assembly 108 includes a small emergency landing battery located directly under the motor, in aerodynamic shadow, that contains enough power to perform a reasonable safe landing profile. The emergency landing battery electrical capacity may be used under certain circumstances like 'support main battery mode' when approaching destination at end of a long flight when voltage drop damages batteries.

To improve tolerance to electrical failures, the power system may be divided into multiple independent subsystems in such a way that in the event of an entire battery/motor subsystem failure adequate thrust is generated by the remaining systems to enable the vehicle to accomplish a safe emergency landing.

Figure 59:
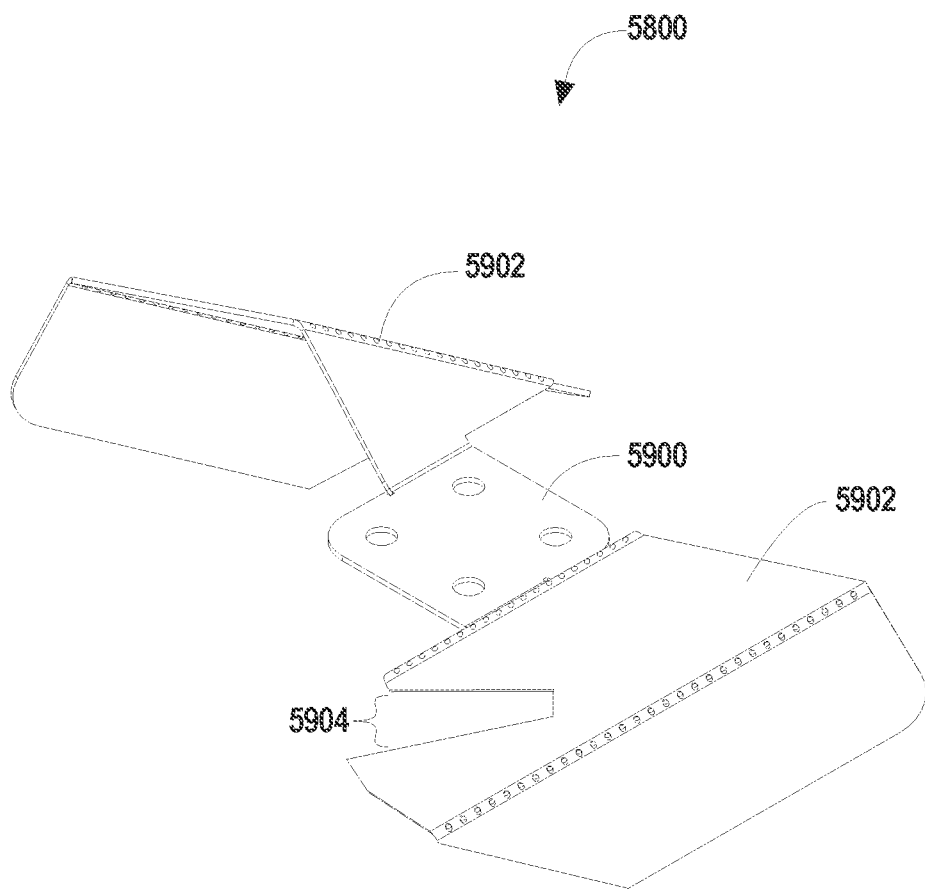
FIG. 59 is a perspective view of an air scoop.

Referring next to FIG. 59, a perspective view of the air scoop 5800 is shown. Shown are a mounting plate 5900, two scoop wings 5902, and two scoop notches 5904.

The air scoop 5800 (also referred to as the integrated cooling duct) is coupled to the top face of the rotor 5802. The air scoop 5800 comprises the central flat mounting plate 5900, coupled to the center area of the rotor 5802, interposed between two opposing inverted-U shaped scoop wings 5902 extending outward from the mounting plate 5900. The scoop wings 5902 are configured such that when the air scoop 5800 is installed on the rotor 5802, the inverted-U portions fit between the opposing rotor blades. Each scoop wing 5902 includes the side scoop notch 5904 configured to fit around one rotor blade.

Figure 60:
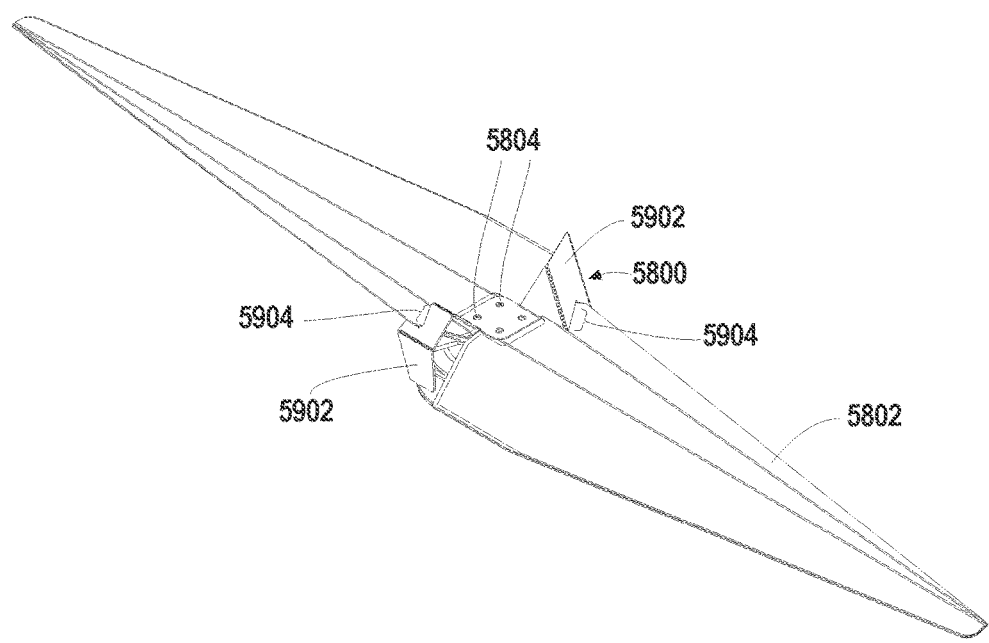
FIG. 60 is a perspective view of the air scoop installed on a rotor.

Referring next to FIG. 60, a perspective view of the air scoop 5800 installed on the rotor 5802 is shown. Shown are the rotor 5802, the air scoop 5800, the mounting plate 5900, the scoop wings 5902, and the scoop notches 5904.

The air scoop 5800 is installed on the rotor 5802 (or is integrally formed with the rotor 5802 such that the scoop wings 5902 are located at gaps between the two opposing rotor blades near the rotational center of the rotor 5802. Each scoop wings 5902 substantially fills the gap between the rotor blades on one side of the rotor 5802. The inverted U-shape of each scoop wing 5902, when coupled to the rotor 5802, slopes down to and notches over the leading edge of the rotor 5802 via the scoop notch 5904 (although in other embodiments the scoop notch 5904 notches over the trailing edge).

In other embodiments the air scoop function may be assisted or replaced by modifying the motor by shaping the shafts that attach the hub to the outer bellhousing 5808 into a diagonal fan blade that typically has a long, thin aspect ratio and an optimal pitch to force air through the motor. In some embodiments the air scoop 500 is integral with the rotor 5802.

During the rotation of the rotor 5802, the air scoop 5800 increases the air pressure at the top of the bellhousing 5808 opening as the air scoop 5800 rotates with the rotor 5802, forcing airflow through and around the motor assembly to dissipate heat. This is important because hovering vehicles don't benefit as much from airflow induced by moving rapidly through a column of air, as airplanes do. Integration of the air scoop 5800 with the rotor 5802 is preferred but the air scoop 5800 may also be bolted on to conventional rotor 5802 designs.

Figure 61:
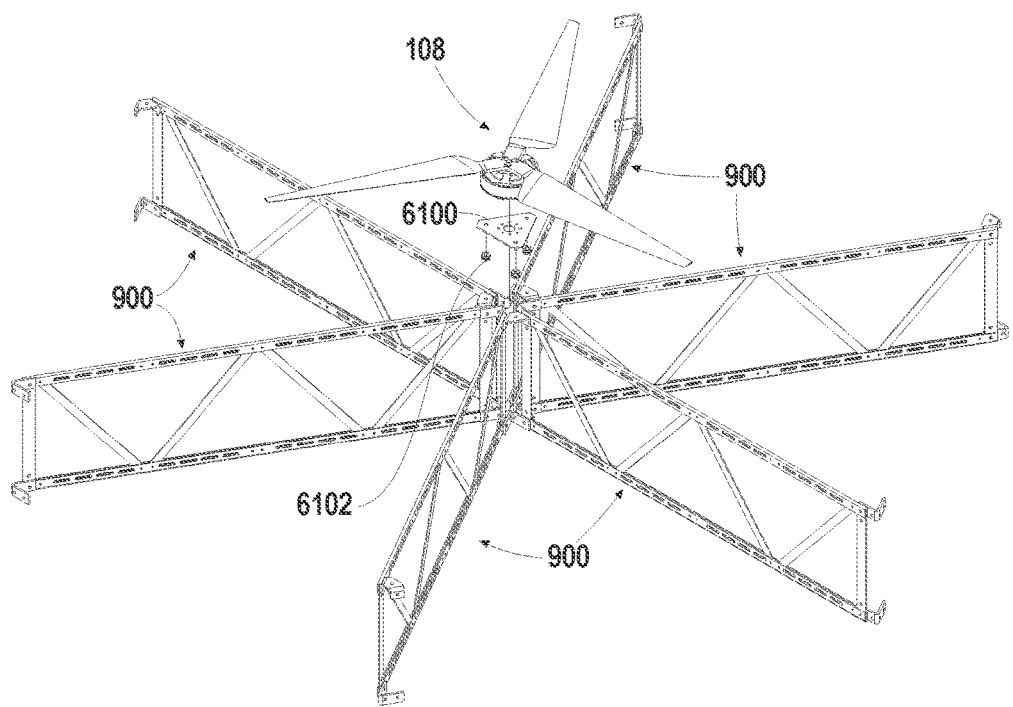
FIG. 61 is a perspective exploded view of a rotor assembly mounted on second linkage arms.

Referring next to FIG. 61, a perspective exploded view of the rotor assembly 108 mounted on second linkage arms 900 is shown. Shown are the rotor assembly 108, the plurality of second linkage arms 900, a first rotor mounting plate 6100 and a plurality of first spacers 6102.

The rotor assembly 108 is coupled to the assembly of six second linkage arms 900 (in the triangular grid configuration) via the generally triangular first rotor mounting plate 6100. The first rotor mounting plate 6100 includes a plurality of holes used for fastening the rotor assembly 108 to the first rotor mounting plate 6100, and also for fastening the first rotor mounting plate 6100 to the three upper left tabs 504 of the second linkage arms 900 that provide the horizontal mounting surface. Second linkage arms 900 are shown, but other triangular grid linkage arm variations, such as the first linkage arms 518, may be used. The first spacers 6102 are interposed between the upper left tabs 504 and the first mounting plate 6100.

In general, rotor/motor/adapter plate assemblies attached at linkage arm intersections using opposed triangular vibration isolators via 90-deg opposed brackets is seen as a good solution to limit potential aggregate vibration resonance issues. Motors may be mounted at the top and/or bottom of the structural frame. In some embodiments the motors may be located within the z-dimension of the grid (i.e. "embedded" within the frame). A 'synchropter' design may be utilized where rotors 5802 are overlapping but synchronized to avoid hitting each other. The rotors 5802 may be synchronized mechanically or electronically. Overall a circular arrangement of rotors 5802 around a central body surrounded by a perimeter shroud 4200 may be an ideally efficient design, but mounting such a grid above the vehicle body (conventional helicopter layout) may be top-heavy and mounting on or below-plane leads to visibility and access issues. A two or three grid design may be better overall, mounting heavy batteries towards the rear to counterbalance load at the front with good forward vision. The motor mounts may include vibration isolation (pitch on the Z-axis) with X-Y constraint via triangular isolation dampers.

Figure 62:
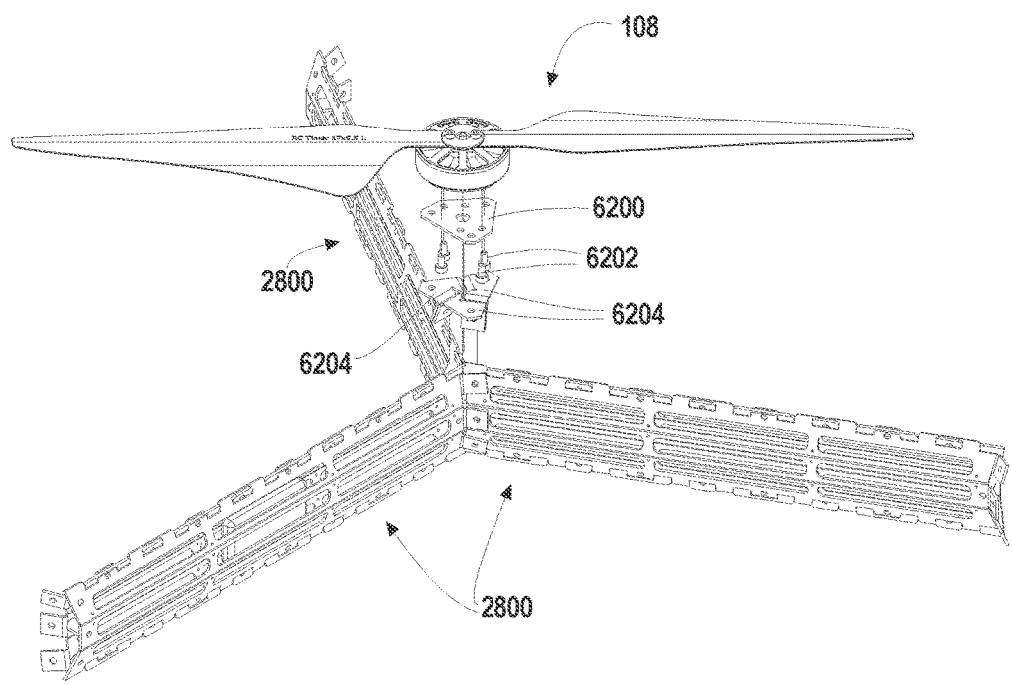
FIG. 62 is a perspective exploded view of a rotor assembly mounted on hexagon linkage arms.

Referring next to FIG. 62, a perspective exploded view of the rotor assembly 108 mounted on hexagon linkage arms 2800 is shown. Shown are the rotor assembly 108, three hexagon linkage arms 2800, a second mounting plate 6200, a plurality of fasteners 6202, and three mounting tabs 6204.

For mounting to the three-linkage arm configuration of the hexagon grid, generally vertical mounting holes located near the top side of the hexagon linkage arms 2800 are used. The three mounting tabs 6204 are coupled together to provide generally vertical tab portions for coupling to the hexagon linkage arms 2800 and a generally horizontal portion. The second mounting plate 6200 is coupled to the mounting tabs 6204 via the fasteners 6202 or other appropriate means for coupling. The rotor assembly 108 is coupled to the second mounting plate 6200. In lieu of the hexagon linkage arms 2800, other suitable linkage arms may be used.

Figure 63:
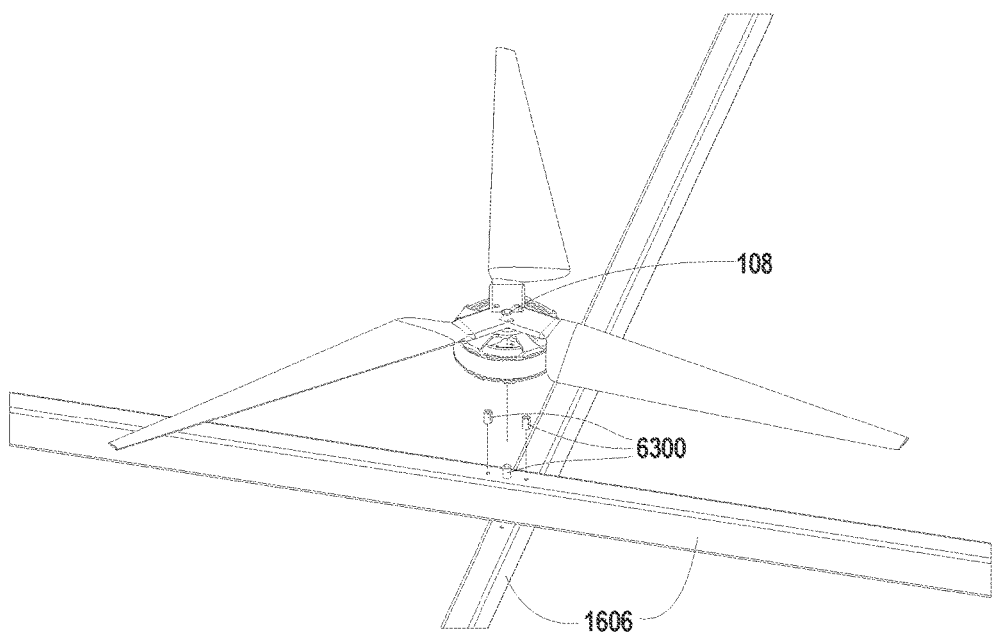
FIG. 63 is a perspective exploded view of a rotor assembly mounted to pivoting linkage arms.

Referring next to FIG. 63, a perspective exploded view of the rotor assembly 108 mounted to the pivoting linkage arms 1606 is shown. Shown are the rotor assembly 108, a plurality of spacers 6300, and the pivoting linkage arms 1606.

As previously described, the pivoting linkage arms 1606 are show in the square grid configuration, with one pivoting linkage arm 1606 running under another pivoting linkage arm 1606 at each grid vertex. The rotor assembly 108 is directly mounted to a top surface of the top pivoting linkage arm 1606. The plurality of spacers 6300 are interposed between the pivoting linkage arm 1606 and the rotor assembly 108.

Figure 64:
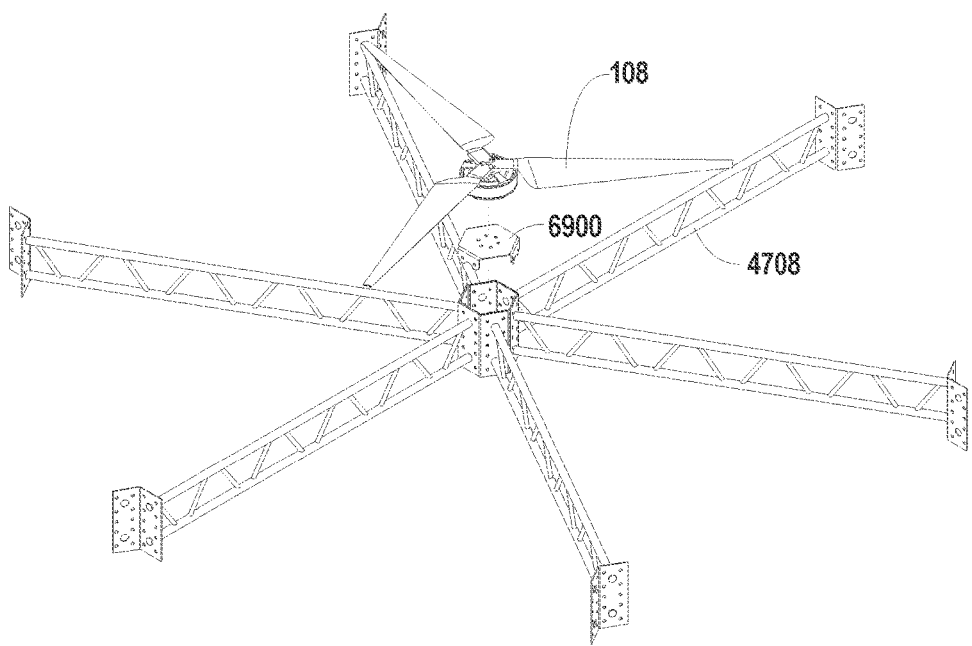
FIG. 64 is a perspective exploded view of a rotor assembly is shown mounted to a plurality of perimeter truss linkage arms.

Referring next to FIG. 64, a perspective exploded view of the rotor assembly 108 is shown mounted to the plurality of perimeter truss linkage arms 4708. Shown are the rotor assembly 108, a hexagon mounting plate 6400, and the plurality of perimeter truss linkage arms 4708.

For the extended multirotor flying vehicle 4600 previously shown in FIGS. 46-54, the vertices are general hexagon-shaped, as shown in FIG. 51. Although FIG. 64 shows the perimeter truss linkage arm 4708, it will be understood that the mounting may on any vertex with a similar configuration (i.e. the double main truss linkage arms 4700, the truss linkage arms 4702, etc.)

The hexagon mounting plate 6400 comprises a hexagon-shaped plate configured to fit over the hexagonally-shaped vertex, and also includes three tabs extending downward from the hexagon-shaped plate and configured to couple to the sides of the hexagonally-shaped vertex.

The rotor assembly 108 is coupled to the top face of the hexagon-shaped plate by fasteners or other suitable coupling method.

Figure 65:
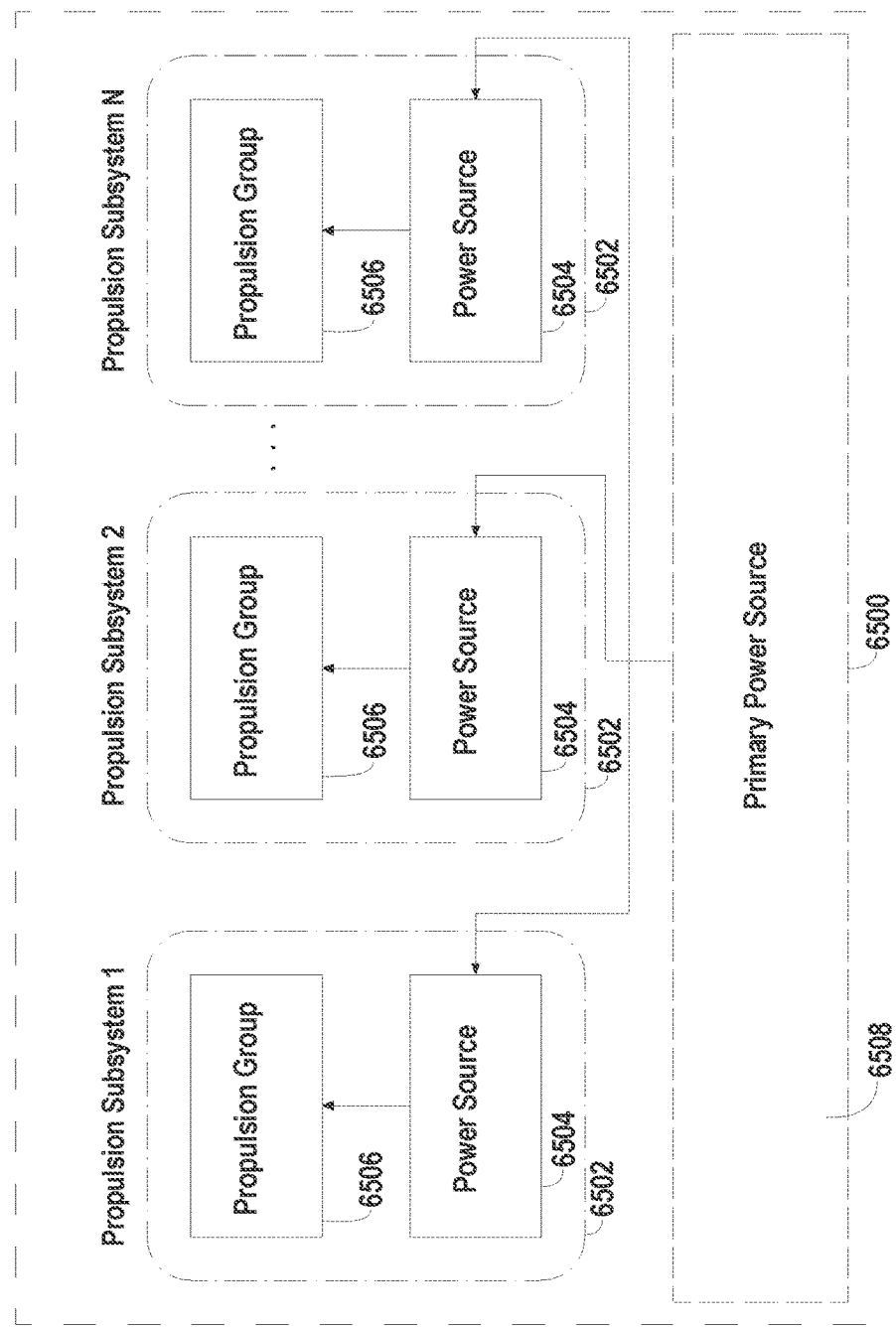
FIG. 65 is a schematic diagram of an exemplary power system for a multirotor flying vehicle.

Referring next to FIG. 65, a schematic diagram of an exemplary power system 6508 for a multirotor flying vehicle is shown. Shown are a primary power source 6500, a plurality of propulsion subsystems 6502, a plurality of subsystem power sources 6504, and a plurality of propulsion groups 6506.

Each propulsion subsystem 6502 includes at least one power source 6504 and one propulsion group 6506. Each propulsion group 6506 includes a plurality of rotor assemblies 108. Each rotor assembly 108 in the propulsion subsystem 6502 is coupled to and powered by the at least one power source 6504 of that propulsion subsystem 6502. The power system 6508 includes a plurality of propulsion subsystems 6502. The number of propulsion subsystems 6502 is dependent on various factors, including a number of subsystems 6502 to provide airworthiness of the vehicle even in event of the failure of one or more subsystems 6502. Factors may also include the number of independent propulsion subsystems 6502 required and/or the maximum/minimum number of rotor assemblies 108 in each propulsion subsystem 6502. Geometric distribution is optimized so that loss of one propulsion subsystem 6502 results in a geometrically balanced failure rather than failure in one quadrant which would result in vehicle instability.

Each propulsion subsystem 6502 is configured to be powered independently of the other propulsion subsystems 6502, i.e. if one propulsion subsystem 6502 fails the other propulsion subsystems 6502 are not affected. In some embodiments, the optional primary power source 6500 is included. The primary power source 6500 is coupled to and configured to supply power to all of the propulsion subsystems 6502. In some embodiments, under normal operation the primary power source 6500 provides power to the propulsion subsystems 6502, with the subsystem power sources 6504 providing power if the primary power source 6500 is not in operation. The control system is configured to monitor the plurality of propulsion subsystems 6502 and allow any subsystem 6502 to power-down without catastrophic effects to the vehicle.

Figure 66:
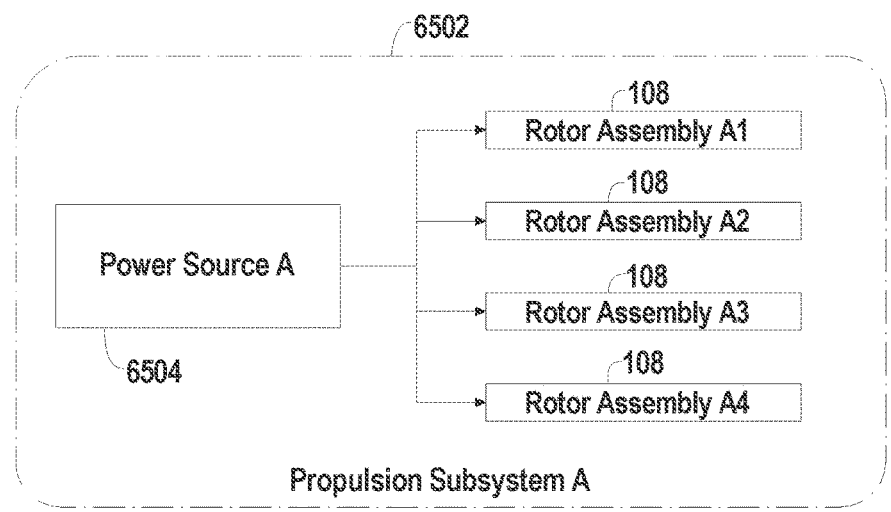
FIG. 66 is a schematic diagram of an exemplary power subsystem for a multirotor flying vehicle.

Referring next to FIG. 66, a schematic diagram of an exemplary propulsion subsystem 6502 is shown in one embodiment of the present invention. Shown are the subsystem power source 6504, and the plurality of rotor assemblies 108.

As previously described, each propulsion subsystem 6502 includes the subsystem power source 6504 coupled to and powering the plurality of rotor assemblies 108 in the propulsion group 6506. In the embodiment shown, four rotor assemblies 108 are shown, although it will be understood that various numbers of rotor assemblies 108 may be included. The number of rotor assemblies 108 may be the same for each propulsion subsystem 6502 of the flying vehicle, or the number of rotor assemblies 108 may vary.

Figure 67:
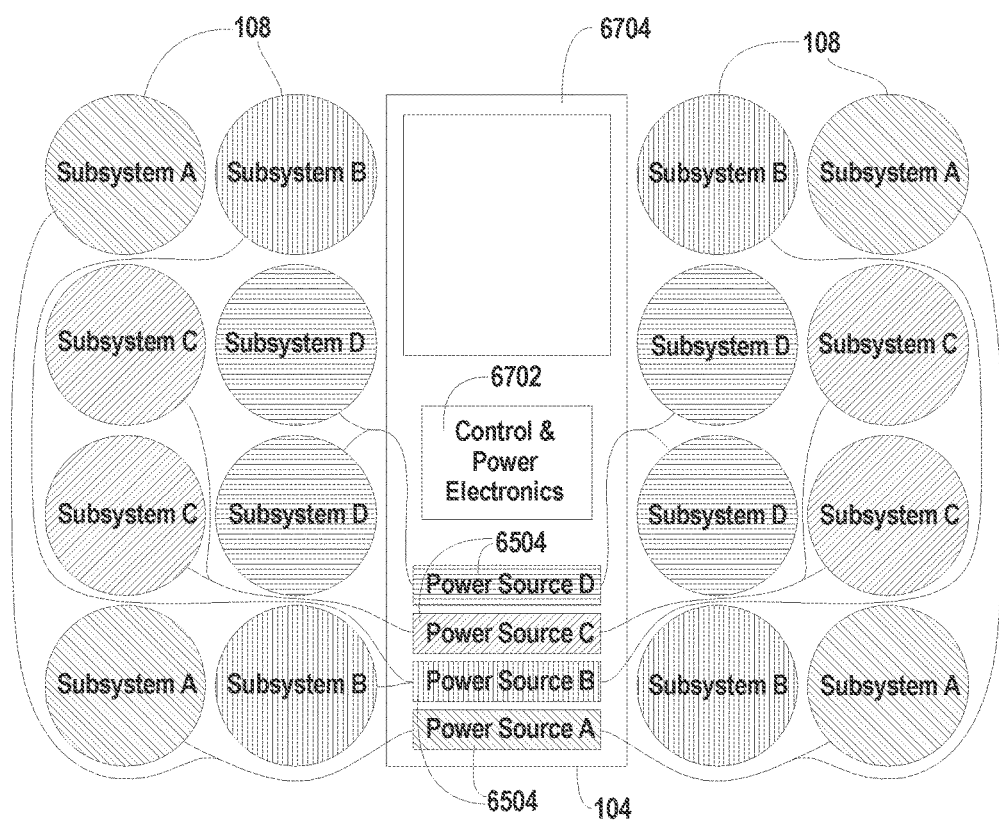
FIG. 67 is a simplified plan view of an exemplary multirotor flying vehicle showing rotor assembly layout.

Referring next to FIG. 67, a simplified plan view of an exemplary multirotor flying vehicle 6700 showing rotor assembly layout is shown. For clarity, no rotor support frame elements are shown. Shown are the fuselage 104, the plurality of rotor assemblies 108, the plurality of subsystem power sources 6504, a control system 6702, and a payload 6704.

The exemplary multirotor flying vehicle 6700 includes the central fuselage 104, which houses the subsystem power sources 6504, the control system 6702 and the payload 6704. The plurality of rotor assemblies 108 are arranged on each side of the fuselage 104. Each rotor assembly 108 is assigned to one subsystem power source 6504, as indicated by the letters A-D, i.e. subsystem power source A controls rotor assemblies A, etc. In the exemplary system shown, there are four subsystem power sources 6504, with each subsystem power source 6504 powering four rotor assemblies 108. The rotor assemblies 108 for each subsystem power source 6504 are arranged doubly symmetrically with respect to the overall grid layout. The rotor assemblies 108 are shown in a square grid layout for illustrative purposes, but it will be understood that aby suitable grid layout (triangle, hexagon, etc.) may be used.

In FIG. 67, operational subsystem power sources 6504 are indicated by shading, with each subsystem power source 6504 having a different shading type. The vehicle 6700 of FIG. 67 has all subsystem power source 6504 (A-D) operational, therefore all subsystem power sources 6504 and all rotor assemblies 108 are shown shaded.

Figure 68:
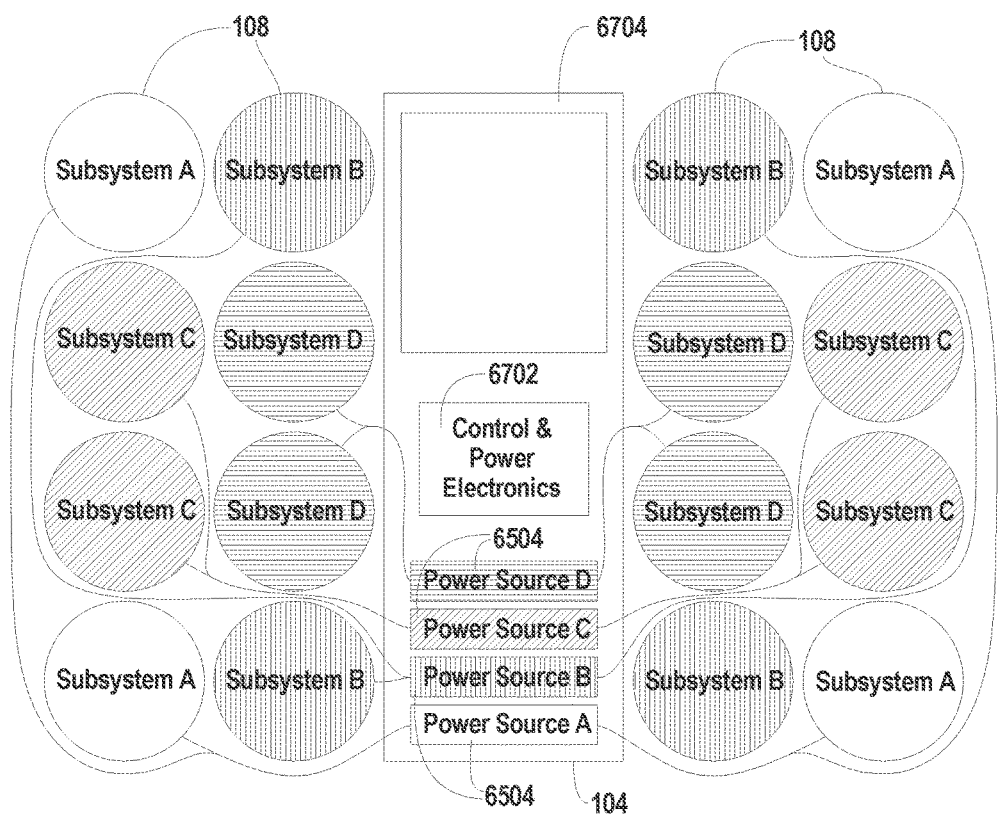
FIG. 68 is a simplified plan view of the exemplary multirotor flying vehicle with the subsystem power source A not in operation.

Referring next to FIG. 68, a simplified plan view of the exemplary multirotor flying vehicle 6700 of FIG. 67 is shown with the subsystem power source 6504 A not in operation. Shown are the fuselage 104, the plurality of rotor assemblies 108, the plurality of subsystem power sources 6504, the control system 6702, and the payload 6704.

The subsystem power source 6504 A is not in operation, and therefore the four rotor assemblies 108 powered by the subsystem power source 6504 A are not in operation. In the example shown, the subsystem power source A rotor assemblies 108 are located at the outer corners of the flying vehicle 6700. Twelve rotor assemblies 108 remain in operation.

Figure 69:
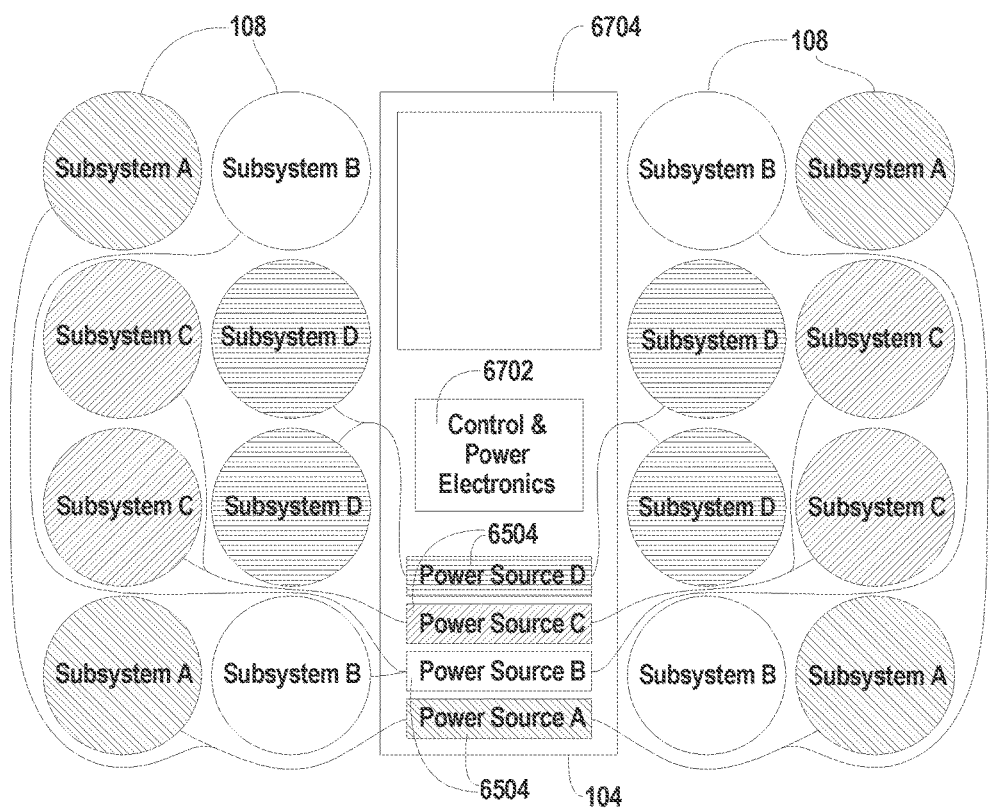
FIG. 69 is a simplified plan view of the exemplary multirotor flying vehicle with the subsystem power source B not in operation.

Referring next to FIG. 69, a simplified plan view of the exemplary multirotor flying vehicle 6700 of FIG. 67 is shown with the subsystem power source 6504 B not in operation. Shown are the fuselage 104, the plurality of rotor assemblies 108, the plurality of subsystem power sources 6504, the control system 6702, and the payload 6704.

The subsystem power source 6504 B is not in operation, and therefore the four rotor assemblies 108 powered by the subsystem power source 6504 B are also not in operation. In the example shown, the subsystem power source 6504 B rotor assemblies are located at the inner corners of the flying vehicle 6700. As with the subsystem power source 6504 A inoperability, twelve rotor assemblies 108 remain in operation. Similarly, the subsystem power sources 6504 C and D may each become inoperable without affecting the other subsystem power sources 6504.

Figure 70:
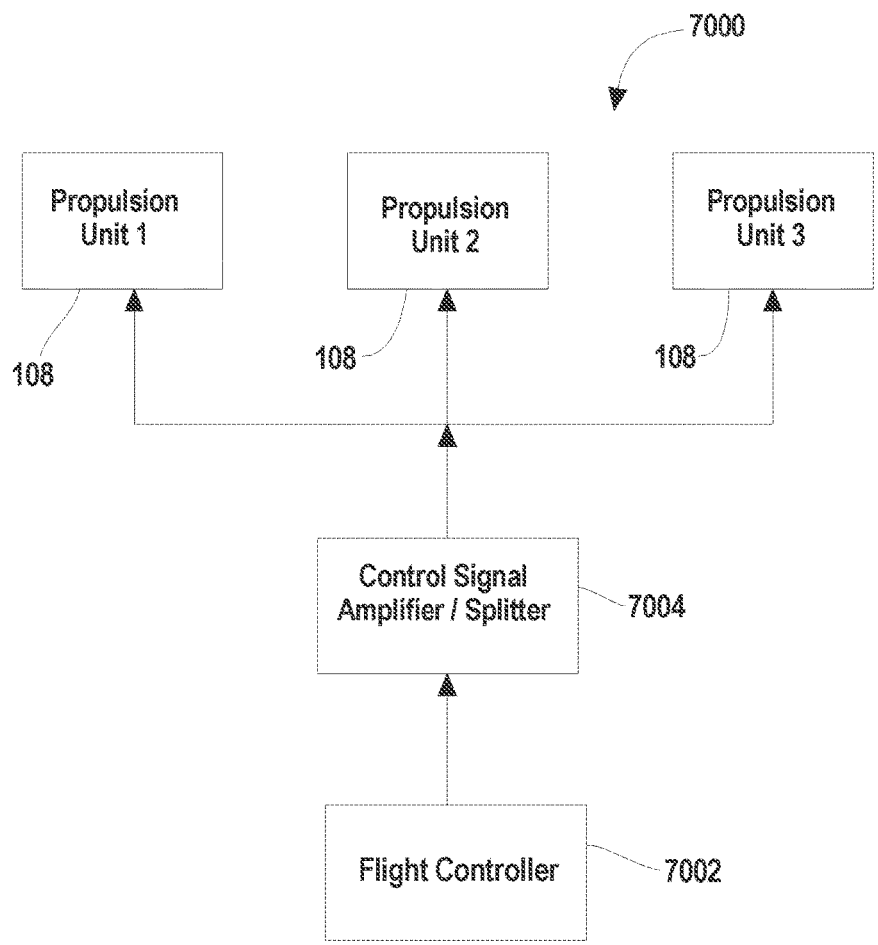
FIG. 70 is a schematic diagram of a single control output of an exemplary control system for a multirotor flying vehicle.

Referring next to FIG. 70, a schematic diagram of a single control output of an exemplary control system 7000 is shown in one embodiment of the present invention. Shown are the plurality of rotor assemblies 108, a flight controller 7002, and a control signal amplifier/splitter 7004.

The flight controller 7002 is configured to safely operate the system, including computing flight trajectories and enabling takeoff and landing of the vehicle. The flight controller 7002 in an exemplary embodiment is a 3D Robotics, Inc. PixHawk controller with an APM or PX4 software stack. In general, the controller 7002 comprises at least one processor coupled to a non-transitory memory and including flight-controlling software stored on the memory and run on the at least one processor. The controller 7002 includes a connection for a power source, at least one connection for at least one rotor assembly 108 and connections for flight control peripherals such as GPS, barometer, accelerometer, magnetometer, gyroscope, etc. Since some flight controllers 7002 include a maximum number of outputs, each output configured to be coupled to and control at least one rotor assembly 108, for large numbers of rotor assemblies 108 the number of rotor assemblies 108 will exceed the number of outputs. In the embodiment shown in FIG. 70, the flight controller 7002 is coupled to the control signal amplifier/splitter 7004. The control signal amplifier/splitter 7004 is then coupled to the plurality of rotor assemblies 108, allowing the single flight controller 7002 output to control the plurality of rotor assemblies 108. This allows multiple rotor assemblies 108 to be treated as a single virtual rotor assembly. The rotor assemblies 108 included in the virtual rotor assembly are adjacent and the center of the aggregate force of the adjacent rotor assemblies 108 is programmed into the flight controller 7002.

Although the multirotor flying vehicle improves safety through the propulsion system redundancy as described in FIGS. 65-69, to maximize safety redundancy concepts may be extended to address and minimize all potential single points of failure, including electrical and control systems. The suitably redundant system will tolerate one or more electrical power/battery system failures. This is addressed by partitioning electrical systems into independent geometrically balanced NS distributed electrical power subsystems and overlapping control subsystems. A power system design with enough subsystems to tolerate 1-2 complete subsystem failures and continue to operate at load to emergency landing is an important safety feature. Two or more always-operating parallel control system using independent sensors and power with and automatic or manual A/B switch for control signals to motor speed controllers provides instant switchover to maintain safe operation in the case of a failure.

In some embodiments, the flight controller 7002 may include a three-tier flight controller where the flight control system is comprised of three levels of control. Redundancy, fault tolerance, and stand-alone operation is built in to every level so that only localized physical damage to rotor/motor/ESC (electronic speed control)/emergency decent battery will result in propulsion failure. Each unit in each subsystem would be redundantly connected via a fiber-optic mesh network or other interconnect.

In the three-tier system, the ESC for each rotor assembly 108 takes speed input from the flight controller 7002 and direct DC power from batteries and sends 3-phase power to the rotor assembly 108. Each ESC is connected to the flight controller 7002 via a network/mesh (redundant) connection. In some embodiment, the network is fiber optic, with connections built into the frame.

When the ESC detects signal loss, power loss, a power system problem, or other anomaly from the flight controller 7002, the ESC goes into an emergency landing mode using its inertial sensors including ground proximity sensor and emergency descent battery (when necessary). The emergency landing mode is a predictable descent with vehicle stabilization, determined by reserves vs. distance plus safety factor calculation, decreasing velocity as it approaches the ground to a predetermined location defined by a traffic control system and flight control system. This allows rapid diversion to an emergency landing zone with minimal coordination. The traffic control system is notified when the flight control system detects problems and/or diverts to the emergency landing zone.

The flight controller 7002 takes directions from the navigation system, inertial sensors, etc. and sends control signals to the ESCs via a signal distribution system. The control signals are generally pulse width modulation servo control signals when directly connected or S.Bus servo control when connected via a control bus. The flight controller 7002 in some embodiments includes two identical control units (Unit A and Unit B). Both units run continuously with their own independent sensor inputs. Which unit output is used is determined by the navigation system via an A/B switchover subsystem. The A and B flight controllers are located physically separated to tolerate localized damage causing cascade failure. The flight controller 7002 can detect navigation system failure and autonomously control vehicle to execute emergency landing sequence.

The navigation system interacts with an operator, internet, navigation and hazard avoidance sensors and sends directions to the flight controller(s) 7002. The navigation system is typically fastened to the fuselage 104 and not removable from the vehicle when the vehicle is flying. The navigation system includes at least one processor, non-transitory memory coupled to the processor, and navigation software stored on the memory and configured to run on the processor. In one embodiment, the navigation software is pre-developed software, for example the open-source APM Mission Planner software. In other embodiments, the navigation software is custom software configured for mission planning, mission analysis, user interfacing, developing flight plans, and other navigational requirements.

The navigation system in one or more embodiments may also be configured to monitor flight controller behavior and determine when an A/B flight controller switchover is necessary; communicate wirelessly with traffic control (centralized, distributed, human and/or automated) for flight clearance, coordination, etc.; continuously keep flight controllers 7002 updated with appropriate (pre-defined) emergency landing behavior; monitor flight subsystems, detect mechanical failures and ensure safe landings; and/or perform sanity-checking and sensor cross-checking to establish validity of data and create confidence of safe flight profile. In some embodiment a safe landing program included in the navigation system is always fully defined via using 3D map database of a local area combined with 3D vision subsystems, ground proximity sensors, altimeters, GPS, and instructions from ground-based flight control system (tower). In some embodiments a LOS (line of sight) from one control tower triggers predictable and safe behavior, usually safe landing. In other embodiments the navigation system allows the operator to interact to control vehicle only through actions that are cleared by the control tower. The clearance may be autonomously obtained electronically as long as operator direction is reasonable. In yet other embodiments the ground control tower is remote and used for routing and coordination up to including scheduling access to the landing site, but in general the vehicle sensing is responsible for detecting obstacles and safe landing. In some embodiments the navigation system prevents the operator from commanding the vehicle to perform unsafe maneuvers.

Figure 71:
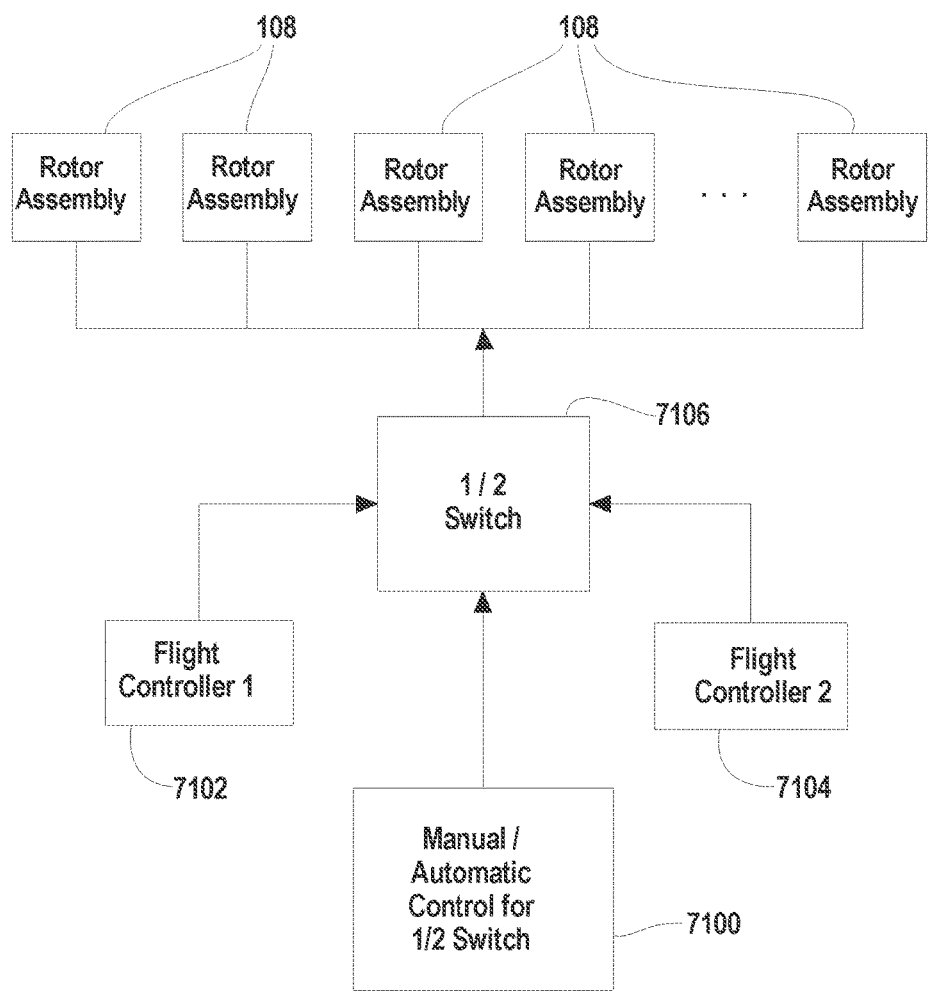
FIG. 71 is a schematic diagram of a portion of a multi-controller control system for a multirotor flying vehicle.

Referring next to FIG. 71, a schematic diagram of a portion of a multi-controller control system is shown. Shown are a switch control 7100, a first flight controller 7102, a second flight controller 7104, a switch 7106, and the plurality of rotor assemblies 108.

In the exemplary multi-controller control system of FIG. 71, two flight controllers, the first flight controller 7102 and the second flight controller 7104 are used to provide flight controller redundancy. Each flight controller 7102, 7014 is coupled to the switch 7106, which in one embodiment is a 6-channel '6PDT' relay. The switch 7106 is set for either control of the plurality of rotor assemblies 108 by the first flight controller 7102, or control of the plurality of rotor assemblies 108 by the second flight controller 7104. Each flight controller 7102, 7104 operates continuously and independently. The switch 7106 is controlled by the switch control 7100, which is configured to provide either automatic or manual switching and includes a manual/automatic flight control fall-over controller. In operation, both first and second controllers 7102, 7104 are in continuous operation during flight so that in typical operation the system is controlled by a designated flight controller, in one example the first controller 7102, but the control of the rotor assemblies 108 is changed from the designated flight controller to the other flight controller by the switch control acting on the switch 7106, whereby the control is switch to the opposite flight controller. This may occur automatically, for example if the current flight controller fails.

Each flight controller 7102, 7104 includes an independent and isolated power source and elements for flight control, including an accelerometer, a gyroscope, a magnetometer, a GPS, etc. Each flight controller 7102, 7104 also includes programming for sense-and-avoid behavior. For example, sense-and-avoid behavior includes the ability to automatically avoid running into fixed objects if instructed to do so, then alerting the operator and/or ground control and awaiting further instructions. Sense-and-avoid behavior can also include automatic avoidance of other flying objects.

Figure 72:
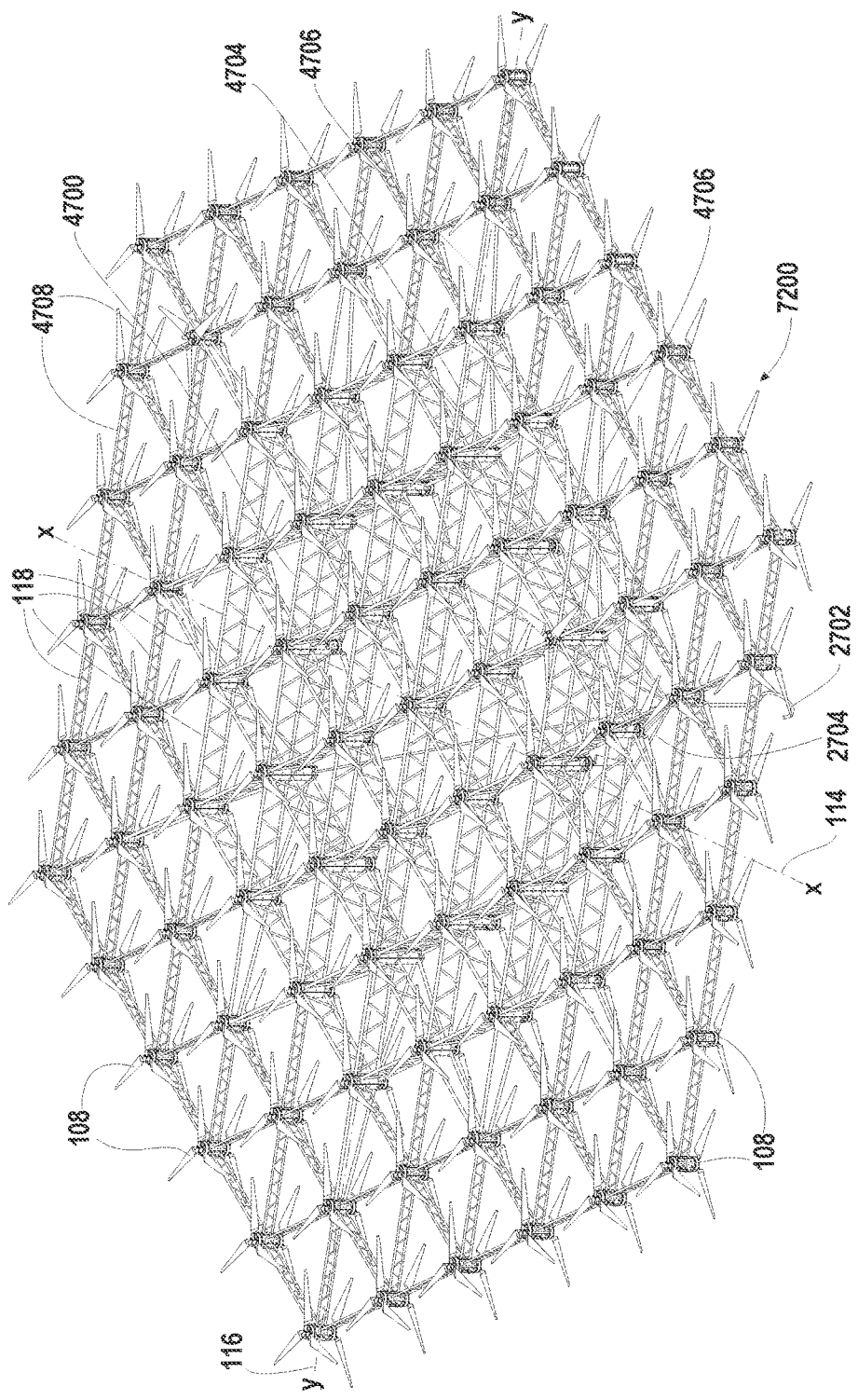
FIG. 72 is a front perspective view of an aerial crane multirotor flying vehicle in yet another embodiment of the present invention.

Referring next to FIG. 72, a front perspective view of an aerial crane multirotor flying vehicle 7200 is shown in yet another embodiment of the present invention. Shown are the plurality of rotor assemblies 108, the x-axis 114, the y-axis 116, the plurality of linkage arms 118 (including the plurality of plurality of double main truss linkage arms 4700, the plurality of main truss linkage arms 4702, the plurality of strut truss linkage arms 4704, the plurality of strut linkage arms 4606, and the plurality of perimeter truss linkage arms 4708), a hook 7202, and a plurality of cables 7204.

The aerial crane multirotor flying vehicle 7200 comprises a single continuous frame overlaid on the geometric grid. In the embodiment shown, the geometric grid is a triangular grid, and the frame is doubly symmetric, such that the perimeter of the flying vehicle 7200 forms a hexagon. The embodiment shown includes 91 frame vertices, with rotor assemblies 108 mounted at the top and bottom of each vertex, for a total of 182 rotor assemblies 108.

The frame is comprised of connected linkage arms 118 as previously described. Any suitable linkage arm or other frame structure may be used, as long as the frame is configured for flight parameters and required payload. In the embodiment shown in FIG. 72, the frame is comprised of the linkage arms previously shown in FIGS. 46-54, with various linkage arm types (double main truss linkage arms 4700, main truss linkage arms 4702, strut truss linkage arms 4704, strut linkage arms 4606, and perimeter truss linkage arms 4708) used for different frame locations. In other embodiments the linkage arms 118 may all be the same, for example as shown in FIG. 1.

For clarity, the power assembly 110 and other standard components are not shown, but it will be understood that the power assembly 110, flight control, and any other required components are mounted to the frame, or coupled to the vehicle 7200 or via an electrical cable from the ground. The tethered vehicle would create an aerial platform with unlimited endurance but would be restricted to local vicinity of power source.

The aerial crane multirotor flying vehicle 7200 also includes the plurality of cables 7204 coupled to the underside of the frame and extending downward. The end of each cable 7204 distal to the frame is coupled to and supports the hook 7202. The cables 7204 and hook 7202 are configured to support the payload. It will be understood that alternate configurations and/or structures may be coupled to the frame for payload support.

Figure 73:
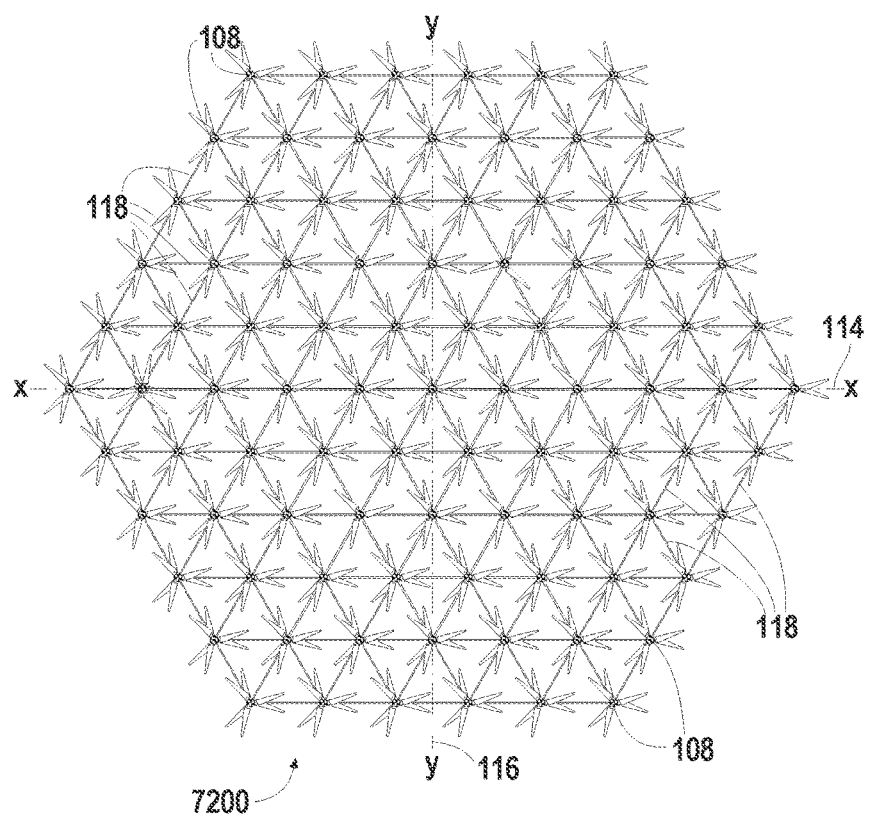
FIG. 73, a plan view of the aerial crane multirotor flying vehicle.

Referring next to FIG. 73, a plan view of the aerial crane multirotor flying vehicle 7200 is shown. Shown are the plurality of rotor assemblies 108, the x-axis 114, the y-axis 116, and the plurality of linkage arms 118.

As described in reference to FIG. 72, the aerial crane multirotor flying vehicle 7200 is a single continuous frame configuration. The exemplary configuration of FIGS. 72 and 73 uses the triangular grid and associated linkage arms 118, and forms a hexagon in plan view (although other plan frame shapes may be used). The rotor assemblies 108 are mounted to the frame intersections (vertices) as shown, or alternately may be mounted between the frame vertices.

Figure 74:
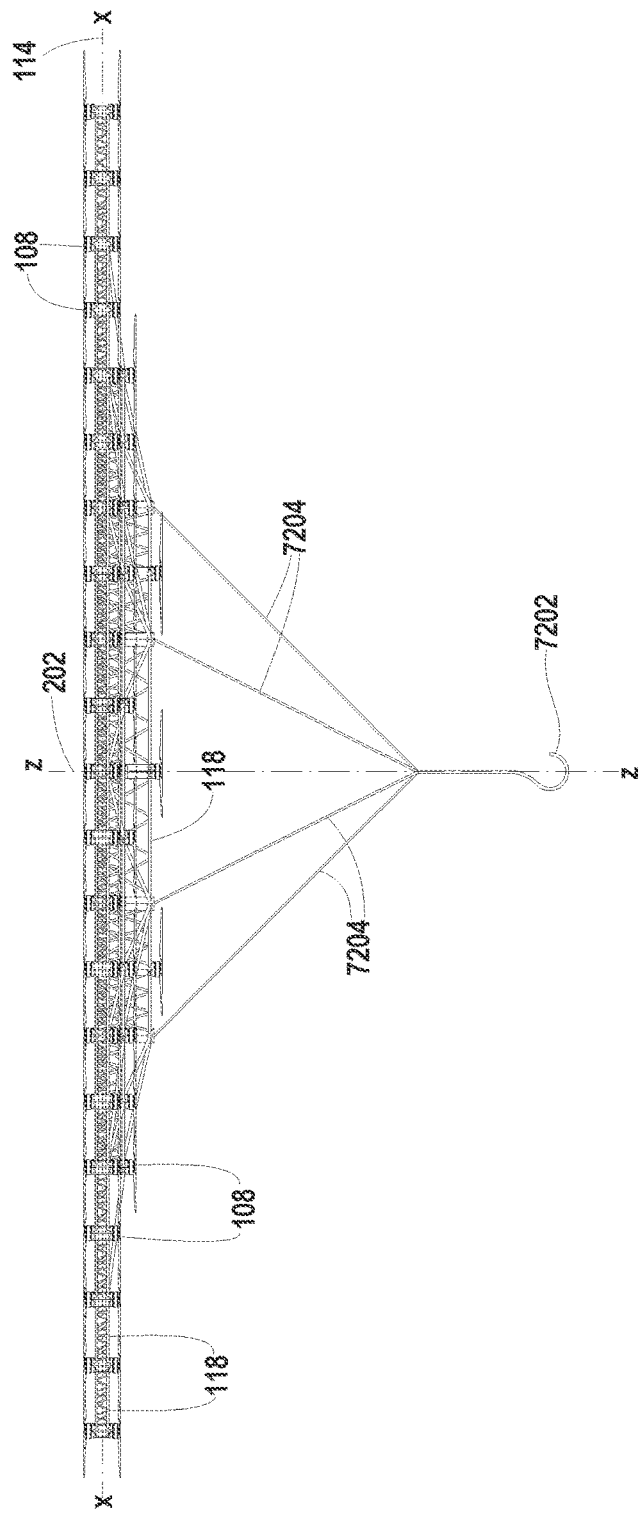
FIG. 74 is a left elevational view of the aerial crane multirotor flying vehicle.

Referring next to FIG. 74, a left elevational view of the aerial crane multirotor flying vehicle 7200 is shown. Shown are the plurality of rotor assemblies 108, the x-axis 114, the z-axis 202, the plurality of linkage arms 118, the plurality of cables 7204, and the hook 7202.

As shown in FIG. 74, the cables 7204 and hook 7202 (or other payload support) are coupled to the linkage arms 118 comprising the frame. The cables 7204 and hook 7202 are coupled to the underside of the frame, but in other embodiments payload support may be coupled to the top or other frame locations.

Referring again to FIGS. 72-74, the aerial crane multirotor flying vehicle 7200 is a "pure grid" design and does not include a fuselage 104. The cable 7204 system allows the aerial crane multirotor flying vehicle 7200 to hover while attaching the payload and then carry the payload to a destination. The embodiment shown in FIGS. 72-74 is configured to provide lift of approximately 1800 pounds at 60% throttle. The payload may be manned or unmanned. The aerial crane multirotor flying vehicle 7200 avoids issues with landing in crowded areas as the aerial crane multirotor flying vehicle 7200 is designed to attach and deliver the payload without landing. The cable 7204 system may include a winch to extend the cable length. The cables 7204 may be attached at a fixed distance from the center of frame or a single cable 7204 may extend from the center of the frame.

Figure 75:
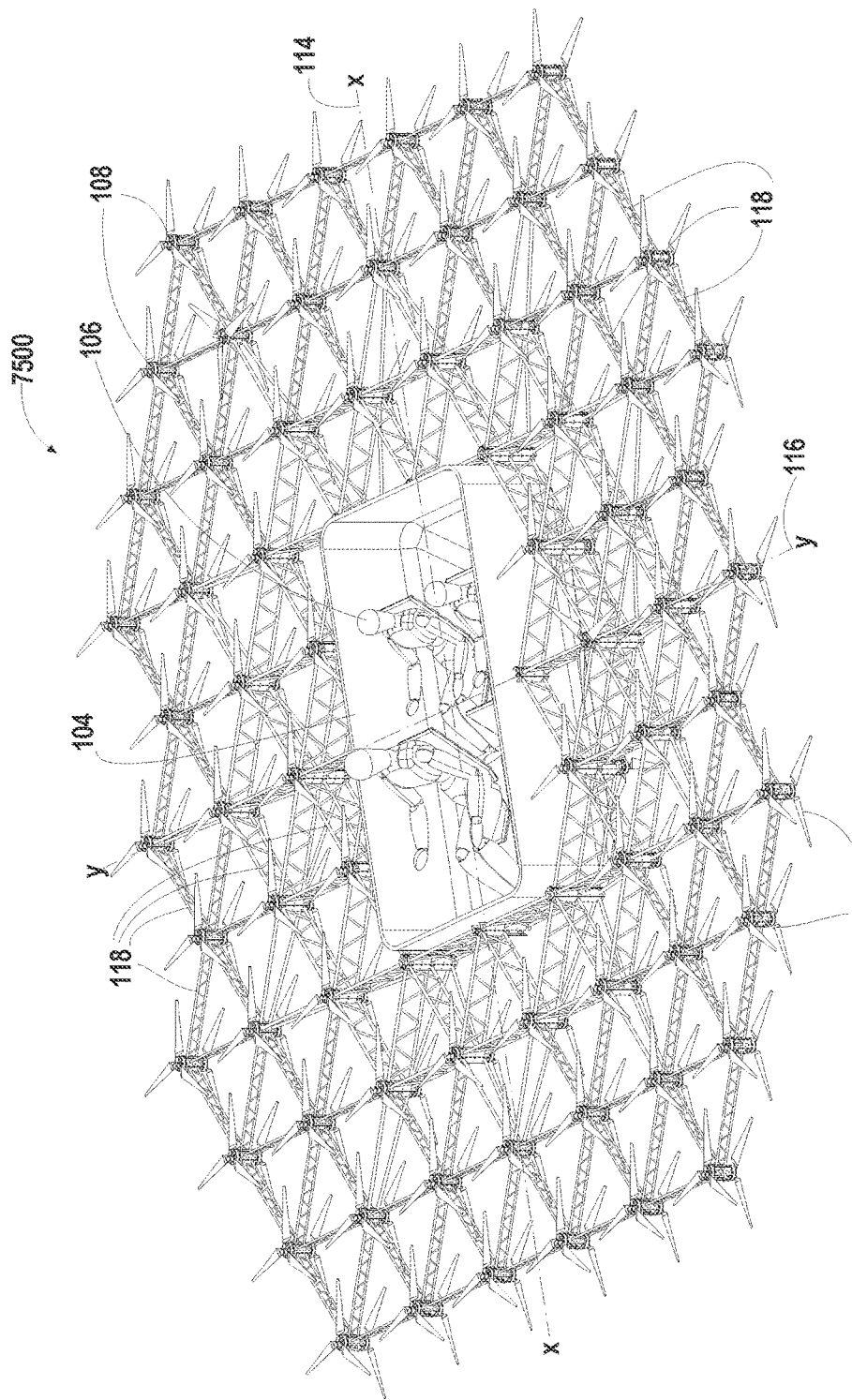
FIG. 75 is a right side perspective view of a frame-wrapped multirotor flying vehicle in yet another embodiment of the present invention.

FIG. 75 is a right side perspective view of a frame-wrapped multirotor flying vehicle 7500 in yet another embodiment of the present invention. Shown are the fuselage 104, the plurality of users 106, the plurality of rotor assemblies 108, the x-axis 114, the y-axis 116, and the plurality of linkage arms 118.

For clarity, the power assembly 110 and other standard components are not shown, but it will be understood that the power assembly 110, flight control, and any other required components are mounted to the frame.

Similarly to the embodiment shown in FIGS. 72-74, the exemplary frame-wrapped multirotor flying vehicle 7500 utilizes the various linkage arm designs of FIGS. 46-54, although it will be understood that other frame structures may be used. The triangular grid system is shown, although other grid systems may be used.

In the frame-wrapped multirotor flying vehicle 7500 of FIG. 75, the frame includes a central open area, with the fuselage 104 located within the central open area and the frame coupled to the outer perimeter of the fuselage 104. In the embodiment shown, the fuselage 104 is an open boat shape with a floor and four perimeter walls forming a general rectangular shape. The linkage arms 118 are coupled to the outside vertical faces of the fuselage 104. In this way, the frame wraps continuously horizontally around the fuselage 104.

Figure 76:
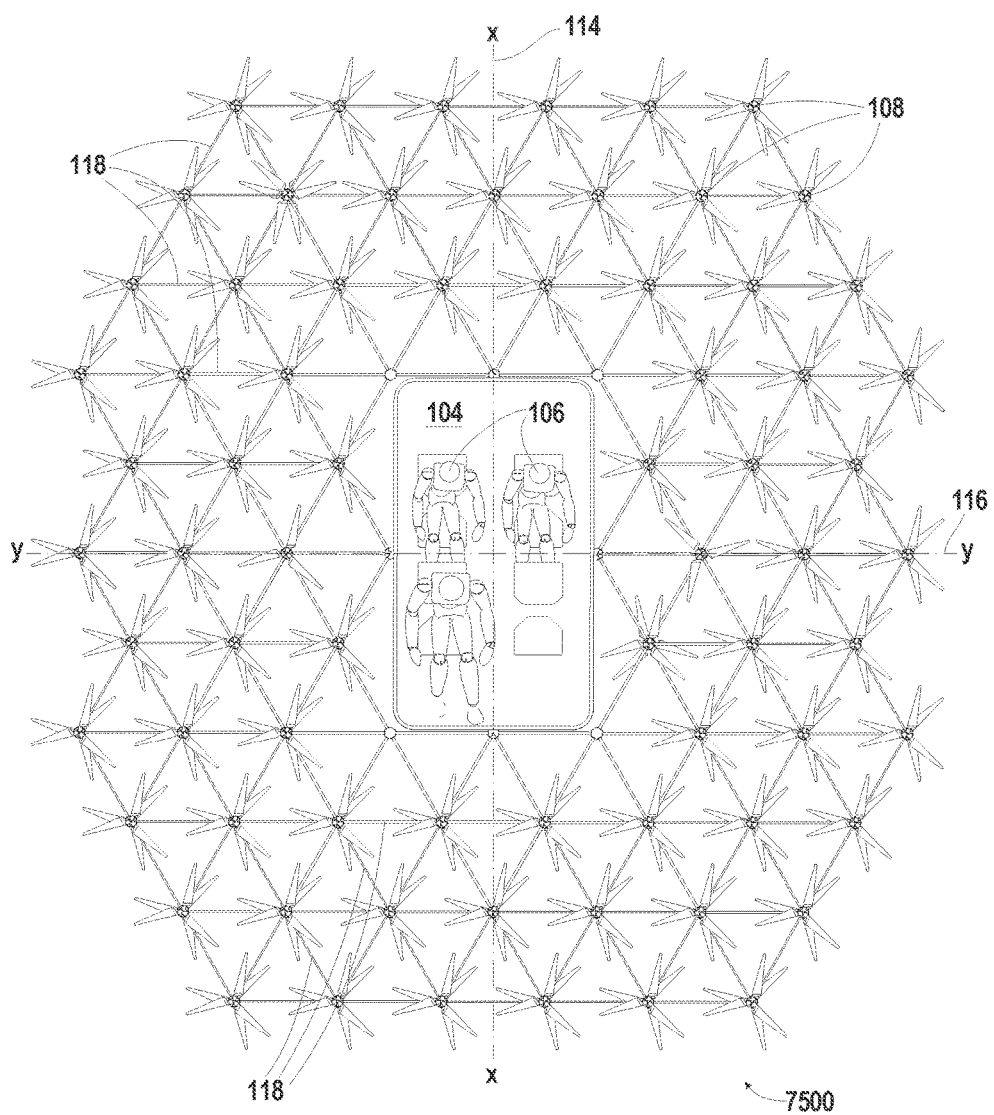
FIG. 76 is a plan view of the frame-wrapped multirotor flying vehicle.

Referring next to FIG. 76, a plan view of the frame-wrapped multirotor flying vehicle 7500 is shown. Shown are the fuselage 104, the plurality of users 106, the plurality of rotor assemblies 108, the x-axis 114, the z-axis 202, and the plurality of linkage arms 118.

As shown in FIG. 76, the rotor support frame comprised of the plurality of linkage arms 118 wraps around and surrounds the sides of the fuselage 104. In the embodiment shown, the frame is coupled to the fuselage 104 at linkage arm 118 vertices juxtaposed with the fuselage 104 perimeter walls. As shown in FIG. 4, the frame is coupled to the fuselage 104 at four locations, but other numbers of coupling locations may be used depending on various factors including grid type and fuselage geometry.

Figure 77:
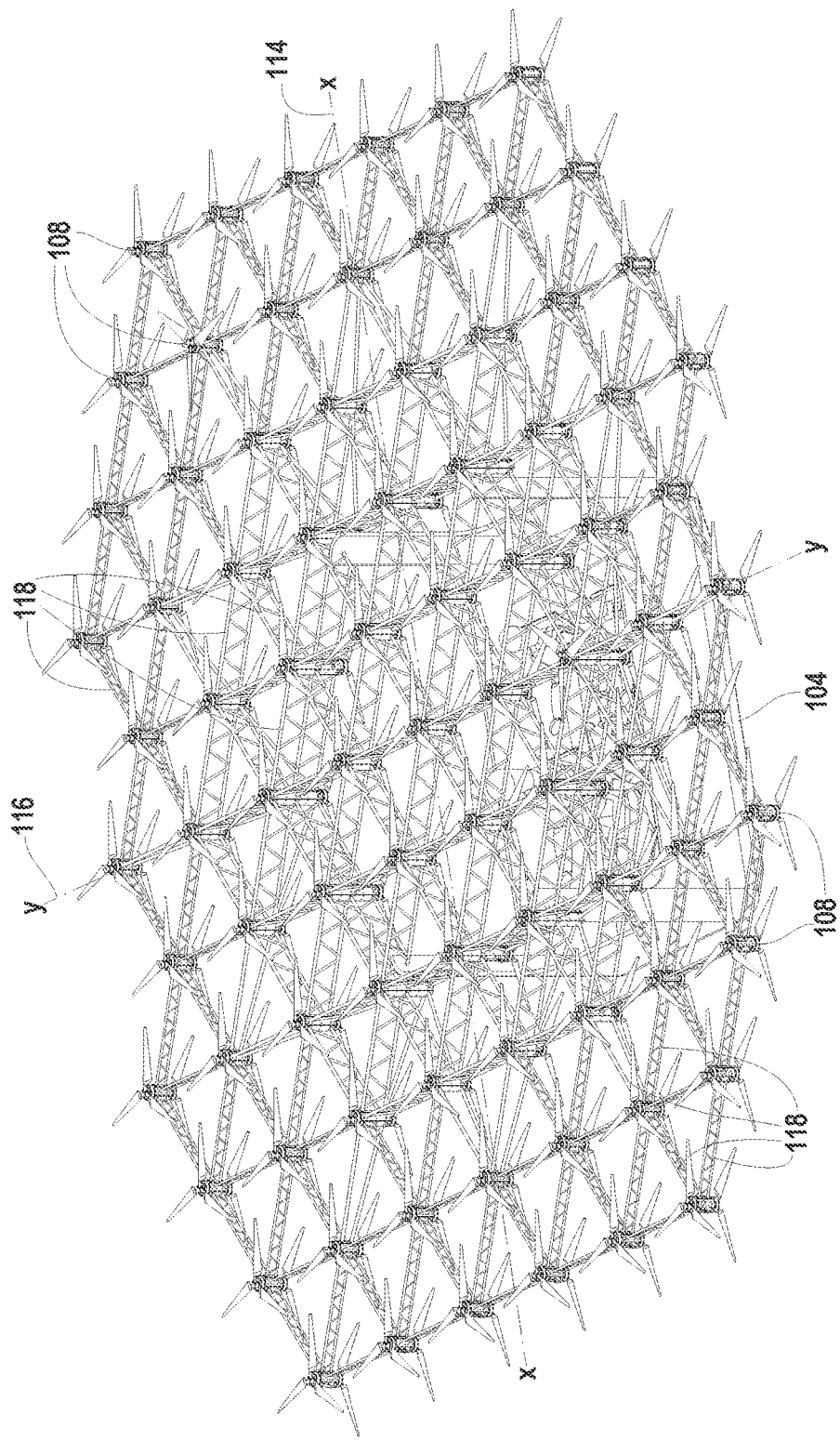
FIG. 77 is a right side perspective view of a suspended fuselage multi-rotor flying vehicle in yet another embodiment of the present invention.

Referring next to FIG. 77, a right side perspective view of a suspended fuselage multi-rotor flying vehicle 7700 in yet another embodiment of the present invention is shown. Shown are the fuselage 104, the plurality of users 106, the plurality of rotor assemblies 108, the x-axis 114, the y-axis 116, and the plurality of linkage arms 118.

Figure 78:
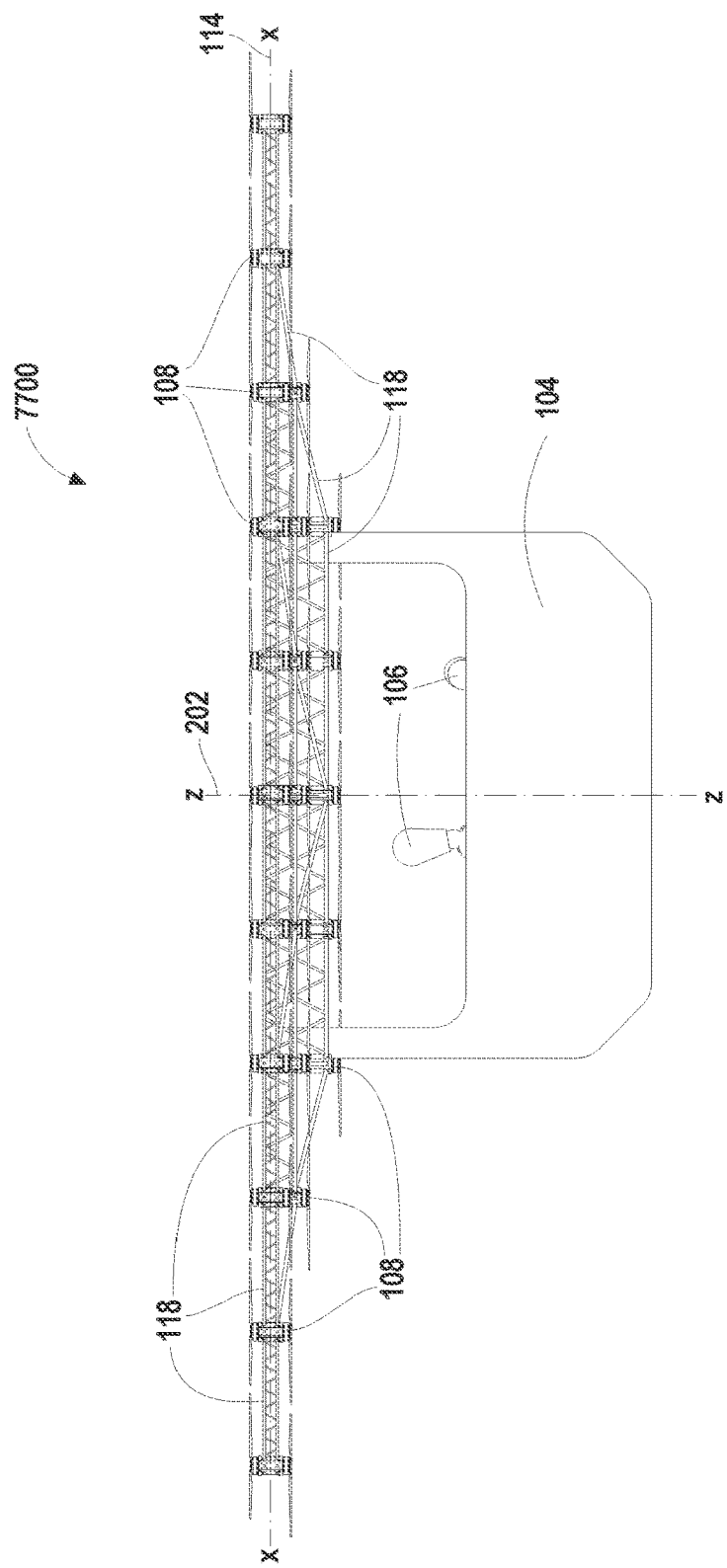
FIG. 78 is a right elevational view of the suspended fuselage multi-rotor flying vehicle.

FIG. 78 is a right elevational view of the suspended fuselage multi-rotor flying vehicle 7700. Shown are the fuselage 104, the plurality of users 106, the plurality of rotor assemblies 108, the x-axis 114, the z-axis 202, and the plurality of linkage arms 118.

For clarity, the power assembly 110 and other standard components are not shown, but it will be understood that the power assembly 110, flight control, and any other required components are mounted to the frame.

In the embodiment of FIGS. 77-78, the suspended fuselage multi-rotor flying vehicle 7700 includes a continuous frame with no center opening, similar to that shown in FIGS. 72-74. In lieu of cables and the hook for FIGS. 72-74, instead the fuselage 104 is suspended from the underside of the frame. The fuselage 104 is coupled to the underside of the frame via vertical struts that extend upward from the fuselage 104 to the frame. In the embodiment shown, there are four vertical struts and they are located at the corners of the fuselage 104.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A multirotor flying vehicle comprising:
a fuselage;
a structural frame oriented only in a horizontal plane and organized on a horizontal geometric grid on the horizontal plane, wherein the structural frame comprises a plurality of horizontally-oriented linkage arms, each linkage arm comprising a vertical truss section, the linkage arms coupled end-to-end such that each linkage arm spans between two adjacent vertices of the horizontal grid, and wherein the structural frame is coupled to the fuselage at a plurality of grid vertices;
a plurality of rotor assemblies providing vertical thrust and coupled to the structural frame, each rotor assembly including a rotor and a motor coupled to and powering the rotor;
at least one power source coupled to the fuselage and coupled to each of the plurality of rotor assemblies, whereby power is supplied to each of the rotor assemblies; and
at least one flight control system coupled to the motors and the at least one power source and configured to operate the vehicle.

2. The multirotor flying vehicle of claim 1, wherein the geometric grid is one of a triangular grid, a square grid, a diamond grid, and a hexagonal grid.

3. The multirotor flying vehicle of claim 1, wherein one rotor is coupled to the structural frame at each vertex of the horizontal geometric grid not coupled to the fuselage.

4. The multirotor flying vehicle of claim 1, wherein the vertical truss section is formed from at least one plate.

5. The multirotor flying vehicle of claim 1, each linkage arm configured to directly couple to adjacent linkage arms to form a triangular geometric grid.

6. The multirotor flying vehicle of claim 1, wherein the coupling of the structural frame to the fuselage includes at least one horizontally pivoting connection.

7. The multirotor flying vehicle of claim 6, further comprising at least one actuator configured to pivot the structural frame with respect to the fuselage.

8. The multirotor flying vehicle of claim 1, wherein the structural frame comprises a first frame and a second frame, wherein the first frame and the second frame are not directly coupled together.

9. The multirotor flying vehicle of claim 8, the structural frame further comprising a third frame, wherein the third frame is not directly coupled to the first frame and the second frame.

10. The multirotor flying vehicle of claim 1, further comprising at least one perimeter shroud coupled to the structural frame and encircling at least a portion of the plurality of rotors, the perimeter shroud configured to increases an air recirculation path for the portion of rotors encircled by the perimeter shroud.

11. The multirotor flying vehicle of claim 1, wherein at least one rotor assembly includes an air scoop coupled to a center of the rotor and configured to direct air flow to the motor.

12. The multirotor flying vehicle of claim 1, wherein the at least one power source includes at least two redundant power subsystems.

13. The multirotor flying vehicle of claim 1, wherein the flight control system includes at least two redundant flight control subsystems.

14. The multirotor flying vehicle of claim 1, wherein a number of the plurality of rotor assemblies provides airworthiness of the flying vehicle when at least two rotors are inoperable.

15. The multirotor flying vehicle of claim 1, the motor including a heatsink including a plurality of exterior diagonal radiator fins configured to provide passive cooling for a magnet assembly of the motor.

16. The multirotor flying vehicle of claim 1, the motor including a coolant circulator comprising piping arranged in a spiral tubular configuration that fits within a stator of the motor, wherein the piping is fluidly coupled to a radiator.

* * * * *